United States Patent [19]
Mattaway et al.

[11] Patent Number: 6,131,121
[45] Date of Patent: *Oct. 10, 2000

[54] POINT-TO-POINT COMPUTER NETWORK COMMUNICATION UTILITY UTILIZING DYNAMICALLY ASSIGNED NETWORK PROTOCOL ADDRESSES

[75] Inventors: Shane D. Mattaway, Boca Raton; Glenn W. Hutton, Miami; Craig B. Strickland, Tamarac, all of Fla.

[73] Assignee: NetSpeak Corporation, Boca Raton, Fla.

[*] Notice: This patent is subject to a terminal disclaimer.

[21] Appl. No.: 08/719,554

[22] Filed: Sep. 25, 1996

Related U.S. Application Data

[63] Continuation-in-part of application No. 08/533,115, Sep. 25, 1995.

[51] Int. Cl.$^7$ .................................................. G06F 15/16
[52] U.S. Cl. ................................................................ 709/227
[58] Field of Search ...................... 370/260, 259, 370/351–357; 379/212, 221, 222, 89, 90, 93–100, 88; 395/200.54, 200.57, 200.58, 200.34, 200.35; 709/227, 228, 229

[56] References Cited

U.S. PATENT DOCUMENTS

| | | |
|---|---|---|
| 5,425,028 | 6/1995 | Britton et al. . |
| 5,524,254 | 6/1996 | Morgan et al. .......................... 395/800 |
| 5,608,786 | 3/1997 | Goron ...................................... 379/100 |
| 5,740,231 | 4/1998 | Cohn et al. ............................... 379/89 |

FOREIGN PATENT DOCUMENTS

| | | |
|---|---|---|
| 20445402 | 11/1991 | European Pat. Off. . |
| 20556012 | 8/1993 | European Pat. Off. . |
| WO 9219054 | 10/1992 | WIPO . |

OTHER PUBLICATIONS

Internetworking with TCP/IP, vol. I, Second Edition, *Principles, Protocols, and Architecture*, by Douglas E. Comer, cover page and pp. vii–xviii, 1–3, 17–19 and 311–333.

*Primary Examiner*—Ajit Patel
*Attorney, Agent, or Firm*—Kudirka & Jobse, LLP

[57] ABSTRACT

A communication utility for establishing real-time, point-to-point communications between processes over a computer network includes apparatus for querying a server as to the network protocol address of another client process, and apparatus for directly establishing a communication link with the client process upon receipt of the network protocol address from the server. In one embodiment, the utility includes a sophisticated user interface having features similar to typical telephony hardware but implementing greater flexibility with software.

14 Claims, 27 Drawing Sheets

POINT-TO-POINT COMPUTER NETWORK COMMUNICATION UTILITY UTILIZING DYNAMICALLY ASSIGNED NETWORK PROTOCOL ADDRESSES

RELATED APPLICATIONS

This application is a continuation-in-part of U.S. patent application Ser. No. 08/533,115 entitled Point-to-Point Internet Protocol, by Glenn W. Hutton, filed Sep. 25, 1995, commonly assigned, the subject matter of which is incorporated herein by reference.

To the extent that any matter contained herein is not already disclosed in the above-identified parent application, this application claims priority to U.S. provisional patent application Ser. No. 60/025,415, entitled Internet Telephony Apparatus and Method by Mattaway et al., filed Sep. 4, 1996, and U.S. provisional patent application Ser. No. 60/024,251, entitled System and Methods for Point-To-Point Communications Over a Computer Network, by Mattaway et al., filed Aug. 21, 1996.

In addition, this application is one of a number of related applications filed on an even date herewith and commonly assigned, the subject matters of which are incorporated herein by reference, including the following:

U.S. patent application Ser. No. 08/719,894, entitled Directory Server For Providing Dynamically Assigned Network Protocol Addresses, by Mattaway et al.;

U.S. patent application Ser. No. 08/721,316, entitled Graphic User Interface for Internet Telephony Application, by Mattaway et al.;

U.S. patent application Ser. No. 08/719,640, entitled Method And Apparatus For Dynamically Defining Data Communication Utilities, by Mattaway et al.;

U.S. patent application Ser. No. 08/719,891, entitled Method And Apparatus For Distribution And Presentation Of Multimedia Data Over A Computer Network, by Mattaway et al.;

U.S. patent application Ser. No. 08/719,898, entitled Method And Apparatus For Providing Caller Identification Based Outgoing Messages In A Computer Telephony Environment, by Mattaway et al.;

U.S. patent application Ser. No. 08/718,911, entitled Method And Apparatus For Providing Caller Identification Based Call Blocking In A Computer Telephony Environment, by Mattaway et al.; and U.S. patent application Ser. No. 08/719,639, entitled Method And Apparatus For Providing Caller Identification Responses In A Computer Telephony Environment, by Mattaway et al.

FIELD OF THE INVENTION

The present invention relates, in general, to data processing systems, and more specifically, to a method and apparatus for facilitating audio communications over computer networks.

BACKGROUND OF THE INVENTION

The increased popularity of on-line services such as AMERICA ONLINE™, COMPUSERVE™, and other services such as Internet gateways have spurred applications to provide multimedia, including video and voice clips, to on-line users. An example of an online voice clip application is VOICE E-MAIL FOR WINCIM and VOICE E-MAIL FOR AMERICA ONLINE™, available from Bonzi Software, as described in "Simple Utilities Send Voice E-Mail Online", MULTIMEDIA WORLD, VOL. 2, NO. 9, August 1995, p. 52. Using such Voice E-Mail software, a user may create an audio message to be sent to a predetermined E-mail address specified by the user.

Generally, devices interfacing to the Internet and other online services may communicate with each other upon establishing respective device addresses. One type of device address is the Internet Protocol (IP) address, which acts as a pointer to the device associated with the IP address. A typical device may have a Serial Line Internet Protocol or Point-to-Point Protocol (SLIP/PPP) account with a permanent IP address for receiving E-mail, voicemail, and the like over the Internet. E-mail and voicemail is generally intended to convey text, audio, etc., with any routing information such as an IP address and routing headers generally being considered an artifact of the communication, or even gibberish to the recipient.

Devices such as a host computer or server of a company may include multiple modems for connection of users to the Internet, with a temporary IP address allocated to each user. For example, the host computer may have a general IP address "XXX.XXX.XXX," and each user may be allocated a successive IP address of XXX.XXX.XXX.10, XXX.XXX.XXX.11, XXX.XXX.XXX.12, etc. Such temporary IP addresses may be reassigned or recycled to the users, for example, as each user is successively connected to an outside party. For example, a host computer of a company may support a maximum of 254 IP addresses which are pooled and shared between devices connected to the host computer.

Permanent IP addresses of users and devices accessing the Internet readily support point-to-point communications of voice and video signals over the Internet. For example, real-time video teleconferencing has been implemented using dedicated IP addresses and mechanisms known as reflectors. Due to the dynamic nature of temporary IP addresses of some devices accessing the Internet, point-to-point communications in real-time of voice and video have been generally difficult to attain.

The ability to locate users having temporary or dynamically assigned Internet Protocol address has been difficult without the user manually initiating the communication. Accordingly, spontaneous, real-time communications with such users over computer networks have been impractical. Further, it is desirable to have a communication utility which contains familiar features and functions to current communication utility such as telephones and cellular telephones. It is even further desirable to utilize the current graphic user interface technology associated with computer software in a manner to achieve a more flexible interface to a such a communication utility, without the limitations associated with hardware.

Accordingly, a need exists for a way to determine whether computer users are actively connected to a computer network.

A further need exists for a way to obtain the dynamically assigned Internet Protocol address of a user having on-line status with respect to a computer network, particularly the Internet.

An even further need exists for a method and apparatus by which to establish real-time, point-to-point communications over a computer network using a communication utility having an interface which combines the familiar aspects of current hardware communication utilities but which allows for the flexibility associated with graphic user interfaces.

SUMMARY OF THE INVENTION

The above deficiencies in the prior art and previously described needs are fulfilled by the present invention which provides a virtual communications utility displayable on computer system interfaces which enables real-time, point-to-point communications over computer networks.

According to another embodiment of the present invention, a computer program product for use with a computer system comprises a computer usable medium having computer readable program code means embodied thereon comprising code means for transmitting from a client process to a server a query as to whether a second client process is connected to the computer network, program code means for receiving the network protocol address of the second process from the server, and program code means responsive to the network protocol address of the second client process for establishing a point-to-point communication link between the first client process and the second client process.

BRIEF DESCRIPTION OF THE DRAWINGS

The features of the invention will become more readily apparent and may be better understood by referring to the following detailed description of an illustrative embodiment of the present invention, taken in conjunction with the accompanying drawings, in which.

DETAILED DESCRIPTION

Figure 1:
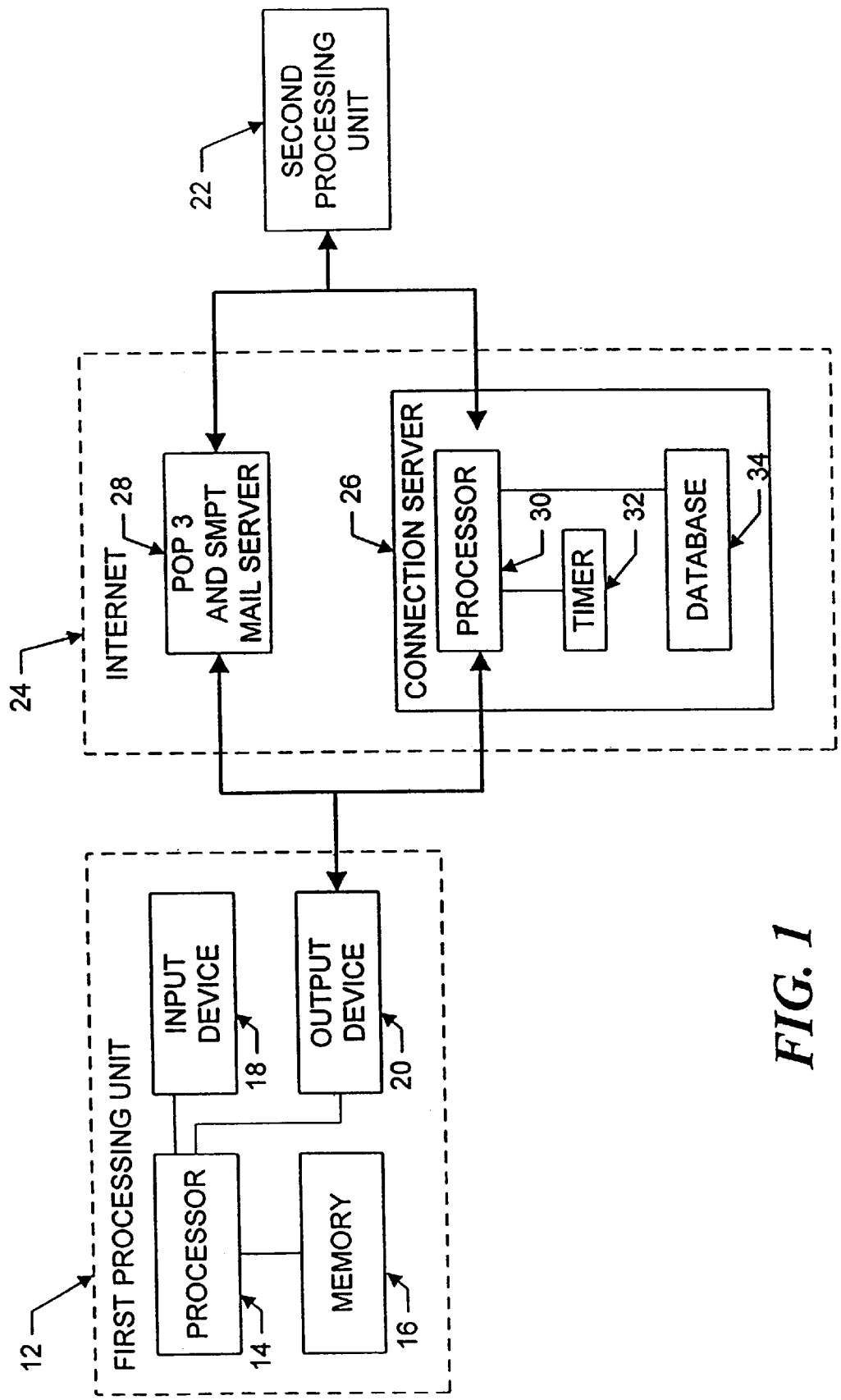
FIG. 1 illustrates, in block diagram format, a system for the disclosed point-to-point Internet protocol.

Referring now in specific detail to the drawings, with like reference numerals identifying similar or identical elements, as shown in FIG. 1, the present disclosure describes a point-to-point network protocol and system 10 for using such a protocol.

In an exemplary embodiment, the system 10 includes a first processing unit 12 for sending at least a voice signal from a first user to a second user. The first processing unit 12 includes a processor 14, a memory 16, an input device 18, and an output device 20. The output device 20 includes at least one modem capable of, for example, 14.4 Kilobit-per-second communications and operatively connected via wired and/or wireless communication connections to the Internet or other computer networks such as an Intranet, i.e., a private computer network. One skilled in the art would understand that the input device 18 may be implemented at least in part by the modem of the output device 20 to allow input signals from the communication connections to be received. The second processing unit 22 may have a processor, memory, and input and output devices, including at least one modem and associated communication connections, as described above for the first processing unit 12. In an exemplary embodiment, each of the processing units 12, 22 may execute the WEBPHONE® Internet telephony application available from NetSpeak Corporation, Boca Raton, Fla., which is capable of performing the disclosed point-to-point Internet protocol and system 10, as described herein.

The first processing unit 12 and the second processing unit 22 are operatively connected to the Internet 24 by communication devices and software known in the art, such as an Internet Service Provider (ISP) or an Internet gateway. The processing units 12, 22 may be operatively interconnected through the Internet 24 to a connection server 26, and may also be operatively connected to a mail server 28 associated with the Internet 24.

The connection server 26 includes a processor 30, a timer 32 for generating time stamps, and a memory such as a database 34 for storing, for example, E-mail and Internet Protocol (IP) addresses of logged-in units. In an exemplary embodiment, the connection server 26 may be a SPARC 5 server or a SPARC 20 server, available from SUN MICROSYSTEMS, INC., Mountain View, Calif., having a central processing unit (CPU) as processor 30, an operating system (OS) such as UNIX, for providing timing operations such as maintaining the timer 32, a hard drive or fixed drive, as well as dynamic random access memory (DRAM) for storing the database 34, and a keyboard and display and/or other input and output devices (not shown in FIG. 1). The database 34 may be an SQL database available from ORACLE or INFORMIX.

In an exemplary embodiment, the mail server 28 may be implemented with a Post Office Protocol (POP) Version 3 mail server and the Simple Mail Transfer Protocol (SMTP), including a processor, memory, and stored programs operating in a UNIX environment, or, alternatively, another OS, to process E-mail capabilities between processing units and devices over the Internet 24.

In the illustrative embodiment, the POP protocol is utilized to retrieve E-mail messages from mail server 28 while the SMTP protocol is used to submit E-mail message to Internet 24.

The first processing unit 12 may operate the disclosed point-to-point Internet protocol by a computer program described hereinbelow in conjunction with FIG. 6, which may be implemented from compiled and/or interpreted source code in the C++ programming language and which may be downloaded to the first processing unit 12 from an external computer. The operating computer program may be stored in the memory 16, which may include about 8 MB RAM and/or a hard or fixed drive having about 8 MB of available memory. Alternatively, the source code may be implemented in the first processing unit 12 as firmware, as an erasable read only memory (EPROM), etc. It is understood that one skilled in the art would be able to use programming languages other than C++ to implement the disclosed point-to-point network protocol and system 10.

The processor 14 receives input commands and data from a first user associated with the first processing unit 12 though the input device 18, which may be an input port connected by a wired, optical, or a wireless connection for electromagnetic transmissions, or alternatively may be transferable storage media, such as floppy disks, magnetic tapes, compact disks, or other storage media including the input data from the first user.

The input device 18 may include a user interface (not shown) having, for example, at least one button actuated by the user to input commands to select from a plurality of operating modes to operate the first processing unit 12. In alternative embodiments, the input device 18 may include a keyboard, a mouse, a touch screen, and/or a data reading device such as a disk drive for receiving the input data from input data files stored in storage media such as a floppy disk or, for example, an 8 mm storage tape. The input device 18 may alternatively include connections to other computer systems to receive the input commands and data therefrom.

The first processing unit 12 may include a visual interface for use in conjunction with the input device 18 and output device 20 similar to those screens illustrated in FIGS. 5–6, discussed below. It is also understood that alternative devices may be used to receive commands and data from the user, such as keyboards, mouse devices, and graphical user interfaces (GUI) such as WINDOWS™ 3.1 available form MICROSOFT Corporation, Redmond, Wash., and other operating systems and GUIs, such as OS/2 and OS/2 WARP, available from IBM CORPORATION, Boca Raton, Fla. Processing unit 12 may also include microphones and/or telephone handsets for receiving audio voice data and commands, speech or voice recognition devices, dual tone multi-frequency (DTMF) based devices, and/or software known in the art to accept voice data and commands and to operate the first processing unit 12.

Figures 5, 6:
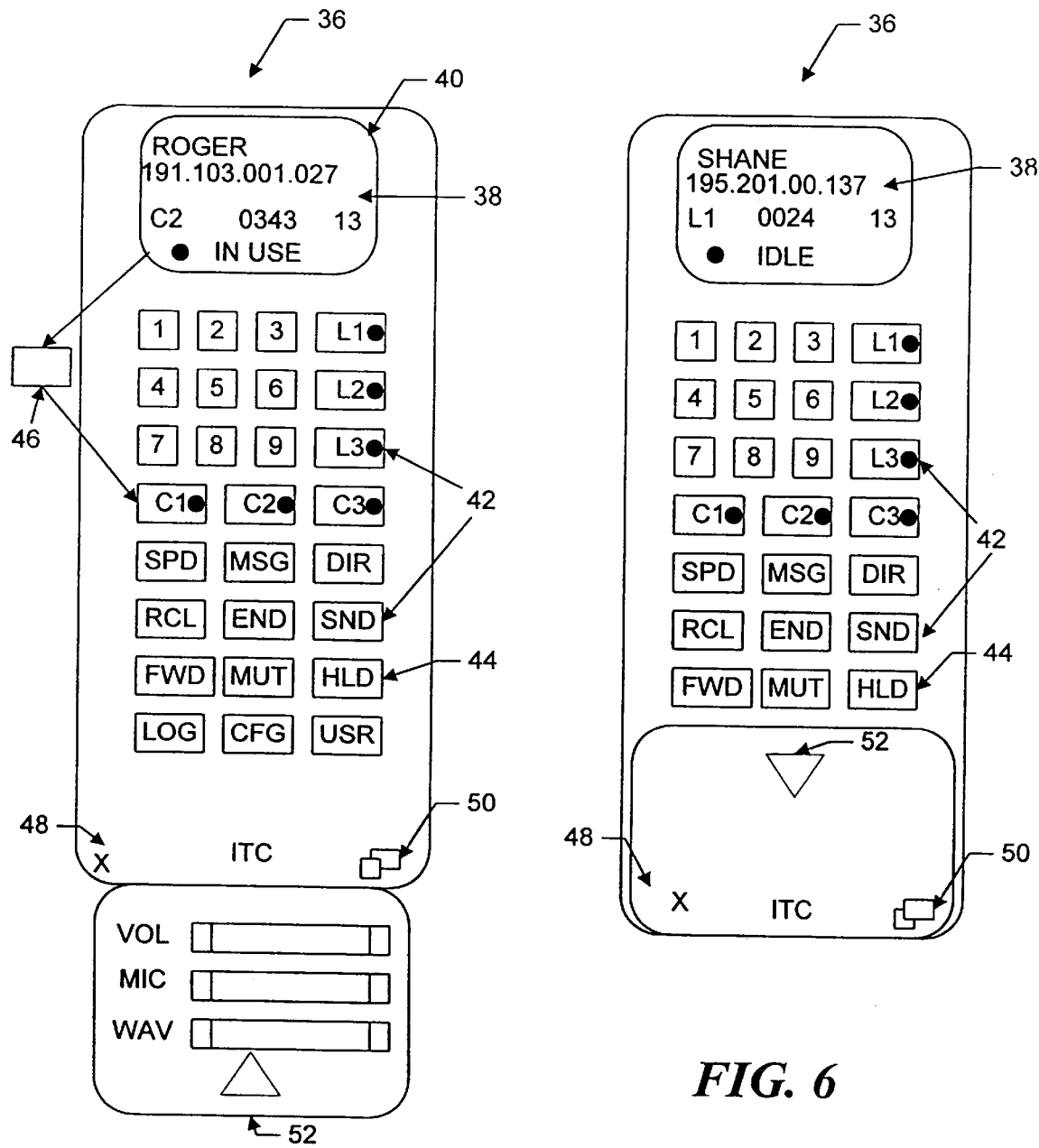
FIG. 5 illustrates a display screen for a processing unit.
FIG. 6 illustrates another display screen for a processing unit.

In addition, either of the first processing unit 12 and the second processing unit 22 may be implemented in a personal digital assistant (PDA) providing modem and E-mail capabilities and Internet access, with the PDA providing the input/output screens for mouse interactions or for touch-screen activation as shown, for example, in FIGS. 5–6, as a combination of the input device 18 and output device 20.

For clarity of explanation, the illustrative embodiment of the disclosed point-to-point Internet protocol and system 10 is presented as having individual functional blocks, which may include functional blocks labeled as "processor" and "processing unit". The functions represented by these blocks may be provided through the use of either shared or dedicated hardware, including, but not limited to, hardware capable of executing software. For example, the functions of each of the processors and processing units presented herein may be provided by a shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

The processing units 12, 22 are capable of placing calls and connecting to other processing units connected to the Internet 24, for example, via dialup SLIP/PPP lines. In an exemplary embodiment, each processing unit assigns an unsigned long session number, for example, a 32-bit long sequence in a *.ini file for each call. Each call may be assigned a successive session number in sequence, which may be used by the respective processing unit to associate the call with one of the SLIP/PPP lines, to associate a <ConnectOK> response signal with a <Connect Request> signal, and to allow for multiplexing and demultiplexing of inbound and outbound conversations on conference lines, as explained hereinafter.

For callee (or called) processing units with fixed IP addresses, the caller (or calling) processing unit may open a "socket", i.e. a file handle or address indicating where data is to be sent, and transmit a <Call> command to establish communication with the callee utilizing, for example, datagram services such as Internet Standard network layering as well as transport layering, which may include a Transport Control Protocol (TCP) or a User Datagram Protocol (UDP) on top of the IP. Typically, a processing unit having a fixed IP address may maintain at least one open socket and a called processing unit waits for a <Call> command to assign the open socket to the incoming signal. If all lines are in use, the callee processing unit sends a BUSY signal or message to the caller processing unit. As shown in FIG. 1, the disclosed point-to-point Internet protocol and system 10 operate when a callee processing unit does not have a fixed or predetermined IP address. In the exemplary embodiment and without loss of generality, the first processing unit 12 is the caller processing unit and the second processing unit 22 is the callee processing unit. When either of processing units 12, 22 logs on to the Internet via a dial-up connection, the respective unit is provided a dynamically allocated IP address by an Internet service provider.

Upon the first user initiating the point-to-point Internet protocol when the first user is logged on to the Internet 24, the first processing unit 12 automatically transmits its associated E-mail address and its dynamically allocated IP address to the connection server 26. The connection server 26 then stores these addresses in the database 34 and time stamps the stored addresses using timer 32. The first user operating the first processing unit 12 is thus established in the database 34 as an active on-line party available for communication using the disclosed point-to-point Internet protocol. Similarly, a second user operating the second processing unit 22, upon connection to the Internet 24 through an Internet service provider, is processed by the connection server 26 to be established in the database 34 as an active on-line party.

The connection server 26 may use the time stamps to update the status of each processing unit; for example, after 2 hours, so that the on-line status information stored in the database 34 is relatively current. Other predetermined time periods, such as a default value of 24 hours, may be configured by a systems operator.

The first user with the first processing unit 12 initiates a call using, for example, a Send command and/or a command to speeddial an NTH stored number, which may be labeled [SND] and [SPD] [N], respectively, by the input device 18 and/or the output device 20, such as shown in FIGS. 5–6. In response to either the Send or speeddial commands, the first processing unit 12 retrieves from memory 16 a stored E-mail address of the callee corresponding to the NTH stored number. Alternatively, the first user may directly enter the E-mail address of the callee.

The first processing unit 12 then sends a query, including the E-mail address of the callee, to the connection server 26. The connection server 26 then searches the database 34 to determine whether the callee is logged-in by finding any stored information corresponding to the callee's E-mail address indicating that the callee is active and on-line. If the callee is active and on-line, the connection server 26 then performs the primary point-to-point Internet protocol; i.e. the IP address of the callee is retrieved from the database 34 and sent to the first processing unit 12. The first processing unit 12 may then directly establish the point-to-point Internet communications with the callee using the IP address of the callee.

If the callee is not on-line when the connection server 26 determines the callee's status, the connection server 26 sends an OFF-LINE signal or message to the first processing unit 12. The first processing unit 12 may also display a message such as "Called Party Off-Line" to the first user.

When a user logs off or goes off-line from the Internet 24, the connection server 26 updates the status of the user in the database 34; for example, by removing the user's information, or by flagging the user as being off-line. The connection server 26 may be instructed to update the user's information in the database 34 by an off-line message, such as a data packet, sent automatically from the processing unit of the user prior to being disconnected from the connection server 26. Accordingly, an off-line user is effectively disabled from making and/or receiving point-to-point Internet communications.

Figure 2:
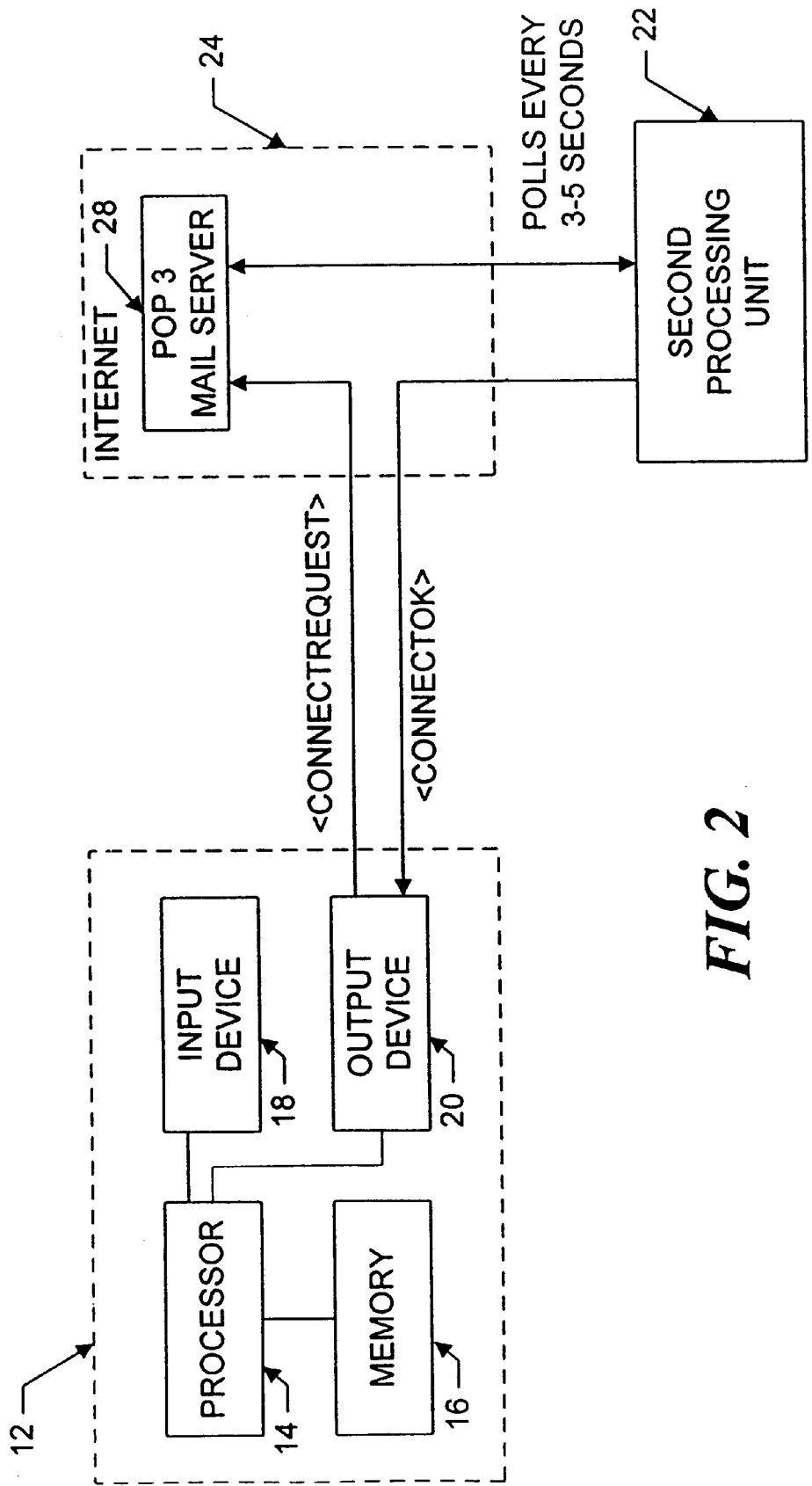
FIG. 2 illustrates, in block diagram format, the system using a secondary point-to-point Internet protocol.
Figure 3:
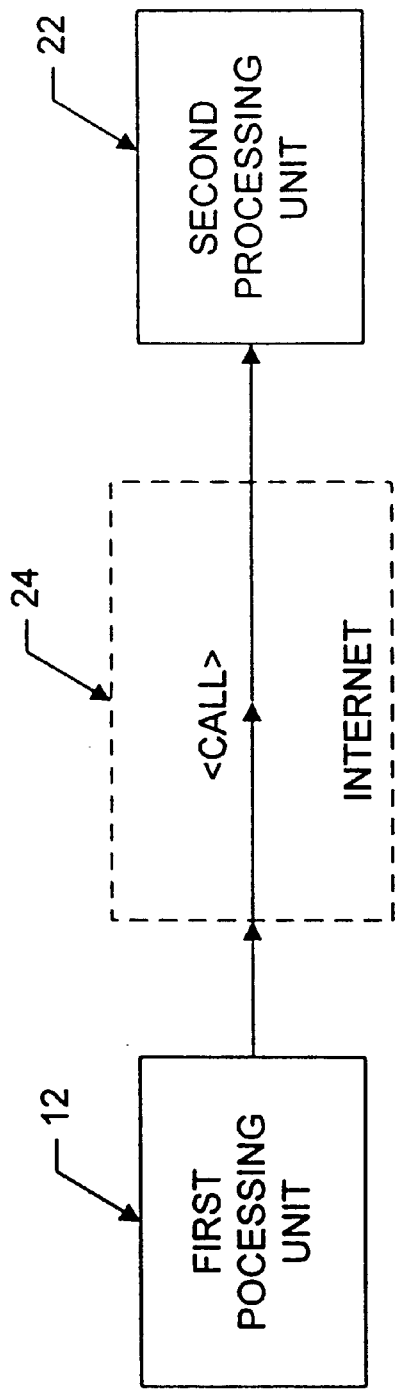
FIG. 3 illustrates, in block diagram format, the system of FIGS. 1–2 with the point-to-point Internet protocol established.
Figure 4:
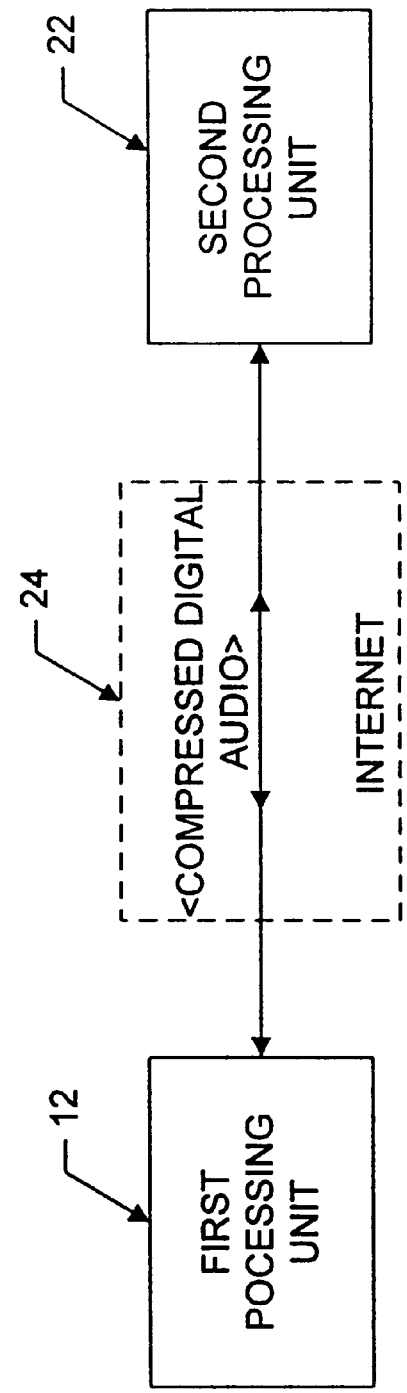
FIG. 4 is another block diagram of the system of FIGS. 1–2 with audio communications being conducted.

As shown in FIGS. 2–4, the disclosed secondary point-to-point Internet protocol may be used as an alternative to the primary point-to-point Internet protocol described above, for example, if the connection server 26 is non-responsive, unreachable, inoperative, and/or unable to perform the primary point-to-point Internet protocol, as a non-responsive condition. Alternatively, the disclosed secondary point-to-point Internet protocol may be used independent of the primary point-to-point Internet protocol. In the disclosed secondary point-to-point Internet protocol, the first processing unit 12 sends a <ConnectReq> message via E-mail over the Internet 24 to the mail server 28. The E-mail including the <ConnectReq> message may have, for example, the subject

[*wp#XXXXXXXX#nnn.nnn.nnn.#emailAddr]
where nnn.nnn.nnn.nnn. is the current (i.e. temporary or permanent) IP address of the first user, and XXXXXXXX is a session number, which may be unique and associated with the request of the first user to initiate point-to-point communication with the second user.

The following E-mail messages are transmitted to a remote users post office protocol server via simple mail transport protocol using MIME by the event manager, as explained hereinafter.

<ConnectRequest>
<CampRequest>
<VoiceMail>
<FileTransfer>
<E-mail>

The following E-mail messages are received from a local WebPhone users POP server via the POP protocol using MIME by the event manager, as explained hereinafter.

<Connect Request>
<Camp Request>
<Voice Mail>
<File Transfer>
<E-mail>
<Registration>

As described above, the first processing unit 12 may send the <ConnectReq> message in response to an unsuccessful attempt to perform the primary point-to-point Internet protocol. Alternatively, the first processing unit 12 may send the <ConnectReq> message in response to the first user initiating a SEND command or the like.

After the <ConnectRequest> message via E-mail is sent, the first processing unit 12 opens a socket and waits to detect a response from the second processing unit 22. A timeout timer, such as timer 32, may be set by the first processing unit 12, in a manner known in the art, to wait for a predetermined duration to receive a <ConnectOK> signal. The processor 14 of the first processing unit 12 may cause the output device 20 to output a Ring signal to the user, such as an audible ringing sound, about every 3 seconds. For example, the processor 14 may output a *.wav file, which may be labeled RING.WAV, which is processed by the output device 20 to output an audible ringing sound.

Second processing unit 22 polls mail server 28 at an interval, for example, once a minute, to check for incoming E-mail. Generally, second processing unit 22 checks the messages stored on mail server 28 at regular intervals to wait for and detect incoming E-mail indicating a <CONNECT REQ> message from first processing unit 12.

Typically, for sending E-mail to user's having associated processing units operatively connected to a host computer or server operating an Internet gateway, E-mail for a specific user may be sent over Internet 24 and directed to the permanent IP address of the mail server providing the target user's mail services. The E-mail is transported by a standard protocol, for example, SMTP, and stored into memory (not shown in FIG. 1) associated with mail server 28.

The E-mail may subsequently be retrieved by processing unit 22 on behalf of the user with another standard protocol, for example POP 3. The actual IP address utilized by the user's processing unit is immaterial to the retrieval of E-mail, as the mail server 28 can, for example, be polled or queried from any point on the network.

Upon receiving the incoming E-mail signal from the first processing unit 12, the second processing unit 22 may assign or may be assigned a temporary IP address. Therefore, the delivery of the E-mail through the Internet 24 provides the second processing unit 22 with a session number as well as IP addresses of both the first processing unit 12 and the second processing unit 22.

Point-to-point communication may then be established by the processing unit 22 processing the E-mail signal to extract the <ConnectRequest> message, including the IP address of the first processing unit 12 and the session number. The second processing unit 22 may then open a socket and generate a <ConnectOK> response signal, which includes the temporary IP address of the second processing unit 22 as well as the session number of the first processing unit.

The second processing unit 22 sends the <ConnectOK> signal directly over the Internet 24 to the IP address of the first processing unit 12 without processing by the mail server 28, and a timeout timer of the second processing unit 22 may be set to wait and detect a <Call> signal expected from the first processing unit 12.

Real-time point-to-point communication of audio signals over the Internet 24, as well as video and voicemail, may thus be established and supported without requiring permanent IP addresses to be assigned to either of the users or processing units 12, 22. For the duration of the realtime point-to-point link, the relative permanence of the current IP addresses of the processing units 12, 22 is sufficient, whether the current IP addresses were permanent (i.e. predetermined or preassigned) or temporary (i.e. assigned upon initiation of the point-to-point communication).

In the exemplary embodiment, a first user operating the first processing unit 12 is not required to be notified by the first processing unit 12 that an E-mail is being generated and sent to establish the point-to-point link with the second user at the second processing unit 22. Similarly, the second user is not required to be notified by the second processing unit 22 that an E-mail has been received and/or a temporary IP address is associated with the second processing unit 22. The processing units 12, 22 may perform the disclosed point-to-point Internet protocol automatically upon initiation of the point-to-point communication command by the first user without displaying the E-mail interactions to either user. Accordingly, the disclosed point-to-point Internet protocol may be transparent to the users. Alternatively, either of the first and second users may receive, for example, a brief message of "CONNECTION IN PROGRESS" or the like on a display of the respective output device of the processing units 12, 22.

After the initiation of either the primary or the secondary point-to-point Internet protocols described above in conjunction with FIGS. 1–2, the point-to-point communication link over the Internet 24 may be established as shown in FIGS. 3–4 in a manner known in the art. For example, referring to FIG. 3, upon receiving the <ConnectOK> signal from the second processing unit 22, the first processing unit 12 extracts the IP address of the second processing unit 22 and the session number, and the session number sent from the second processing unit 22 is then checked with the session number originally sent from the first processing unit 12 in the <ConnectReq> message as E-mail. If the session numbers sent and received by the processing unit 12 match, then the first processing unit 12 sends a <Call> signal directly over the Internet 24 to the second processing unit 22; i.e. using the IP address of the second processing unit 22 provided to the first processing unit 12 in the <ConnectOK> signal.

Upon receiving the <Call> signal, the second processing unit 22 may then begin a ring sequence, for example, by indicating or annunciating to the second user that an incoming call is being received. For example, the word "CALL" may be displayed on the output device of the second processing unit 22. The second user may then activate the second processing unit 22 to receive the incoming call.

Referring to FIG. 4, after the second processing unit 22 receives the incoming call, realtime audio and/or video conversations may be conducted in a manner known in the art between the first and second users through the Internet 24, for example, by compressed digital audio signals. Each of the processing units 12, 22 also display to each respective user the words "IN USE" to indicate that the point-to-point communication link is established and audio or video signals are being transmitted.

In addition, either user may terminate the point-to-point communication link by, for example, activating a termination command, such as by activating an [END] button or icon on a respective processing unit, causing the respective processing unit to send an <End> signal which causes both processing units to terminate the respective sockets, as well as to perform other cleanup commands and functions known in the art.

FIGS. 5–6 illustrate examples of display screens 36 which may be output by a respective output device of each processing unit 12, 22 of FIGS. 1–4 for providing the disclosed point-to-point Internet protocol and system 10. Such display screens may be displayed on a display of a personal computer (PC) or a PDA in a manner known in the art.

As shown in FIG. 5, a first display screen 36 includes a status area 38 for indicating, for example, a called user by name and/or by IP address or telephone number; a current function such as C2; a current time; a current operating status such as "IN USE", and other control icons such as a down arrow icon 40 for scrolling down a list of parties on a current conference line. The operating status may include such annunciators as "IN USE," "IDLE," "BUSY," "NO ANSWER," "OFFLINE," "CALL," "DIALING," "MESSAGES," and "SPEEDDIAL."

Other areas of the display screen 36 may include activation areas or icons for actuating commands or entering data. For example, the display screen 36 may include a set of icons 42 arranged in columns and rows including digits 0–9 and commands such as END, SND, HLD, etc. For example, the END and SND commands may be initiated as described above, and the HLD icon 44 may be actuated to place a current line on hold. Such icons may also be configured to substantially simulate a telephone handset or a cellular telephone interface to facilitate ease of use, as well as to simulate function keys of a keyboard. For example, icons labeled L1–L4 may be mapped to function keys F1–F4 on standard PC keyboards, and icons C1–C3 may be mapped to perform as combinations of function keys, such as CTRL-F1, CTRL-F2, and CTRL-F3, respectively. In addition, the icons labeled L1–L4 and C1–C3 may include circular regions which may simulate lamps or light emitting diodes (LEDs) which indicate that the function or element represented by the respective icon is active or being performed.

Icons L1–L4 may represent each of 4 lines available to the caller, and icons C1–C3 may represent conference calls using at least one line to connect, for example, two or more parties in a conference call. The icons L1–L4 and C1–C3 may indicate the activity of each respective line or conference line. For example, as illustrated in FIG. 5, icons L1–L2 may have lightly shaded or colored circles, such as a green circle, indicating that each of lines 1 and 2 are in use, while icons L3–L4 may have darkly shaded or color circles, such as a red or black circle, indicating that each of lines 3 and 4 are not in use. Similarly, the lightly shaded circle of the icon labeled C2 indicates that the function corresponding to C2 is active, as additionally indicated in the status are 38, while darkly shaded circles of icons labeled C1 and C3 indicate that such corresponding functions are not active.

The icons 42 are used in conjunction with the status area 38. For example, using a mouse for input, a line that is in use, as indicated by the lightly colored circle of the icon, may be activated to indicate a party's name by clicking a right mouse button for 5 seconds until another mouse click is actuated or the [ESC] key or icon is actuated. Thus, the user may switch between multiple calls in progress on respective lines.

Using the icons as well as an input device such as a mouse, a user may enter the name or alias or IP address, if known, of a party to be called by either manually entering the name, by using the speeddial feature, or by double clicking on an entry in a directory stored in the memory, such as the memory 16 of the first processing unit 12, where the directory entries may be scrolled using the status area 38 and the down arrow icon 40.

Once a called party is listed in the status area 38 as being active on a line, the user may transfer the called party to another line or a conference line by clicking and dragging the status area 38, which is represented by a reduced icon 46. Dragging the reduced icon 46 to any one of line icons L1–L4 transfers the called party in use to the selected line, and dragging the reduced icon 46 to any one of conference line icons C1–C3 adds the called party to the selected conference call.

Other features may be supported, such as icons 48–52, where icon 48 corresponds to, for example, an ALT-X command to exit the communication facility of a processing unit, and icon 50 corresponds to, for example, an ALT-M command to minimize or maximize the display screen 36 by the output device of the processing unit. Icon 52 corresponds to an OPEN command, which may, for example, correspond to pressing the O key on a keyboard, to expand or contract the display screen 36 to represent the opening and closing of a cellular telephone. An "opened" configuration is shown in FIG. 5, and a "closed" configuration is shown in FIG. 6. In the "opened" configuration, additional features such as output volume (VOL) controls, input microphone (MIC) controls, waveform (WAV) sound controls, etc.

The use of display screens such as those shown in FIGS. 5–6 provided flexibility in implementing various features available to the user. It is to be understood that additional features such as those known in the art may be supported by the processing units 12, 22.

Alternatively, it is to be understood that one skilled in the art may implement the processing units 12, 22 to have the features of the display screens in FIGS. 5–6 in hardware; i.e. a wired telephone or wireless cellular telephone may include various keys, LEDs, liquid crystal displays (LCDs), and touchscreen actuators corresponding to the icons and features shown in FIGS. 5–6. In addition, a PC may have the keys of a keyboard and mouse mapped to the icons and features shown in FIGS. 5–6.

Figure 7:
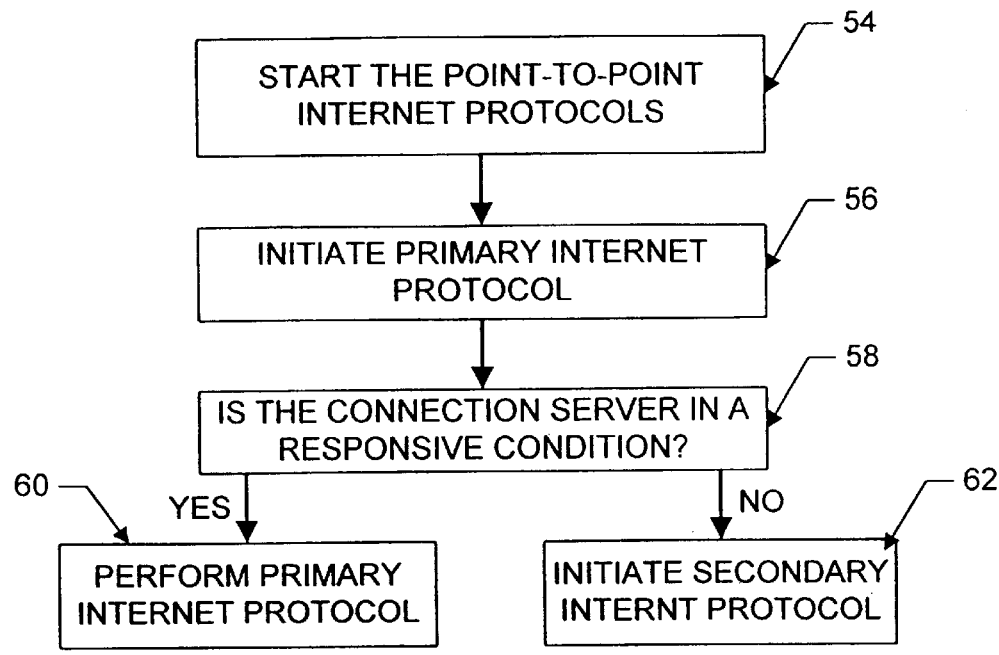
FIG. 7 illustrates a flowchart of the initiation of the point-to-point Internet protocols.

Referring to FIG. 7, the disclosed point-to-point Internet protocol and system 10 is illustrated. First processing unit 12 initiates the point-to-point Internet protocol in step 56 by sending a query from the first processing unit 12 to the connection server 26. If connection server 26 is operative to perform the point-to-point Internet protocol, in step 58, first processing unit 12 receives an on-line status signal from the connection server 26, such signal may include the IP address of the callee or a "Callee Off-Line" message. Next, first processing unit 12 performs the primary point-to-point Internet protocol in step 60, which may include receiving, at the first processing unit 12, the IP address of the callee if the callee is active and on-line. Alternatively, processing unit 60 may initiate and perform the secondary point-to-point Internet protocol in step 62, if connection server 26 is not operable.

Figure 8:
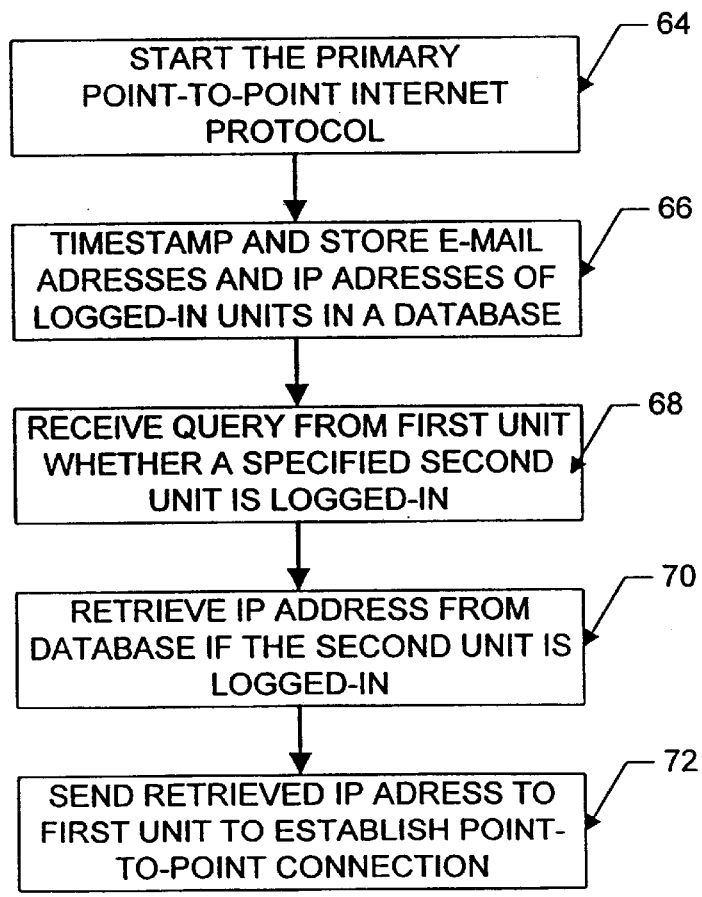
FIG. 8 illustrates a flowchart of the performance of the primary point-to-point Internet protocols.

Referring to FIG. 8, in conjunction with FIGS. 1 and 3–4, the disclosed point-to-point Internet protocol and system 10 are illustrated. Connection server 26 starts the primary point-to-point Internet protocol, in step 64, and timestamps and stores E-mail and IP addresses of logged-in users and processing units in the database 34 in step 66. Connection server 26 receives a query from a first processing unit 12 in step 68 to determine whether a second user or second processing unit 22 is logged-in to the Internet 24, with the second user being specified, for example, by an E-mail address. Connection server 26 retrieves the IP address of the specified user from the database 34 in step 70, if the specified user is logged-in to the Internet, and sends the retrieved IP address to the first processing unit 12 in step 72 to enable first processing unit 12 to establish point-to-point communications with the specified second user.

Figure 9:
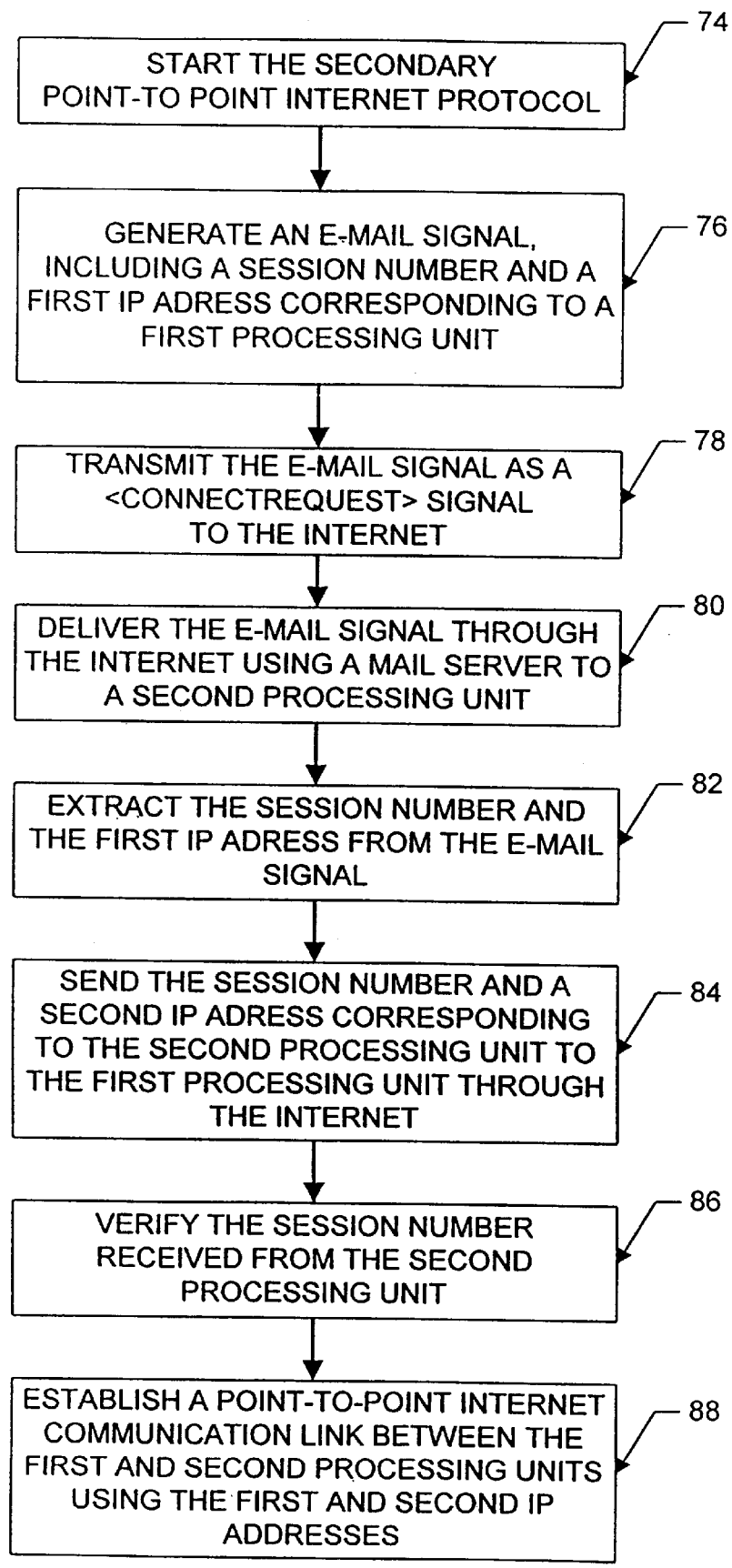
FIG. 9 illustrates a flowchart of the performance of the secondary point-to-point Internet protocol.

The disclosed secondary point-to-point Internet protocol operates as shown in FIG. 9. First processing unit 12 generates an E-mail signal, including a session number and a first IP address corresponding to a first processing unit in step 76. First processing unit 12 transmits the E-mail signal as a <ConnectRequest> signal to the Internet 24 in step 78. The E-mail signal is delivered through the Internet 24 using a mail server 28 to the second processing unit 22 in step 80. Second processing unit 22 extracts the session number and the first IP address from the E-mail signal in step 82 and transmits or sends the session number and a second IP address corresponding to the second processing unit 22, back to the first processing unit 12 through the Internet 24, in step 84. First processing unit 12 verifies the session number received from the second processing unit 22 in step 86, and establishes a point-to-point Internet communication link between the first processing unit 12 and second processing unit 22 using the first and second IP addresses in step 88.

Figure 10:
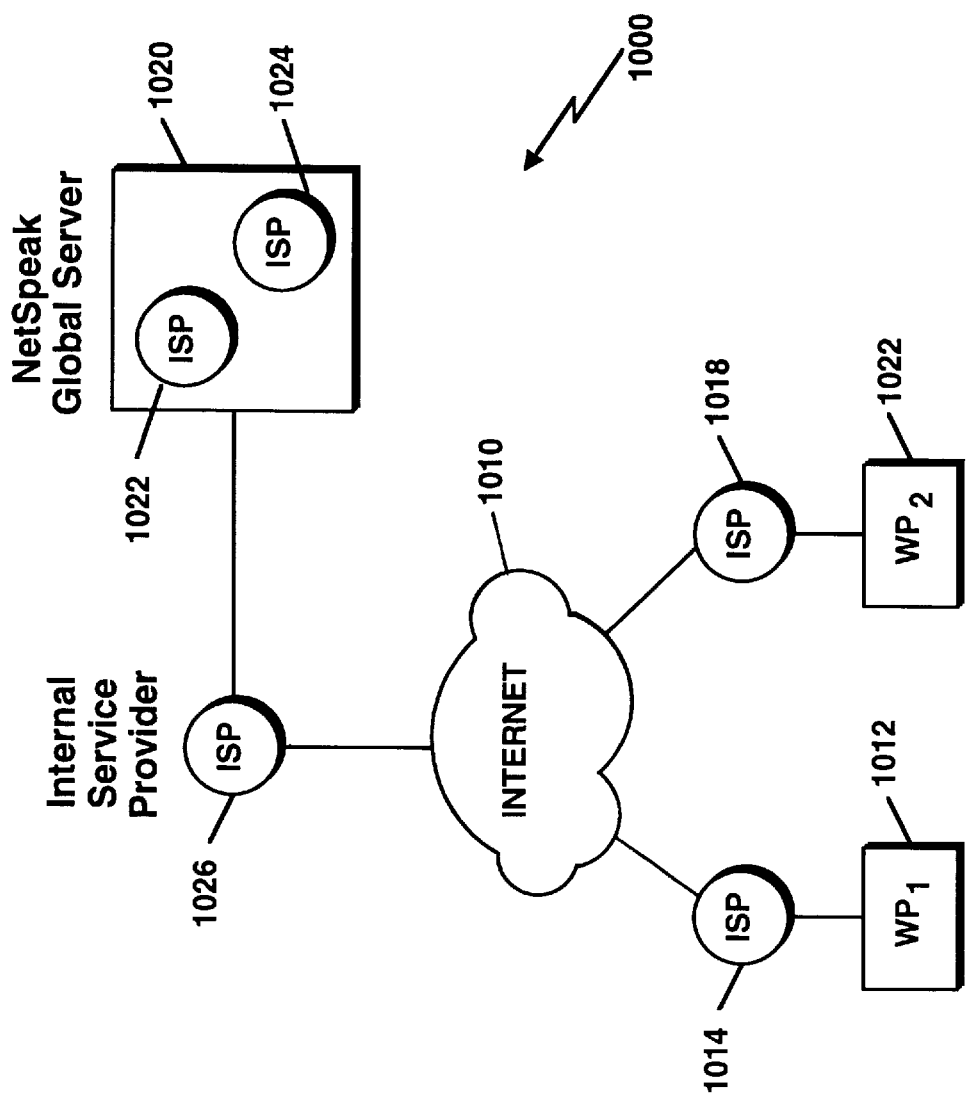
FIG. 10 illustrates schematically a computer network over which the present invention may be utilized.

The primary and secondary point-to-point Internet protocols previously described enable users to establish real-time direct communication links over the Internet or other computer networks without the need for any interaction with connection server 26, the connection server providing only directory and information related services. FIG. 10 illustrates an exemplary computer network 1000 over which the invention may operate. A first processing unit 1012 is coupled to a computer network, illustrated here as the Internet 1010, through an Internet service provider 1014. Similarly, a second processing unit 1022 is coupled to Internet 1010 through Internet service provider 1018. The inventive directory server 1020 is similarly coupled to Internet 1010 through Internet service provider 1026. Directory server 1020 further comprises a connection server 1022 and information server 1024, as will be explained hereinafter. The first processing unit 1012, second processing unit 1022 and directory server 1020 are operatively coupled to each other via the Internet 1010. It will be obvious to those reasonably skilled in the art that network 1000 is not restricted to implementation over the Internet 1010 but may comprise other network configurations such as a local area network (LAN), a wide area network (WAN), a global area network or any number of private networks currently referred to as an Intranet. Such networks may be implemented with any number of hardware and software components, transmission media and network protocols.

Exemplary Computer Architecture

Figure 11:
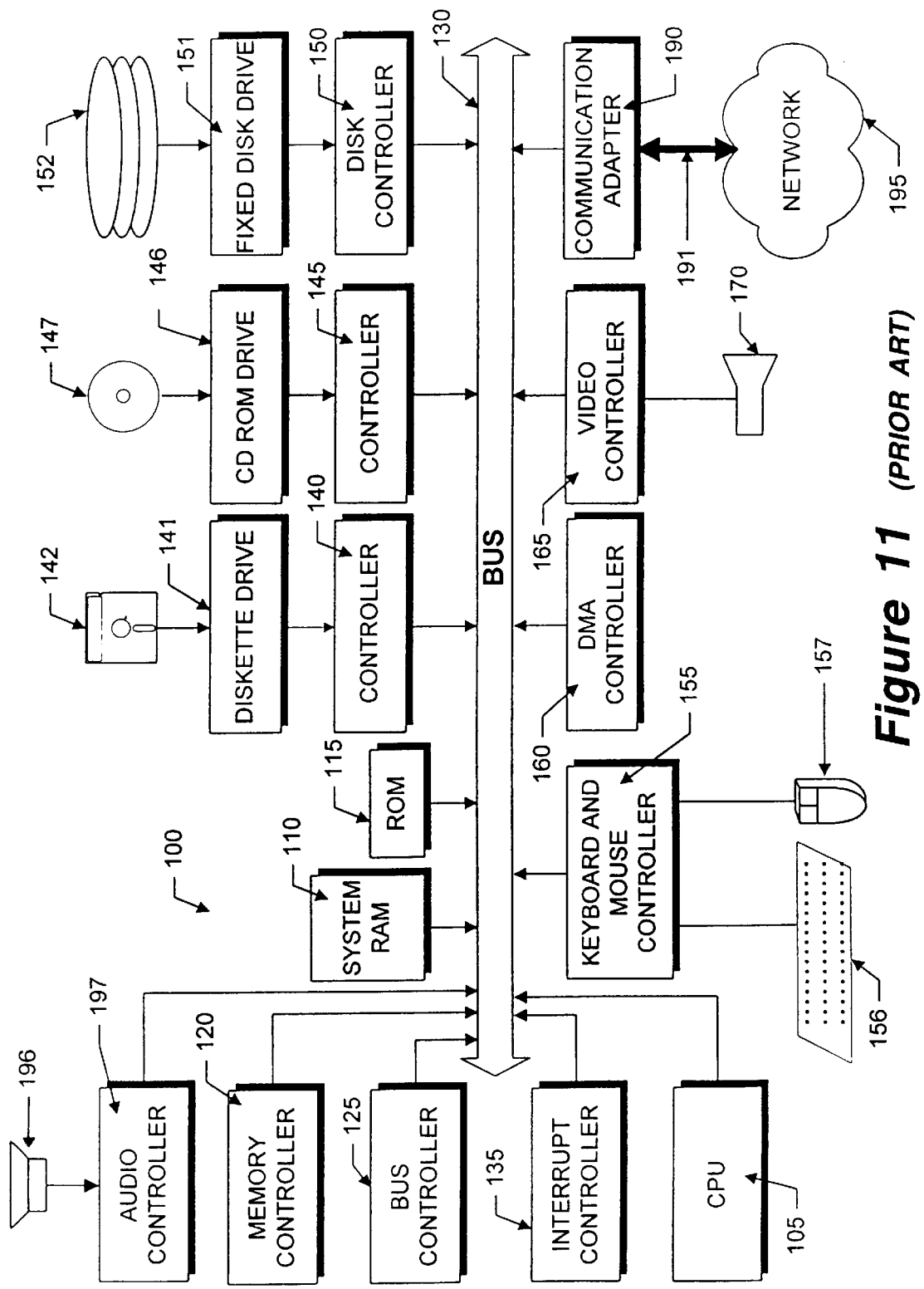
FIG. 11 is a block diagram of a computer system suitable for use with the present invention.

FIG. 11 illustrates the system architecture for a computer system 1100 such as an IBM PS/2®, suitable for implementing first and second processing units 1012 and 1022, respectively, of FIG. 10, as well as global server 1020. The exemplary computer system of FIG. 11 is for descriptive purposes only. Although the description may refer to terms commonly used in describing particular computer systems, such as in IBM PS/2 computer, the description and concepts equally apply to other computer systems ranging from personal digital assistants (PDAs) to workstations to mainframe systems.

Computer system 1100 includes a central processing unit (CPU) 1105, which may be implemented with a conventional microprocessor. System 1100 further includes a random access memory (RAM) 1110 for temporary storage of information, and a read only memory (ROM) 1115 for permanent storage of information. A memory controller 1120 is provided for controlling RAM 1110. A bus 1130 interconnects the components of computer system 1100. A bus controller 1125 is provided for controlling bus 1130. An interrupt controller 1135 is used for receiving and processing various interrupt signals from the system components.

Mass storage may be provided by diskette 1142, CD ROM 1147, or hard drive 1152. Data and software may be exchanged with computer system 1100 via removable media such as diskette 1142 and CD ROM 1147. Diskette 1142 is insertable into diskette drive 1141 which is, in turn, connected to bus 1130 by a controller 1140. Similarly, CD ROM 1147 is insertable into CD ROM drive 1146 which is, in turn, connected to bus 1130 by controller 1145. Hard disk 1152 is part of a fixed disk drive 1151 which is connected to bus 1130 by controller 1150.

User input to computer system 100 may be provided by a number of devices. For example, a keyboard 1156 and mouse 1157 are connected to bus 1130 by controller 1155. An audio transducer 1196, which may act as both a microphone and a speaker, is connected to bus 1130 by audio controller 1197, as illustrated. It will be obvious to those reasonably skilled in the art that other input devices, such as a pen and/or tablet may be connected to bus 1130 with an appropriate controller and software, as required. DMA controller 1160 is provided for performing direct memory access to RAM 1110. A visual display is generated by video controller 1165 which controls video display 1170. Computer system 1100 also includes a communications adaptor 1190 which allows the system to be interconnected to a network such as a local area network (LAN), a wide area network (WAN), or the Internet, schematically illustrated by transmission medium 1191 and network 1195.

In the illustrative embodiment, computer system 1100 may include an Intel microprocessor such as the 80486DX-33 MHz, or faster, a 14.4 Kb communication modem or faster, and a sound card, as further described with reference to FIG. 12.

Operation of computer system 1100 is generally controlled and coordinated by operating system software, such as the OS/2® operating system, available from International Business Machines Corporation, Boca Raton, Fla., or Windows® DOS-based operating system available from Microsoft Corp., Redmond, Wash. The operating system controls allocation of system resources and performs tasks such as process scheduling, memory management, networking, and I/O services, among other things.

Figure 12:
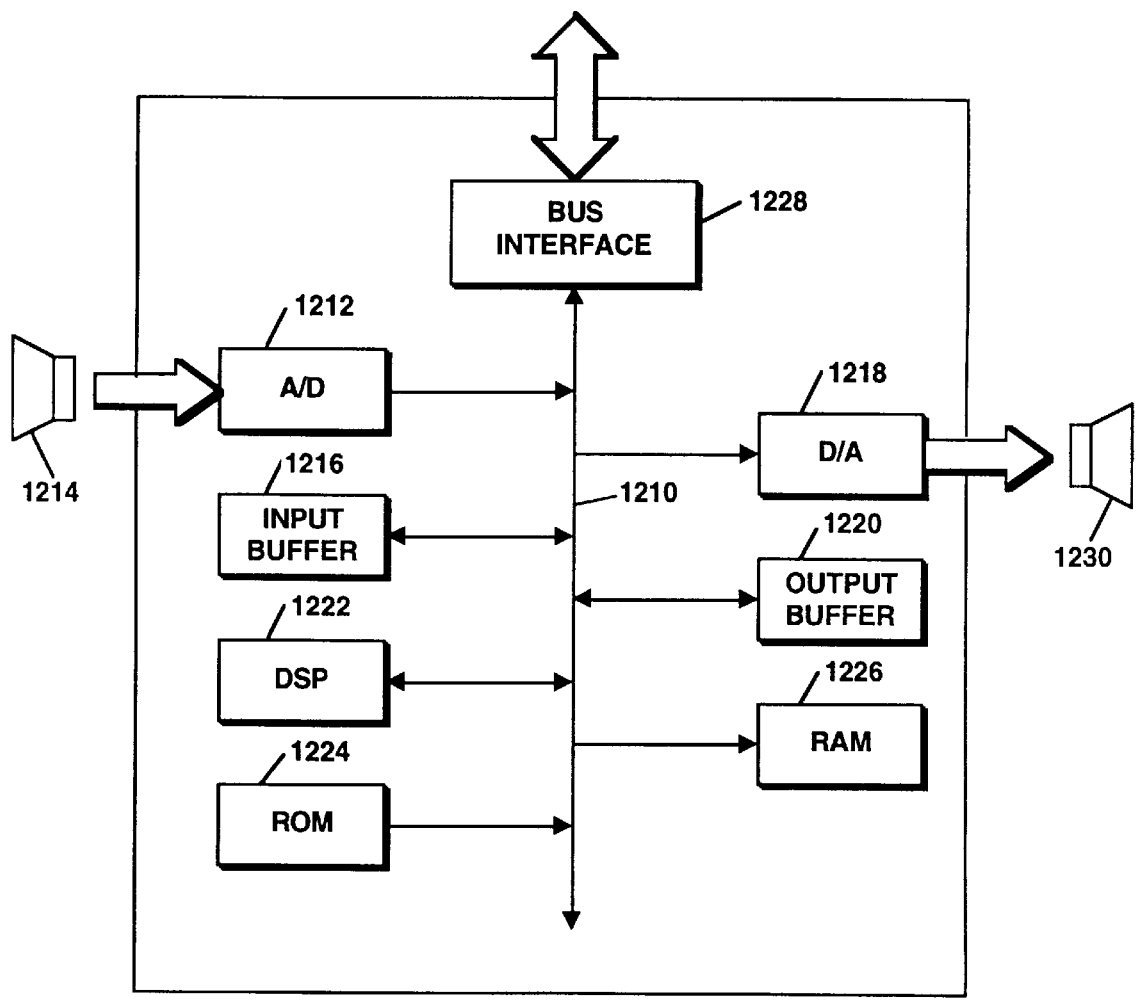
FIG. 12 is a block diagram of an audio processing card suitable for use with the computer system of FIG. 10.

FIG. 12 illustrates schematically an audio sound card 1200 which may be used to implement audio controller 1197 of FIG. 11. Specifically, sound card 1200 may comprise, in the exemplary embodiment, an analog-to-digital (A/D) converter 1212, an input buffer 1216, a digital signal processor (DSP) 1222, ROM 1224, RAM 1226, an output buffer 1220, and an analog-to-digital (D/A) converter 1218, all of which may be interconnected over a bus 1210. Bus 1210 is in turn coupled to a bus interface 1228 which, in turn, is coupled to bus controller 1125 of computer system 1100 of FIG. 11.

As illustrated in FIG. 12, A/D converter 1212 is coupled to audio transducer 1214 which is typically a microphone. Conversely, D/A converter 1218 is coupled to audio transducer 1230, typically a speaker. It will be obvious to those reasonably skilled in the art that audio transducers 1214 and 1230, may be combined into a single element which serves as both a transmitter and receiver of audio signal.

In operation, A/D converter 1212 samples the audio signals supplied to it by transducer 1214 and stores the digital samples in buffer 1216. The digital sampling occurs under control of a program typically stored in ROM 1224, or, alternatively, under the control of digital signal processor 1222. The digital samples stored in input buffer 1216 are forwarded periodically, typically when the buffer reaches near capacity, over bus 1210 to bus 1130 of FIG. 11, for further processing by computer system 1100. The device driver for audio sound card 1200 generates system interrupts which will cause the digital samples stored in input buffer 1216 to be retrieved for processing. In the exemplary embodiment, the digital samples are uncompressed as supplied to computer system 1100. However, compression of the digital samples may occur using DSP 1222 executing an appropriate compression algorithm, if desired.

Digital audio samples from computer system 1100 are also be converted to analog signals by sound card 1200. The digital samples are supplied to bus 1210 and temporarily stored into output buffer 1220. The digital samples are then converted by D/A converter 1218 into an analog signals which are then supplied to audio transducer 1230, i.e., a speaker, or to further amplification and processing devices.

Sound card 1200 contemplated for use with the present invention may be implemented with any number of Windows compliant sound cards, such as the Sound Blaster sound card, commercially available from Creative Technologies Ltd., Singapore. Such Window compliant sound cards have a Windows compliant software interface allowing a standardized mechanism for software programs to operate the sound card device, such as Winsoc 1.1.

WebPhone Application

In the exemplary embodiment of the present invention, each of first processing unit 1012 and second processing unit 1022 of FIG. 10 are executing a software application capable of enabling point-to-point communication over network 1000, such as an Internet telephone application. One such application suitable for use with the present invention is the WebPhone Version 1.0 or higher, software, hereafter referred as the "WebPhone," commercially available from NetSpeak Corporation, Boca Raton, Fla. A description of the architecture and operation of the WebPhone is provided herein with reference to FIGS. 5–6, 13A–B and 14. An extensive detailed description of the architecture, application program interface, graphic user interface, and operation of the WebPhone can be found in copending U.S. patent application Ser. No. XX/XXX, XXX entitled "Point-to-Point Computer Network Communication Utility Utilizing Dynamically Assigned Internet Protocol Addresses" by Mattaway et al. filed on an even date herewith and commonly assigned, the complete subject matter of which is incorporated herein by reference.

Figure 13:
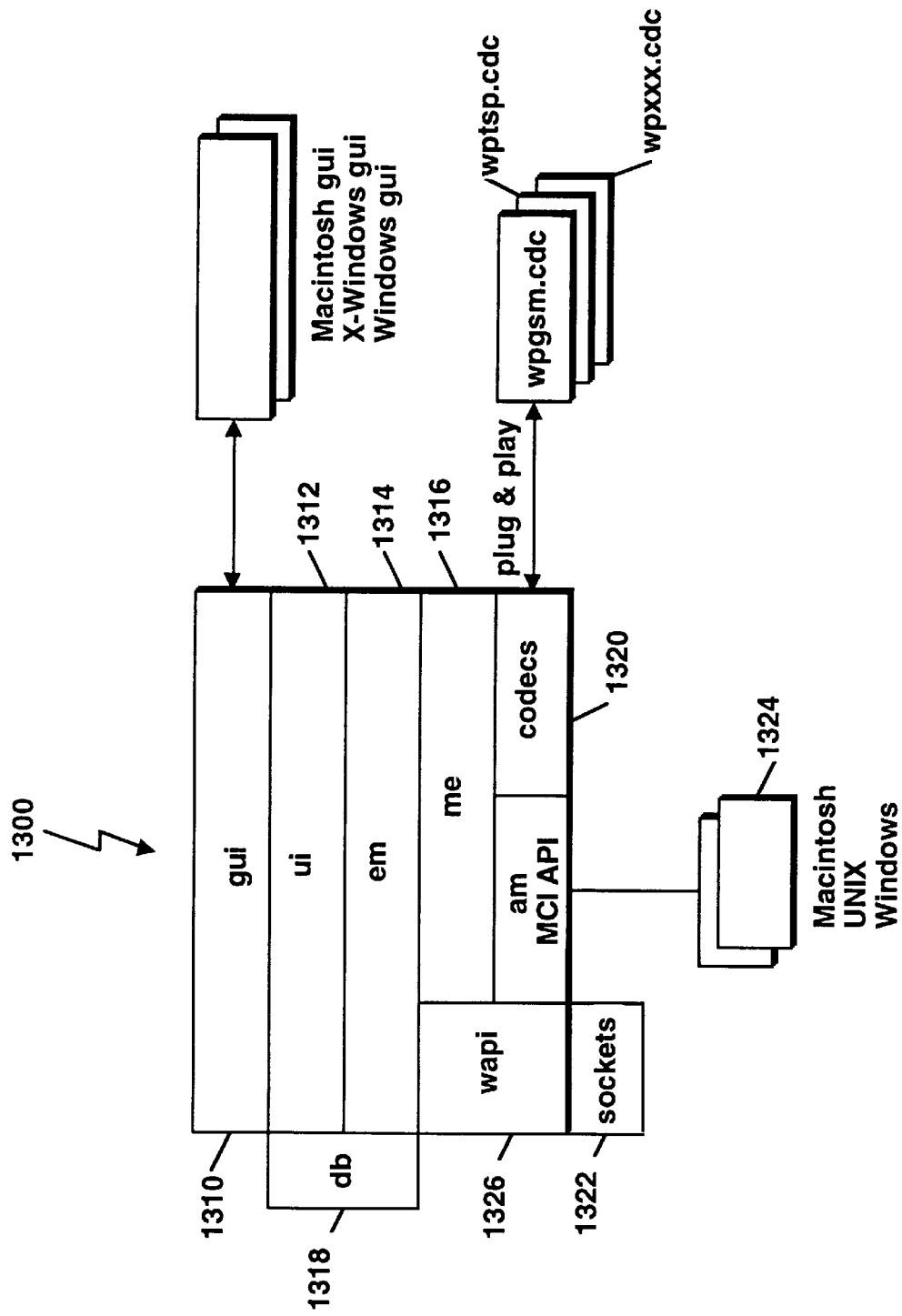
FIG. 13A–B are schematic block diagrams of the elements comprising the inventive computer network telephony mechanism of the present invention.
Figure 13:
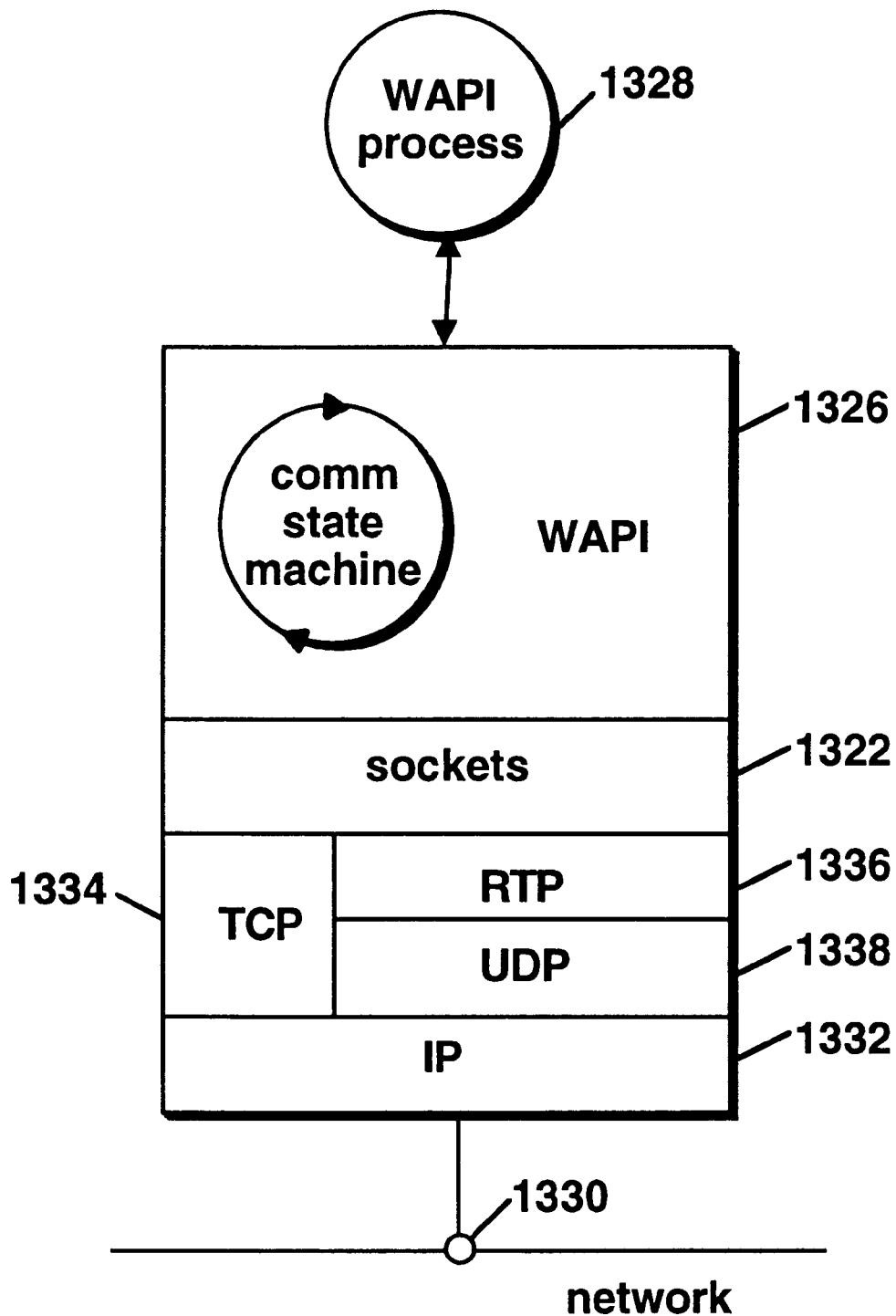

Referring to FIGS. 13A–B, schematic block diagrams of the WebPhone architecture are illustrated. The WebPhone is an end-user software application which enables users to send real-time audio data to other WebPhone users over the Internet or any public or private TCP/IP based computer networks. The WebPhone application and architecture may be designed to run on any number of operating systems or computer architectures. In the illustrative embodiment, the WebPhone application is implemented as a Windows compatible application executable on an IBM PC architecture or a clone thereof.

Referring to FIG. 13A, the WebPhone 1300 comprises a set of object modules, written in a programming language such as C++, which work together in a concerted fashion to provide real-time, multitasking, network-based media transmission and reception. WebPhone 1300 comprises a graphic user interface (GUI) 1310, a user interface (UI) 1312, an event manager 1314, a media engine 1316, a database dynamic link library 1318, one or more audio compression/decompression (codecs) 1320, an audio manager 1324, a WebPhone application program interface (API) 1326, and a network interface 1322.

WebPhone GUI 1310 comprises the visual objects seen on a computer display by the user, as illustrated by the screen capture of FIG. 14 discussed hereinafter. WebPhone GUI 1310 serves only to display the artwork associated with the underlying objects of WebPhone UI 1312. WebPhone GUI 1310 may be implemented in a modular fashion distinct from the WebPhone UI for rapid portability. In this manner, other graphic user interface environments such as those compatible with the Macintosh, X-Windows or OS/2 operating systems, may be substituted via the Plug and Play protocol, as would be understood by those reasonably skilled in the arts.

The WebPhone UI 1312 objects maintain the state of the WebPhone GUI and provide feedback to the WebPhone GUI objects from events originating from either the user or the event manager 1314. When WebPhone changes a state that requires user notification, WebPhone UI objects notify associated WebPhone GUI objects to display the appropriate art work to the user. WebPhone UI objects also interface with the database dynamic link library 1318 to maintain the WebPhone database information, e.g. configuration information, phone directory information, etc.

The WebPhone event manager 1314 processes all the events originating from the user, via WebPhone UI 1312, the media engine 1316, and WebPhone API 1326. Event manager 1314 may be implemented as a table-driven state machine that processes the above-identified events and performs the functions necessary to bring the WebPhone from one state to another. For example, event manager 1314 interacts with media engine 1316 to create, control and remove concurrently executing jobs managed by media engine 1316. Event manager 1314 also interfaces with the WebPhone API 1326 to provide communications with other WebPhones and connection servers, as described in more detail hereinafter. WebPhone database 1318 is a dynamic link library of tree-based subroutines that provide fast database access to the WebPhone configuration information, personal phone directory, etc.

WebPhone media engine 1316 manages the allocation of associated resources to provide a multitasking environment and controls the flow of real-time data streams, e.g., conversations, outgoing messages, etc., and non-real-time data streams, e.g., voice mail, graphic images, files, etc., to and from a user network connection. The objects representing tasks are created by event manager 1314, thereby freeing media engine 1316 to manage resource routing. Specifically, the media engine routes data streams from sources such as a microphone, file or network socket, to destinations such as speaker, destination file or other network socket. To perform such routing functions the media engine interfaces with the WebPhone API 1326 to control communication with other processes, and further communicates with audio manager 1324 to communicate with the system input/output apparatus, such as sound card 1200 of FIG. 12. Media engine 1314 may be designed to employ heuristic methods to sense and efficiently utilize available bandwidth to achieve timely and accurate delivery of all data streams, both real-time and non-real-time.

Media engine 1316 further interacts with WebPhone codec 1320 to achieve compression and decompression of audio data streams. Codec 1320 provides coding of digital samples from the sound card 1200 of FIG. 12 into a compressed format more suitable for transmission over a computer network. Codec 1320 further provides decoding of a compressed signal prior to its submission to sound card 1200 for subsequent conversion to an audible analog signal. In the exemplary embodiment, WebPhone codec 1320 is implemented in a modular fashion so that codecs may be replaced and updated with newer, more efficient compression/decompression algorithms via the Plug and Play protocol. A codec suitable for use with the present invention is the True Speech codec, version 8.5, commercially available from the DSP Group, Inc., Santa Clara, Calif. The True Speech codec is an enhanced linear predicative coding algorithm, specifically designed to efficiently encode and decode human speech data. The True Speech codec samples the digital sample stream from sound card 1200, and, using a look-up table-based algorithm, tries to predict the value of the next data sample in the digital data stream based on the history of prior data sample values. The compressed data stream comprises a combination of identifiers of the predicted sample values, as well as error values used to correct the predictive values. Accordingly, the amount of digital data actually transmitted to represent the audio signal is significantly reduced in comparison to transmission of the actual data samples generated by sound card 1200. The True Speech codec provides temporal, frequency domain compression of the digital data representing the audio signal.

Audio manager 1324 handles communication with the audio sound card 1200 and presents a common interface to media engine 1314. Audio manager 1324 interfaces with sound card 1200 through one or more application program interfaces. In the illustrative embodiment, audio manager 1324 utilizes low-level Microsoft Windows wave input/output routines to interface with MCI compliant sound cards. As with codecs 1320, audio manager 1324 may be implemented to adhere to the Plug and Play protocol so other compliant audio sound cards or circuits, such as those for the Apple Macintosh, commercially available from Apple Computer Company, Cupertino, Calif., or a Unix compatible sound card or circuit may interact with the audio manager 1324.

The WebPhone API 1326 enables the WebPhone to communicate with other WebPhones, connection and directory assistance servers, Internet gateway servers, credit processing servers, database access servers and other client processes implementing the WebPhone API. As illustrated in FIG. 13B, the WebPhone API utilizes sockets, i.e., a file handle or address indicating where data is to be sent, allowing WebPhone API enabled processes to reside on the same computer, on a local area network, on a wide area network, or over the Internet. A process 1328 communicates with the WebPhone API 1326 through a plurality of sockets 1322. The sockets 1322 are accessible by network 1330 through a number of protocols including Internet Protocol (IP) 1332, Transmission Control Protocol (TCP) 1334, Real-Time Protocol (RTP) 1336 and User Datagram Protocol (UDP) 1338. The WebPhone API provides remote command control of WebPhones and servers via the TCP. WebPhone API 1326 transfers real-time and streamed audio via the UDP protocol and real-time audio and video data via the UDP and RTP protocols. The WebPhone API utilizes TCP to transfer data of different types, i.e., file, image, graphics, etc. as well as to transfer streamline video and other multimedia data types, such as Java developed by Sun MicroSystems, Mountain View, Calif. In addition, the WebPhone API provides user definable commands and data types.

Figure 14:
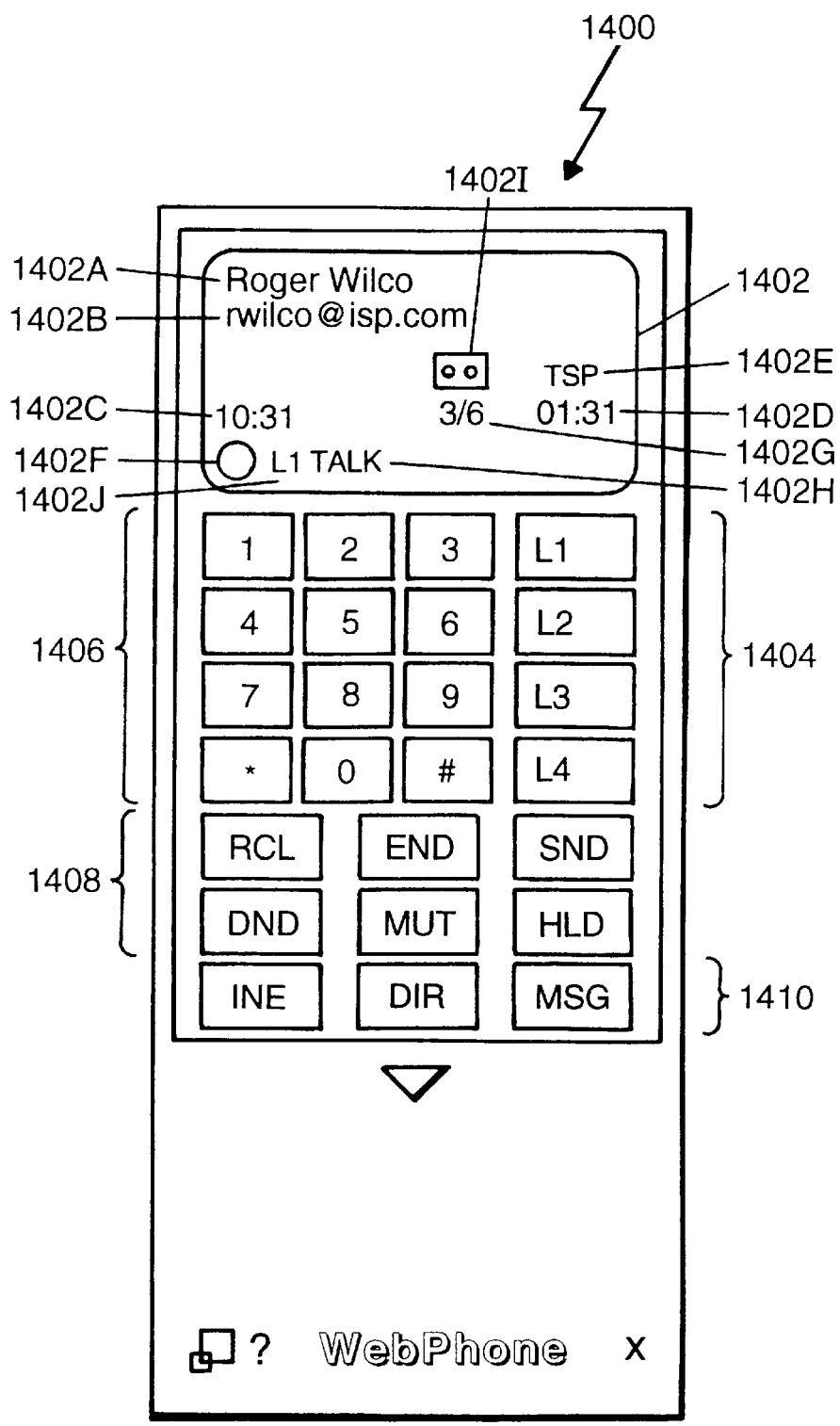
FIG. 14 is a screen capture illustrating an exemplary user interface of the present invention.

FIG. 14 illustrates the graphic display produced upon invoking the WebPhone application. Display 1400 is an alternative embodiment to that illustrated in FIGS. 5–6 with similar graphic elements, icons and display areas functioning as previously described with reference to FIGS. 5–6.

WebPhone Global Server

Having described the architecture of the WebPhone software which enables the first and second processing units to establish point-to-point communication over a network, a discussion of the global connection/information server is appropriate.

Figure 15A:
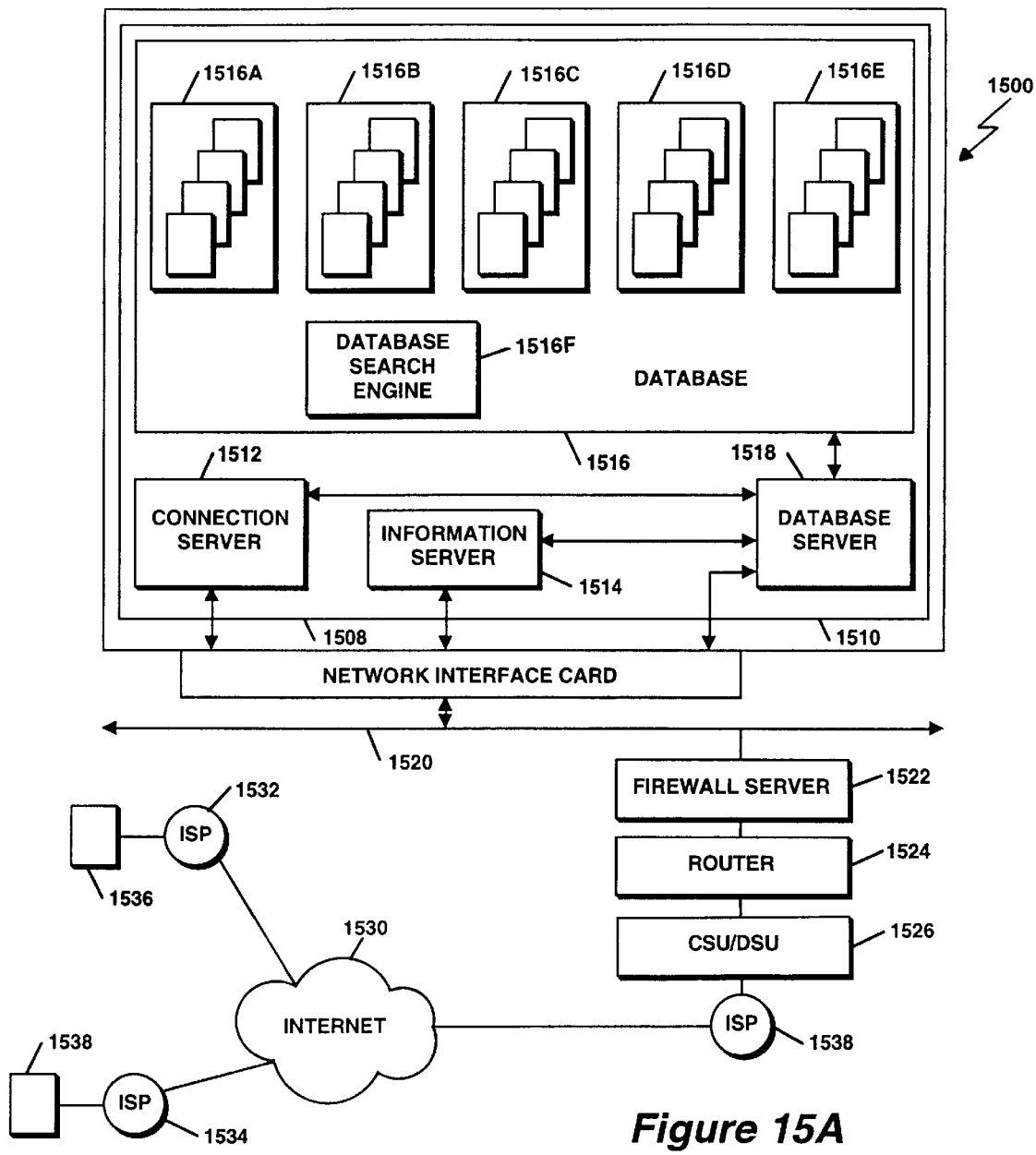
FIG. 15 is a schematic diagram illustrating the architecture of the connection server apparatus suitable for use with the present invention.

Referring to FIG. 15A, a network diagram, similar to that shown in FIG. 10, is illustrated, including a schematic diagram of the global server 1500 and the various devices operatively coupling server 1500 to the Internet 1530. A first processing unit executing the WebPhone application, hereafter referred to as WebPhone 1536, is coupled to Internet 1530 through an Internet service provider 1532. Similarly, a second processing unit executing the WebPhone application, referred to as WebPhone 1538, is coupled to the Internet 1530 by an Internet service provider 1534. Global server 1500 is coupled to Internet 1530 by an Internet service provider 1528, a CSU/DSU 1526, a router 1524, and a fire wall server 1522. In the illustrative embodiment, fire wall server 1522 and global server 1500 are connected through a local area network 1520. Network 1520 may be implemented with an Ethernet or other suitable transport for TCP/IP communications. However, as will be obvious to those recently skilled in the arts, server 1500 may be connected directly to fire wall server 1522.

In the illustrative embodiment, firewall server 1522 is a single firewall mechanism which protects unauthorized access from network 1530 into global server 1500. Firewall server 1522 may be implemented on a work station, such as a SPARC 5 or SPARC 20 server from Sun MicroSystems, executing a commercially available firewall software application such as Raptor, available from Raptor Systems. Essentially, the firewall server prevents unauthorized access into global server 1500 and thereby prevents destruction of any of the information contained therein by checking the source of requests for information to global server 1500.

Router 1524 translates logical addresses among networked topologies and may be implemented with any number of commercial router devices such as the CISCO model 2501 router executing CISCO 11.0 software, both commercially available from CISCO Systems, Inc., San Jose, Calif.

CSU/DSU 1526 (Channel Send Unit/Data Send Unit) functions as a sophisticated modem, converting network data to high speed serial data for transfer over a T1 or T3 line. Such high speed data is connected to another CSU/DSU, typically at the telephone company over the T1 or T3 line. An apparatus suitable for use in implementing CSU/DSU 1526 in the present invention is the AT&T Paradigm by AT&T Laboratories, Murray Hill, N.J.

FIG. 15A further illustrates a logical schematic of global server 1500. The server comprises a hardware platform 1508 on which an operating system 1510 executes. In the illustrative embodiment, hardware platform 1508 may comprise any number of commercially available high end work stations such as a DEC Alpha 4100 System, commercially available from Digital Equipment Corporation, Maynard, Mass., or a SPARC 5 or a SPARC 20, both commercially available from Sun Micro Systems, Mountain View, Calif. Operating system 1510, in the illustrative embodiment, may comprise the Unix, commercially available from Novell, Windows NT, commercially available from Microsoft Corporation, or Solaris, commercially available from Sun MicroSystems, Inc. Executing on operating system 1510 are a number of processes including connection server 1512, information server 1514, database server 1518 and database 1516.

Connection Server

Connection server 1512 provides a directory information service to WebPhone client processes currently on-line with respect to the computer network. Connection server 1512 behaves like a virtual machine within global server 1500 and interacts with database 1516 through database server 1518 and with network interface card 1540 through the WebPhone API. The basic function of connection server 1512 is to provide a one-to-one mapping between an identifier of a WebPhone client process, such as a E-mail address, and the current IP address, dynamic or fixed, associated with that WebPhone client process.

As described in further detail hereinafter, when a WebPhone client transmits a <CONNECT REQ> packet to global server 1500, an E-mail address such as "Shane@netspeak.com" is provided to connection server 1512. Connection server 1512 then compares the E-mail address with the values of the records contained in on-line table 1516B and, if a match occurs with one of the records contained therein, transmits the value of the Internet Protocol address associated with that record to the requesting WebPhone client, i.e., a one-to-one matching between E-mail addresses and Internet Protocol addresses.

Figure 16A:
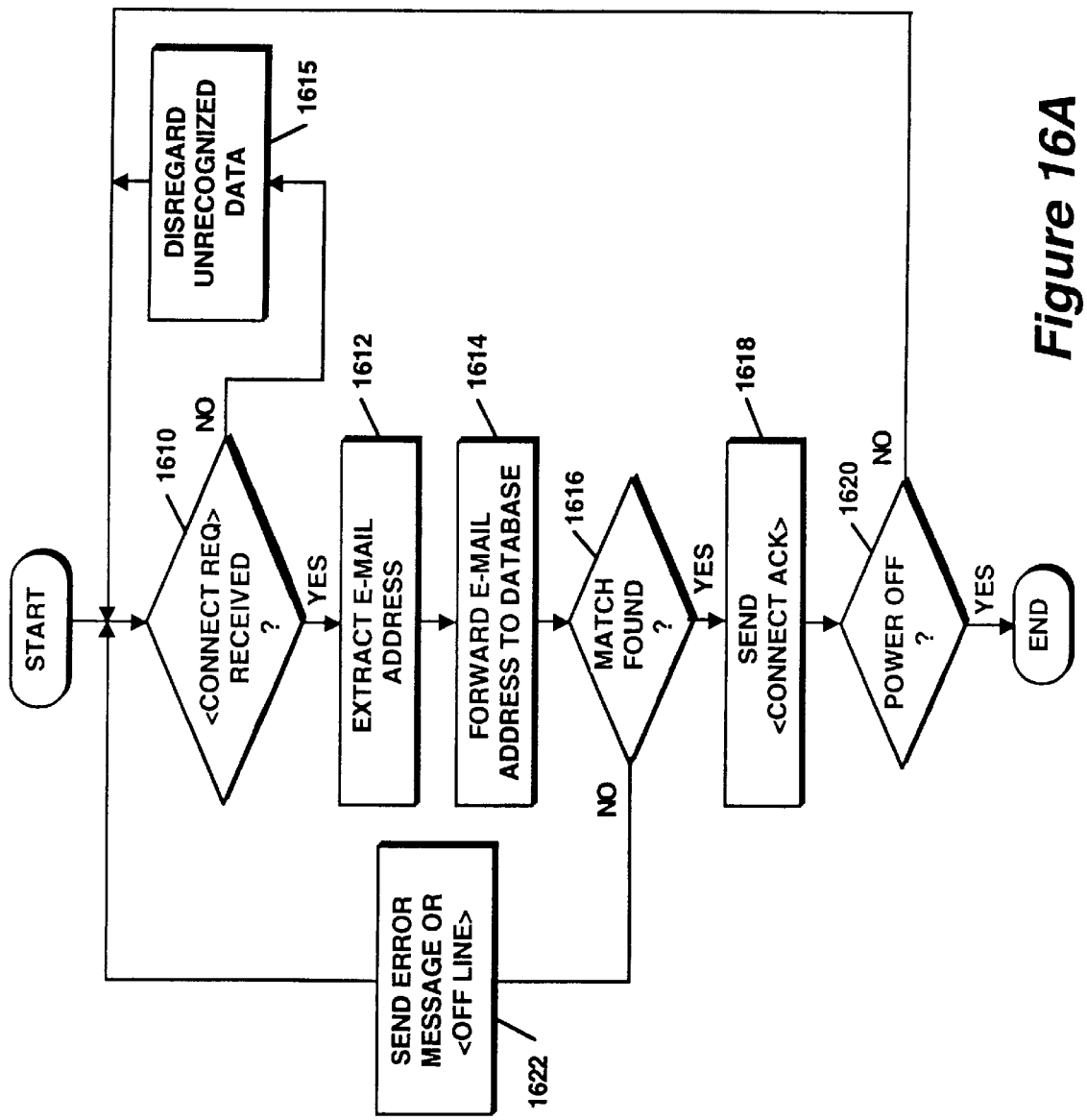
FIG. 16A is a flowchart illustrating the process steps performed by the connection server in accordance with the present invention.

Referring to FIG. 16A, a flow chart illustrating the basic process steps used by connection server 1512 to implement a one-to-one mapping of E-mail addresses to Internet Protocol addresses in accordance with the present invention is illustrated. The coding of the process steps of the flowchart of FIG. 16A into instructions suitable to control global server 1500 will be understandable by those having ordinary skill in the art of programming. Connection server 1512 remains in an idle state until a <CONNECT REQ> packet is transmitted from a WebPhone client to global server 1500, as illustrated by decisional block 1610 of FIG. 16A. Upon receipt of the packet, connection server 1512 extracts the E-mail address from the packet and supplies the E-mail address to database server 1518 which them communicates using the ODBC standard with database 1516 to perform a search of On-line Table 1516B, as illustrated by process blocks 1612 and 1614. Database 1516 performs a search of on-line Table 1516B and supplies the current Internet Protocol address of the WebPhone client associated with the E-mail address to connection server 1512, via database server 1518. If a corresponding Internet Protocol address is found for the E-mail address contained in the query, connection server 1512 supplies the Internet protocol address to the requesting WebPhone client by transmitting a <CONNECT ACK> packet, as illustrated by decisional block 1616 and process block 1618. If, however, there is no Internet Protocol address associated with the queried E-mail address or the WebPhone client is off line, connection server 1512 will send an <OFFLINE> packet to the WebPhone client, as illustrated by process block 1622. Connection server 1512 will return to an idle state to await the receipt of another <CONNECT REQ> packet, as illustrated by FIG. 16A. A description of the above described packets as well as a diagram illustrating the packet transfer sequence between a WebPhone client and global server 1500 can be found with reference to Tables 7–8 and FIG. 17A, respectively.

Information Server

Figure 16B:
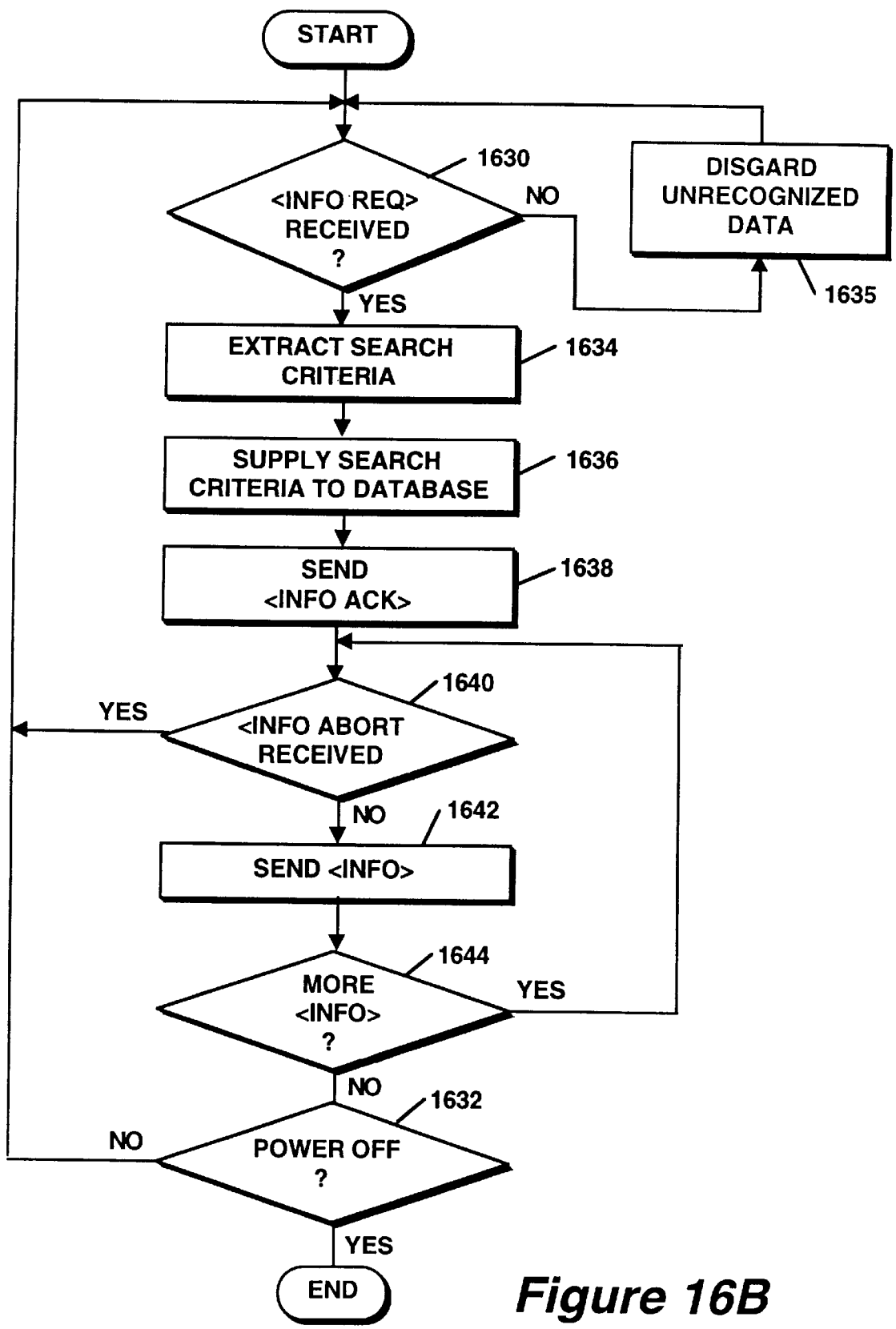
FIG. 16B is a flowchart illustrating the process steps performed in accordance with the information server of the present invention.

Information server 1514 provides an interface between requests from WebPhone client processes and database 1516. Information server 1514 includes code written to extract the search criteria from an <INFO REQ> packet and supply the search criteria to the database search engine of database 1516 using the ODBC standard. In particular, referring to FIG. 16B, a flow chart illustrating the basic process steps used by information server 1514 in performing information/directory service functions in accordance with the present invention is illustrated. The coding of the process steps of the flow chart into instructions suitable for execution by global server 1500 will be understood by those having ordinary skill in the art of programming. Information server 1514 remains idle until an <INFO REQ> packet is received from a WebPhone client process, as illustrated by decisional step 1630. Next, information server 1514 extracts the data elements defined within the <INFO REQ> packet and supplies them to database server 1518 which, in turn, forward them to database 1516, as represented by the process step 1634 and 1636. The search engine contained within database 1516 performs the search and supplies to information server 1514 all client records meeting the search criteria specified in the <INFO REQ> packet, or a message indicating that no records were found. Next, information server 1514 transmits a <INFO ACK> packet to the WebPhone client process indicating the number of records satisfying the search criteria, as indicated by process step 1638. The WebPhone client may wish to receive all records satisfying the search criteria, or, if the number is excessively large, may desire to further refine the search by transmitting a <INFO ABORT> packet to information server 1514 and defining new search parameters to be sent with a subsequent <INFO REQ> packet. If a <INFO ABORT> packet is received by information server 1514, the process will return to an idle state, as illustrated by decisional block 1640. If no <INFO ABORT> packet was received, information server 1514 will transmit one or more <INFO> packets to the requesting WebPhone client until all records have been received by the WebPhone client, as illustrated by process step 1642. Information server 1514 will return to an idle state awaiting another <INFO REQ> packet, as illustrated in FIG. 16B. A description of the packets comprising the WebPhone protocol is illustrated in Tables 7–8 and a diagram illustrating the packet transfer sequence defined in FIG. 17A–B.

Network interface card 1540 interfaces with connection server 1512, information 1514, and database server 1518 using the WebPhone API definition, as described herein, and the Windows Sockets 1.1 Protocol, or, in a Unix-based operating system, Berkeley Sockets Network API. Network interface card 1514 may comprise, in illustrative embodiment, an Ethernet card capable of transmitting data at rates of 100 Mbps or greater, such cards being commercially available through a number of different vendors.

The connection from CSU/DSU 1526 to ISP 1528 may comprise a TI connection, i.e., a long-distance, digital, point-to-point communication circuit capable of transmitting a signal at 1.544 Mbps with 24 channels at 64 Kbps. Alternatively, a T3 connection may be used, i.e., a connection is similar to a T1 connection except it is capable of transmitting at 44.746 Mbps per second with up to 28 T1 channels. Other connections may be suitable, depending on specific requirements and availability.

Database

Database 1516 of global server 1500 may be implemented with any of a number of commercially available structured query language (SQL) database engines, such as Oracle 7.x, Informix, or Microsoft SQL server 6.x. The SQL database resides on a RAID 1 and RAID 5 mirrored disk array. As will be explained hereinafter, database 1516 interacts with control server 1512 and information server 1514 through database server 1518. In the illustrative embodiment, database 1516 comprises a Client table 1516A, an On-line table 1516B, a WebBoard table 1516C, a WebBoard configuration table 1516D and a WebBoard Source table 1516E.

Client table 1516A comprises a plurality of records, each of which may have the fields and corresponding data elements as described in Table 1. Each WebPhone user, hereinafter "client," has a separate record in table 1516A containing the information defining the client's profile of personal information. In Table 1, the "activated," "paid," and "published" fields are boolean yes/no fields. The "id" field comprises a unique ID sequence identifying a particular WebPhone client. The "activation date," "address change date," and "access date" fields are time references measured in seconds since 00:00 Coordinated Universal Time (UTC), Jan. 1, 1970. The "IPAddr" field represents the Internet protocol address of the WebPhone client and, if unknown, has a default value of 0.0.0.0. The database record containing a WebPhone client's profile, is defined upon first logging-on to global server 1500 and may be updated each time a WebPhone user's profile changes, as explained hereinafter.

The On-line table 1516B provides a dynamic list of those clients from 1516A who are currently On-line, as well as their current Internet protocol address. On-line Table 1516B comprises a plurality of records each of which may have the fields and data types illustrated in Table 2. The record entries of On-line table 1516B are used by connection server 1512 and information server 1514, as explained hereinafter, to provide a directory of those WebPhone client processes currently having on-line status with respect to the computer network.

The WebBoard™ is a virtual multimedia billboard which is transmitted as a series of multimedia data files to WebPhone client processes while the WebPhone application is activated. An extensive description of the WebBoard utility and its operation can be found in copending U.S. patent application Ser. No. XX/XXX,XXX entitled Method and Apparatus for Distribution of Multimedia Data Over a Computer Network by Mattaway et al., commonly assigned, the subject matter of which is incorporated herein by reference.

A number of tables are associated with the WebBoard functionality including WebBoard table 1516C, a WebBoard configuration table 1516D, and a WebBoard source table 1516E. WebBoard table 1516C includes a plurality of records each describing a specific WebBoard and having the field and data types illustrated in Table 3. The "id" field of Table 3 provides a unique identification number for the WebBoard file. The "imageType" field defines the video format of the image such as JPEG, TIF, GIF, etc. The "audio" field defines the nature of the audio file, e.g. a .wav file or a MIDI file, while the "audioType" field defines the codec, if any, used to compress/decompress the audio file. The "hits" field defines the number of times the WebBoard has been selected by WebPhone clients, while the "hits profile" field defines the file name of the file identifying those WebPhone clients generating hits to the subject Web-Board.

The WebBoard configuration table 1516D may have at least one record having the fields and data types illustrated in Table 4. The count field represents the number of Web-Board records currently in the table 1516C.

The WebBoard source table 1516E may comprise a plurality of records each having the fields and data types defined in Table 5. The "URL" field of Table 5 defines a data link in accordance with Uniform Resource Locator protocol to the home page or Web site of the source. In the illustrative embodiment, any entity, including vendors, advertisers, individuals or groups wishing to post information or having a Web site or home page may have a WebBoard displayable through the present invention.

Database Server

Database server 1518 serves as the interface between database 1516 and connection server 1512 and information server 1514. Specifically, connection server 1512 and information server 1514 communicate with database engine 1518 through application program interfaces embedded in the code implementation of both the connection server and the information server. Database server 1518 communicates with database 1516, in the illustrative embodiment, using the open database connectivity (ODBC) standard, developed by Microsoft Corporation, Redmond, Wash. Database server 1518 functions to supply structured database queries to database 1516 and to supply the results therefrom to connection server 1514 and information server 1512. In the illustrative embodiment, database server 1518 may be implemented as a "virtual machine" executing on global server 1500, or, alternatively, may be implemented on a separate computer system such as a DEC Alpha 4100 Workstation executing DEC Unix operating system, both available from Digital Equipment Corporation, Maynard, Mass. Database server 1518 communicates with network interface card 1518 using the WebPhone Application Program Interface described herein.

Global Server Network

Figure 15B:
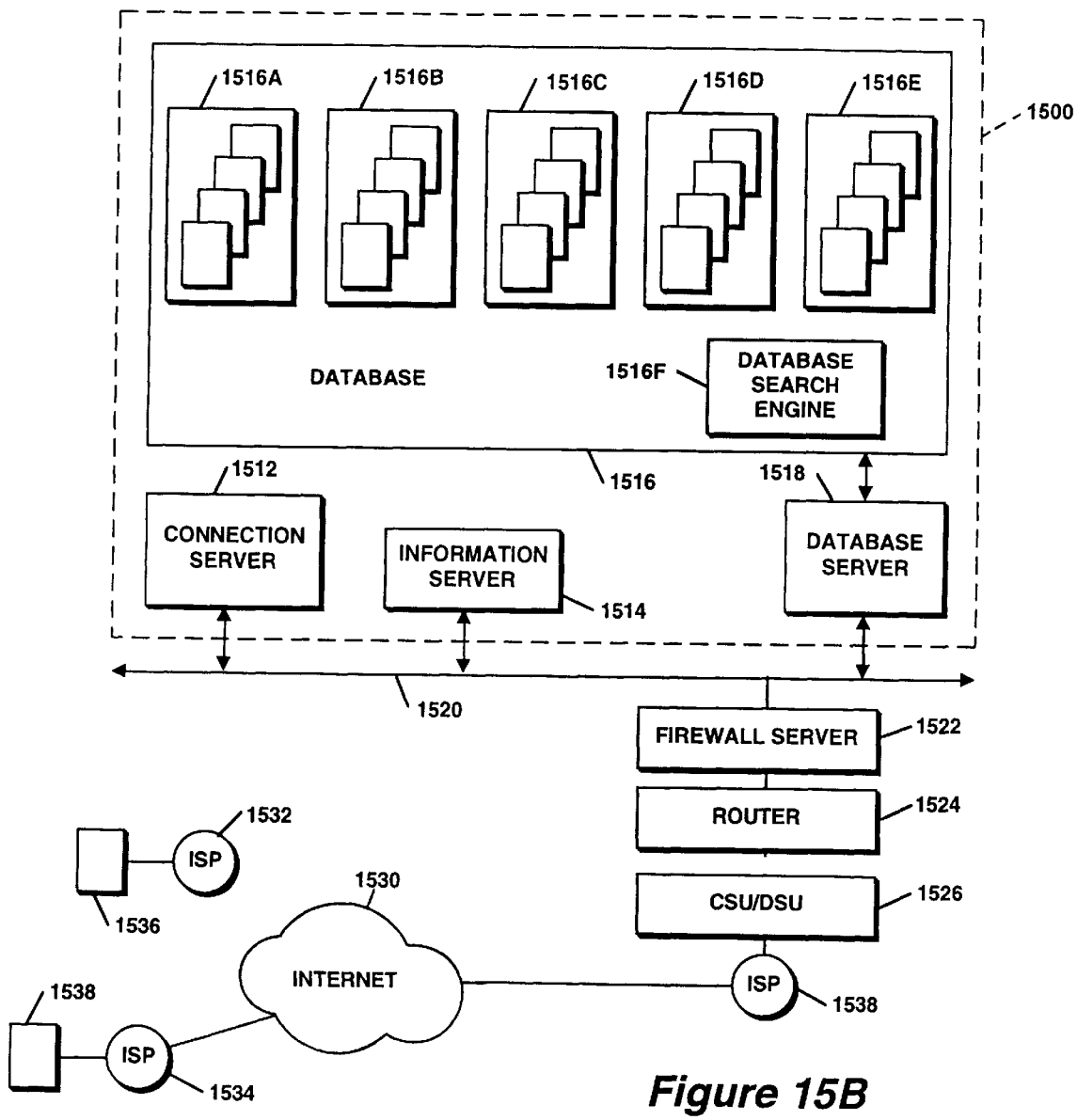

In the illustrative embodiment, global server 1500 is implemented as a single server apparatus on which a plurality of "virtual machines" execute simultaneously. However, it will be obvious to those reasonably skilled in the art that a plurality of separate servers, one dedicated to each of connection server 1512, information server 1514, and database server 1518 may be interconnected to database 1516 and to each other using a local area network, to form a composite "virtual" global server, as illustrated by FIG. 15B, the construction of the system illustrated in FIG. 15B being within the knowledge of those reasonably skilled in the art in light of the descriptions contained herein.

Figure 15C:
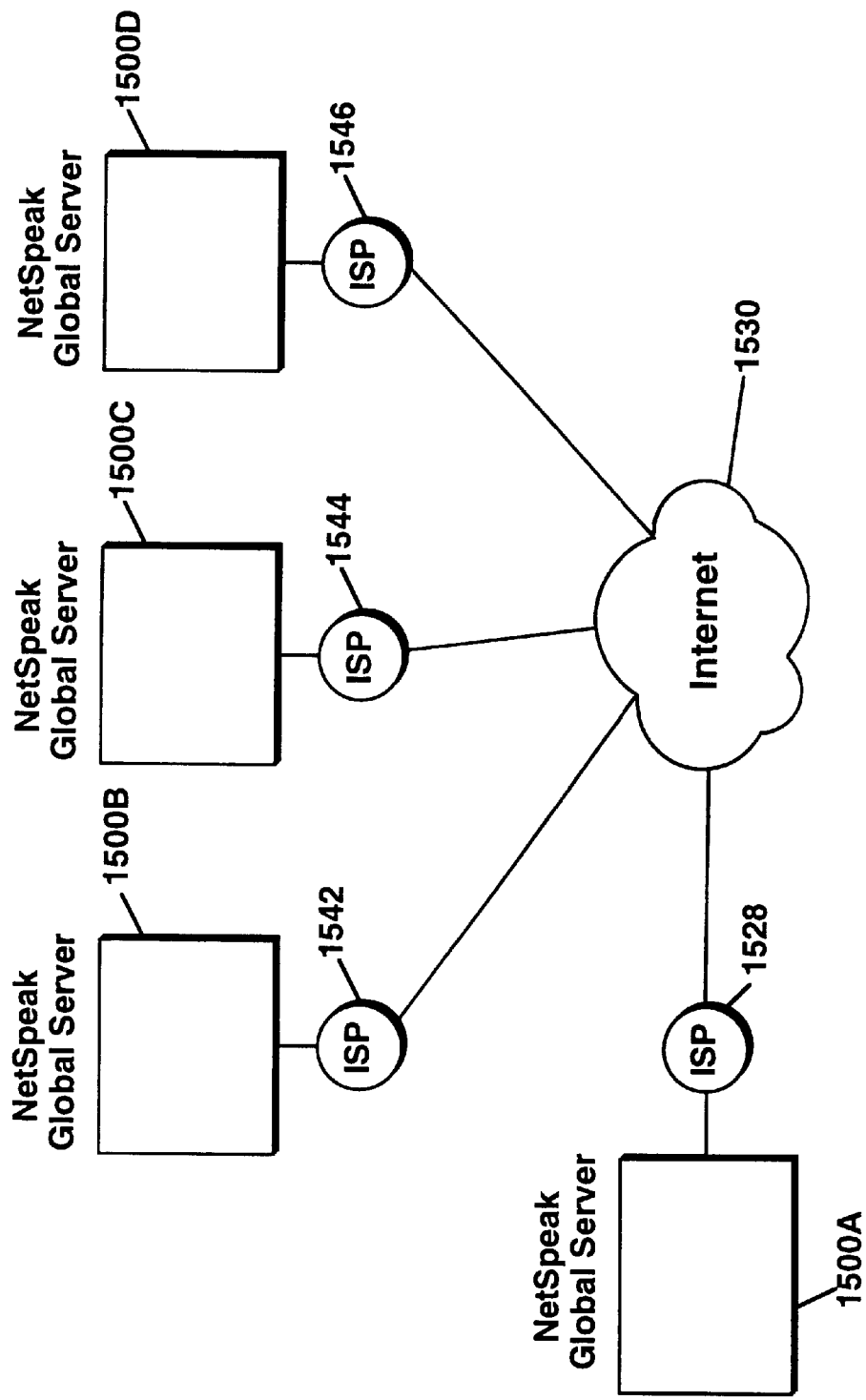

It is further contemplated within the present invention that more than one global server 1500 may be utilized, as illustrated by FIG. 15C. In this implementation, multiple global servers 1500A–D are maintained for fault tolerant load sharing, each one performing the above-described connection server, information server and database server processes. Each of global servers 1500A–D are connected to the Internet via a separate T1 or T3 connection to different Internet service providers, and are synchronized with each other via database server replication. In such an embodiment, multiple global servers may be located in close proximity or in geographically disparate locations. In such an embodiment, the WebPhone application is provided with the network address information of each global server 1500A–D. In the event that any one of the global servers initially contacted is nonresponsive the WebPhone application will attempt connection to one or more of the remaining global servers to obtain directory and information services.

Further, in an implementation with multiple global servers, if the initially contacted global server is unable to accommodate a WebPhone client request, or, is not geographically convenient, the global server can provide the network address of another global server capable of servicing the WebPhone client's request or which is logically more convenient. This process may occur during the initial log-in of the WebPhone client process, as described with references to messages 1–5 of FIG. 17A.

As previously described, if none of the global servers are available, the WebPhone application can rely on the secondary Internet Protocol technique in which a WebPhone client process sends its current dynamically assigned Internet Protocol address to a prospective WebPhone callee through an E-mail message, as described herein.

WebPhone Protocol

Prior to describing the interaction of the connection server 1512 and information server 1514 with WebPhone client processes, a description of the WebPhone protocol by which the WebPhone client processes and the global server 1500 communicate is appropriate. Tables 6–7 below illustrate the packet definitions of the packets comprising the WebPhone protocol (WPP) including the packet type, the direction and the data elements comprising each packet. In Tables 6–7 the symbol "→" indicates a packet transmitted by a WebPhone client process, while the "←" symbol indicates a packet transmitted by the global server. Tables 8–9 define the data elements described in Tables 6–7. In Tables 6–9, the terms "ULONG" and "UNSIGNED LONG" designate an unsigned long integer value, i.e., 32-bit integer value. Similarly, the terms "USHORT" and "UNSIGNED SHORT" designate an unsigned short integer value, i.e., 16-bit integer value. The term "CHAR" designates a single character, typically assuming a binary value of either 1 or 0. The term "VARCHAR(X)", where X is an integer, value symbolizes a variable length character string, with the number of characters indicated with the integer value. The term "UNSIGNED CHAR" designates an 8-bit character code, i.e., no sign bit. Finally, the term "variable" indicates a variable length data field.

Figure 17A:
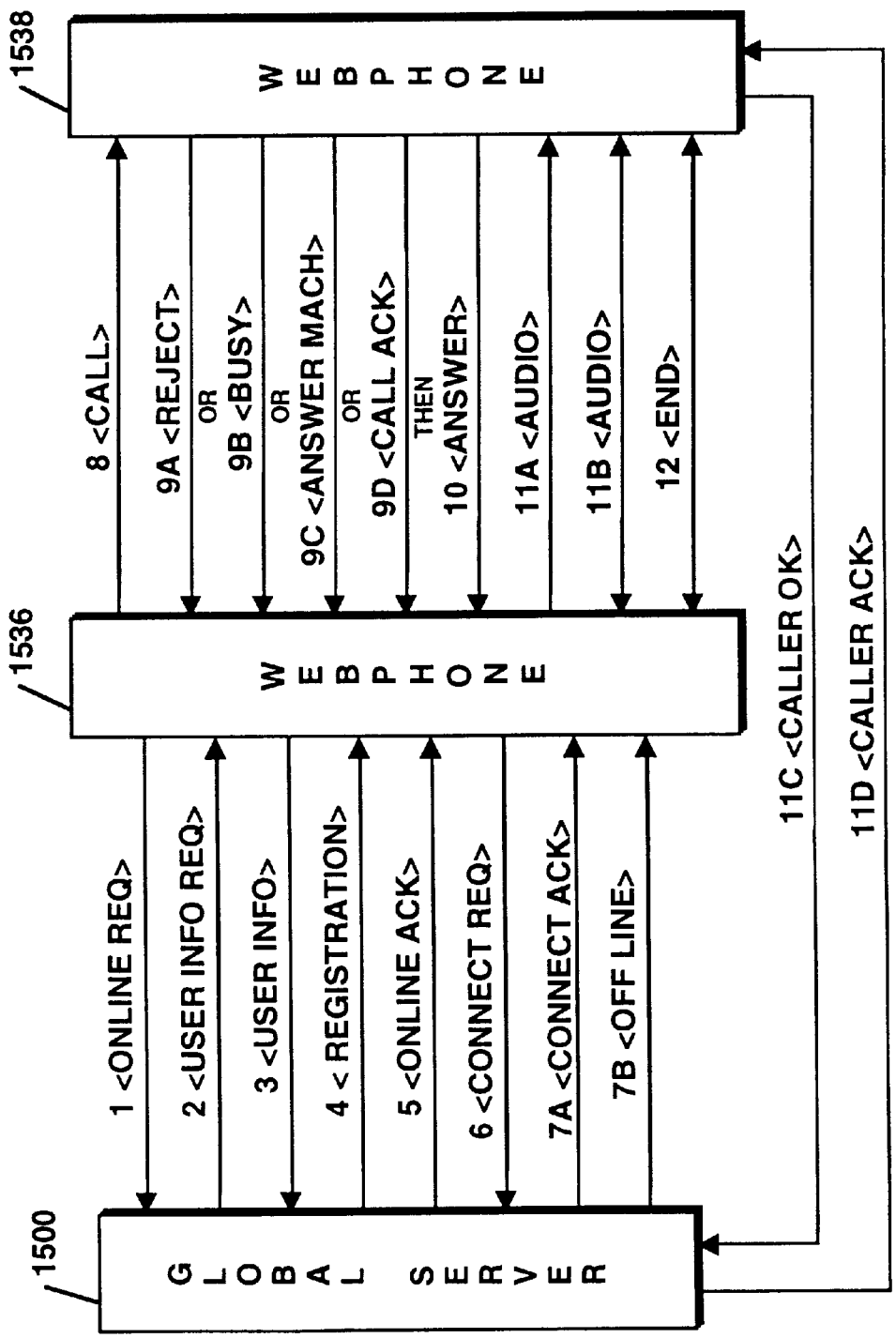
FIGS. 17A–B are schematic block diagrams illustrating of the packet transfer sequence in accordance with the communication protocol of the present invention.

FIG. 17A illustrates a schematic block diagram of a packet transfer sequence between a pair of WebPhone client processes and the global server, in accordance with the present invention. Each WebPhone application, also referred to as a WebPhone client process, connects to global server 1500 upon start up to inform global server 1500 that the WebPhone client process is on-line and available to make and/or receive calls. Specifically, as illustrated in FIG. 17A, WebPhone 1536 opens a socket to the global server 1500 and transmits an <ONLINE REQ> packet from WebPhone 1536 to Global server 1500, as illustrated by message 1 and FIG. 17A. The <ON LINE REQ> packet may have the format and data illustrated in Table 6, and additional Feature bits which define the functionality of the WebPhone application, as explained in greater detail hereinafter. In response, connection server 1512 and information server 1514 of global server 1500 use the information contained in the <ONLINE REQ> packet to update the status of database 1516. In the event that the WebPhone client process is logging on for the first time, global server 1500 returns to the WebPhone 1536 a <USER INFO REQ> packet, as illustrated by message 2 of FIG. 17A. The <USER INFO REQ> packet includes the elements as defined in Table 9. In response, WebPhone 1536 returns a <USER INFO> packet as illustrated by message 3 of FIG. 17A. The <USER INFO> packet contains the data elements defined in Table 8. Connection server 1512 and information server 1514 of global server 1500 utilize the data in the <USER INFO> packet to update database 1516. Specifically, information server 1514 utilizes such data to create a record in client table 1516A representing WebPhone 1536. Next, global server 1500 transmits to WebPhone 1536 a <REGISTRATION> packet, as illustrated by message 4 of FIGS. 17A. The <REGISTRATION> packet contains the data described in Table 7 plus Feature bits, as described hereinafter. The <REGISTRATION> packet returned to WebPhone 1536 enables certain functions within the WebPhone architecture based on predetermined criteria, for example, whether the user has paid for the product, or which version of the product the user possesses. Following the <REGISTRATION> packet, global server 1500 further transmits an <ONLINE ACK> packet, as illustrated by message 5 of FIG. 17A. Prior to transmission of the <ONLINE ACK> packet, connection server 1514 updates database 1516, specifically On-line table 1516B to indicate that WebPhone 1536 is on-line with respect to the computer network. Upon receiving the <ONLINE ACK> packet, WebPhone 1536 closes the socket to global server 1500.

In the event WebPhone 1536 had previously registered with global server 1500, only messages 1 and 5 are required to establish WebPhone 1536 as being on-line. If WebPhone 1536 had new user information to supply to global server 1500, then packet sequence illustrated by messages 3 and 4 would occur.

Although the packet sequence illustrated by messages 1–5 is described with reference to WebPhone 1536, WebPhone 1538 interacts in a similar manner with global server 1500 to establish on-line status. No further interaction occurs between the respective WebPhone client processes and the global server unless the WebPhones require directory or search assistance about a prospective callee.

In one calling scenario, a WebPhone user knows the E-mail address of another WebPhone user to which he/she wishes to establish a point-to-point communication, however, the current dynamically assigned Internet protocol address of the callee is unknown to the caller. In this scenario, the user of WebPhone 1536 requests assistance from global server 1500 to obtain the current dynamically assigned Internet Protocol address of the prospective callee WebPhone. First, the user of WebPhone 1536 specifies the callee by entering all or part of the callee party's name or alias in the party name field area of the graphic user interface. If the party is not in the WebPhone user's local directory, the IP address or E-mail address of the callee WebPhone may be entered into the number field area of the graphic user interface, followed by activation of the send button or icon on the graphic user interface. As a result, WebPhone 1536 opens a socket to global server 1500 and transmits a <CONNECT REQ> packet having the format described in Table 6. Connection server 1512 of global server 1500 utilizes the value of the E-mail address specified in the <CONNECT REQ> packet to perform a one-to-one mapping in the on-line table 1516B to determine the current Internet Protocol address of the indicated callee, as illustrated by the flowchart of FIG. 15A. Once this mapping is performed, the server 1500 transmits to WebPhone 1536 a <CONNECT ACK> packet, as indicated by message 7A of FIG. 17A. The <CONNECT ACK> packet has the format and content as illustrated in Table 6 and includes the IP address of the callee as well as information such as an error code to indicate that no WebPhone application is associated with that callee. Alternatively, if the selected callee is off line, global server 1500 transmits to WebPhone 1536 an <OFF LINE> packet to indicate that the desired party is not on-line, as illustrated by message 7B of FIG. 17A. Following the receipt of either a <CONNECT ACK> or an <OFF LINE> packet by WebPhone 1536, the socket to global server 1500 opened by WebPhone 1536 is closed.

If the current Internet Protocol address of the callee was returned from global server 1500, the packet transmission sequence illustrated between WebPhones 1536 and 1538 of FIG. 17A transpires. Whether a calling WebPhone knows the Internet Protocol address of the callee WebPhone, as in the case of a fixed Internet Protocol address, or obtains the Internet Protocol address from global server 1500, as previously described, the calling sequence to establish a call occurs as follows. WebPhone 1536 opens a socket to WebPhone 1538. Next, WebPhone 1536 transmits to WebPhone 1538 a <CALL> packet as illustrated by message 8 of FIG. 16A. The <CALL> packet has the format illustrated in Table 6 and may, optionally, include information identifying the compression/decompression (codec) used by the caller WebPhone. In response to the <CALL> packet, WebPhone 1538 may return with a number of different packets, as illustrated by messages 9A–D. First, callee WebPhone 1538 may respond to caller WebPhone 1538 with a <REJECT> packet, as illustrated by message 9A, indicating that the callee WebPhone does not wish to be disturbed, e.g. total call blocking, or, that the callee WebPhone does not wish to talk to caller WebPhone, e.g. party specific or group specific call blocking. In the event of party or group specific call blocking, the user information contained within the <CALL> packet of message 9A is compared by the caller WebPhone application to a predefined list of WebPhone user information profiles which the callee does not wish to converse, such list having been predefined by the callee in the WebPhone user's personal directory, as explained hereinafter. Upon receiving the <REJECT> packet the caller WebPhone annunciates the result to the user and the socket to the callee WebPhone is closed.

Alternatively, callee WebPhone 1538 may return a <BUSY> packet, as illustrated by message 9B of FIG. 17A. The <BUSY> packet indicates that the callee WebPhone is currently utilizing all available lines within its WebPhone application.

A further possible response from callee WebPhone 1538 is to issue an <ANSWER MACH> packet, as illustrated by message 9C of FIG. 17A. The <ANSWER MACH> packet includes data indicating whether the machine is capable of receiving voice mail type messages, as described in greater detail in copending U.S. patent application Ser. No. XX/XXX,XXX entitled "Method and Apparatus for Providing Caller Identification Based Out-Going Messages in a Computer Telephony Environment," by Mattaway et al., commonly assigned and incorporated herein by reference.

The preferred response by callee WebPhone 1538 is to transmit a call acknowledge <CALL ACK> packet, as illustrated by message 9D of FIG. 17A. The <CALL ACK> packet has the data content illustrated in Table 6. Both the <CALL> and <CALL ACK> packets contain the information of the WebPhone users sending the packet. This information is useful by the recipient of the packet for a number of purposes. For example, the user information is displayed on the enunciator area of the WebPhone graphic display to identify the party placing the call. Second, the user may select such information and, using the drag and drop functionality of the WebPhone graphic user interface, add the user information to the callee WebPhone user's personal directory resident within his/her specific WebPhone application. In such a manner, both parties are completely identified to each other prior to commencing audio communications. The transmission of complete caller identification information with the <CALL> and <CALL ACK> symbols packets enables such functions as individual or group specific call blocking, party specific outgoing messages, visual caller identification, and party specific priority ringing and sound effects, as explained herein.

Following transmission of <CALL ACK> packet by callee WebPhone 1538, the callee WebPhone further transmits an <ANSWER> packet to caller WebPhone 1536, as illustrated by message 10 of FIG. 17A. Like the <BUSY> packet, the <ANSWER>packet is essentially empty, containing nothing more than a session ID number which is unique to the call. The socket previously opened by caller WebPhone 1536 over which the forgoing packets were transmitted remains open for the transmission of control information between caller WebPhone 1536 and callee WebPhone 1538. Such control information may comprise an <END> packet signaling the end of a call, a <HOLD> packet indicating that one of the parties to a call has placed the call "on hold" or other packets related to advance functionality of the WebPhone architecture. In addition, caller WebPhone 1536 opens a second socket to callee WebPhone 1538 over which the respective WebPhones may exchange <AUDIO> packets, as illustrated by messages 11A–B of FIG. 17A. The <AUDIO> packets have the data content illustrated in Table 6. The WebPhone application enables the parties to converse in real-time, telephone quality, encrypted audio communication over the Internet and other TCP/IP based networks. If both WebPhone client processes are utilized with full duplex sound cards, such as that illustrated in FIG. 12, the WebPhone users may transmit and receive audio packets simultaneously, similar to normal telephone conversation. However, if the WebPhone client processes are used with half duplex sound cards, a WebPhone user may only transmit or receive audio data simultaneously, similar to a speaker phone. Exchange of <AUDIO> packets continues until either the callee WebPhone or the caller WebPhone transmits an <END> packet, as illustrated by message 12 of FIG. 16A. Following the receipt of an end packet, the WebPhone client process will cease to accept subsequent audio packets.

Following either transmission or receipt of an <END> packet by the caller WebPhone, the socket opened by the caller WebPhone to the callee WebPhone over which real-time audio communication occurred is closed. Similarly, the previously opened socket over which control information was transmitted between the callee and caller WebPhones is likewise closed.

Figure 17B:
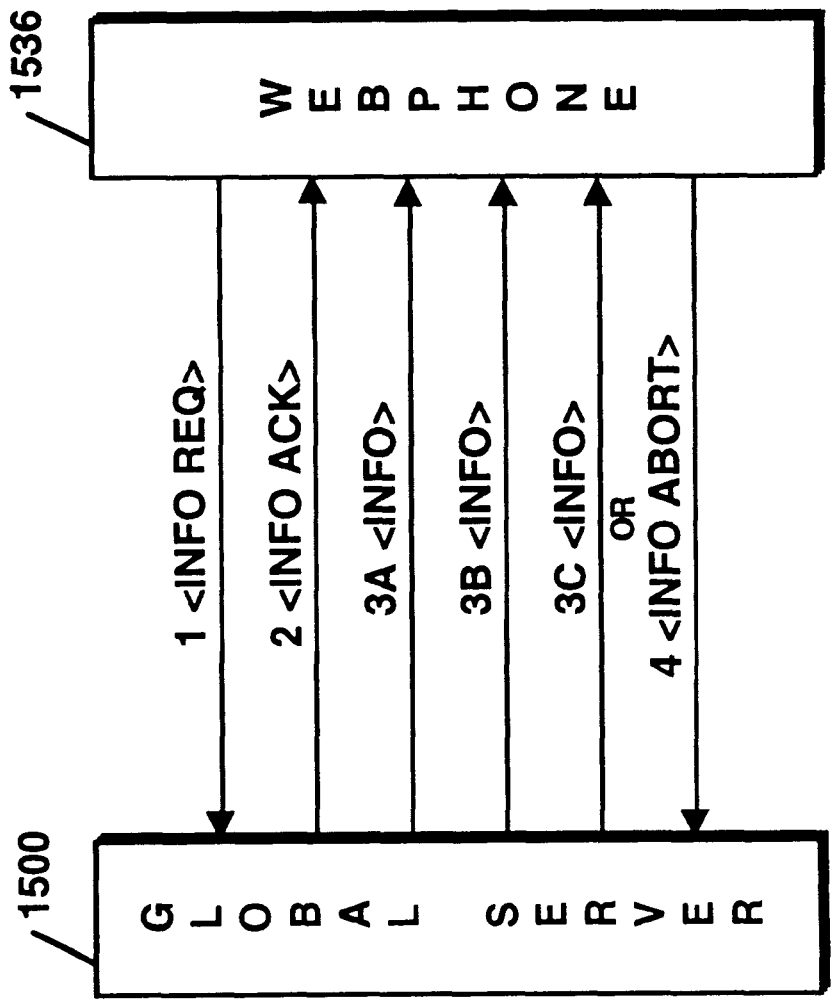

Referring now FIG. 17B, if a WebPhone caller seeks to determine whether a prospective WebPhone callee is connected to the computer network, but, has little information regarding the client process, information server 1514 may be utilized as described. The WebPhone user defines One or more of the first name, last name, company, city, state, or country values of the Query field contained within the <INFO REQ> packet sends the packet to the global server. WebPhone 1536 opens a socket to global server 1500 and forwards <INFO REQ> packet to global server 1500, as illustrated by message 1 of FIG. 17B. Information server 1514 extracts the values specified the query field of the <INFO REQ> packet and queries the database 1516, as previously described with reference to FIG. 16B. Global server 1500 then transmits a <INFO ACK> packet back to WebPhone 1536, as illustrated by message 2 of FIG. 17B. The <INFO ACK> packet has the format and data elements indicated in Table 7, including the number of parties satisfying the search criteria, specified in the <INFO REQ> packet. If the user of WebPhone 1536 wishes to receive the number of parties satisfying the search criteria global server 1500 automatically transmits to WebPhone 1536 one or more <INFO> packets, as illustrated by messages 3A–C of FIG. 17B. The <INFO> packet has the format and data elements as described in Tables 6–7. At any time following transmission of the <INFO ACK> packet, WebPhone 1536 may transmit an <INFO ABORT> packet to either prevent transmission of any <INFO> packets or to stop transmission of any remaining packets, as illustrated by message 4 of FIG. 17B. The <INFO ABORT> packet has the for mat and data elements as described in Table 6–7.

Once the user receives the information contained within the <INFO> packets satisfying the search criteria, the user may store such information in his/her personal WebPhone directory by dragging and dropping the information from the annunciator area to the direction dialog box using the WebPhone GUI.

The methods and apparatus described herein provide computer users with a powerful protocol in which to directly establish real-time, point-to-point communications over computer networks directly without server required linking. The a directory server assists in furnishing the current dynamically assigned internet protocol address of other similarly equipped computer users or information about such users.

WebPhone Graphic User Interface

Referring again to FIG. 14, the WebPhone GUI 1400 consists of a main window which has the look of a modern cellular flip phone and a set of dialog boxes launched from window. Operation of the WebPhone is controlled by selecting objects, i.e., buttons, text and images, and dragging objects, i.e., lines, parties, messages, etc., as explained hereinafter.

WebPhone GUI 1400 comprises a plurality of visual objects, including display 1402, number pad 1406, line pad 1404, call function buttons 1408, phone function buttons 1410 and audio controls (not shown). Display 1402 provides a number of distinct area for presentation of entering of information useful in operation of the WebPhone application. A party name field 1402A displays the name of the caller when an incoming call arrives and may also be used for entering the name of a party, up to 25 characters. By entering the name of a party in the party name field 1402A and pressing one or more of the phone function buttons 1410, various activities may be accommodated. For example, entering the name of a party in the party name field and pressing the [SND] button causes the WebPhone to first search the personal information directory for the information profile of the party entered. If such party's information is not already resident in the personal information directory, the WebPhone will open up a directory assistance dialog allowing the user to enter information to be submitted to the information server 1514 for searching, as described previously. Further, clicking the entered party name with the right mouse button causes a dialog box to appear enabling the user to modify the current directory entry, if any, for the party entered.

Entering the IP address of a party in the party IP address field followed by the [SND] button causes initiation of a call. If the callee's name exists within the caller's personal directory, or the call is established, the callee's name will appear in a party name field for caller ID purposes.

The third line of the display 1402 serves as a status annunciator line for displaying iconic feedback about the status of events within the WebPhone. Such status icons may include icons indicating enablement of call forwarding, call blocking, do not disturb, priority ringing, file transfer occurring, voice mail transfer occurring or call camping.

The line number annunciator indicates the line, i.e., lines 1–4, currently active, as illustrated by annunciated field 1402J. A main LED 1402F indicates when a line is active by changing color. Time field 1402C displays the local time when no lines are active. When one of the lines L1–L4 are active, time field 1402C displays the callee party's time. By single clicking the time field the user can cycle through the two different time values.

The line status field 1402H displays the status of the currently selected line, illustrated in FIG. 14 as displaying "talk" status. A call duration field 1402D displays the elapsed time in minutes and seconds since the currently displayed call commenced.

The V-mail field 1402G displays the number of the new voice mail messages and the total number of voice mail messages received.

When one or more call functions such as call conferencing, call blocking, priority ringing, call camping, or call forwarding are activated, the list of those parties within the WebPhone personal directory having such functionality active for their information profile can be viewed in the party name field by selecting a list arrow (not shown) icon which appears whenever one of the previously described functions is activated. Pressing the icon arrow allows the parties to be viewed sequentially.

The number pad buttons 0–9 also serve as speeddial buttons. Right clicking on any one of the number pad buttons 0–9 causes the name, alias, e-mail address and IP address, if known, of the party assigned to that speed dial position to be displayed on display 1402.

If a user right clicks on any of lines L1–L4 the name, alias, e-mail address and IP address of the party on that line will similarly appear for a predetermined period of time and then revert back to the normal display.

The keypad buttons displayed on WebPhone GUI 1400 may assume one of two states. A button may be a momentary button which, when pressed, i.e., left clicked, gets pushed in and then pops back out again. A second type of button is a toggle button which when pressed gets pushed in and stays in until pressed again. Number pad buttons 0–9 are momentary buttons which may be used to enter the Internet Protocol address of a party and which each house a speed-dial position. The user may assign a party to one of the ten speed-dial positions by selecting the user's information displayed in display 1402 and then dragging it onto the keypad button. To speed-dial one of the ten buttons the user simply presses the appropriate number followed by the [SND] button. As stated previously, if the user right clicks on one of the number pad buttons, the information about the party assigned to the speed-dial position will be displayed.

The line pad 1404 comprises four toggle buttons L1–L4, each of which has a letter, a number and an LED indicating the status of the line. When one or more parties are associated, i.e., dragged and dropped, with a line, the letter designating the appropriate line turns from an L to C indicating a conference call. When only one party is left on the line the letter designation reverts from a C back to an L indicating a regular call. Only one line, button may be selected at a time when an incoming call arrives. Pressing any of the line buttons assigns the incoming call to the selected line. Pressing a line button, i.e., left clicking, when the line is in use places the line on hold. Subsequent depressing the line button takes the call off hold.

A number of call function buttons 1408, including the [RCL], [END], [SND], [DND], [MUT], [HLD], [CMP], [BLK], [PRI], [FWD], not all of which are shown in FIG. 14, are used to control operation of calls. The [RCL] button is a momentary button used to recall the last number dialed. Pressing [RCL] recalls the last party called by displaying the party's name, alias, e-mail address and IP address, if known. Selecting a free line following depression of the [RCL] button followed by the [SND] button will cause the party last called to be dialed. The [END] button is a momentary button and terminates a call upon depression. The [SND] button is a momentary button and is used to both place and answer calls. Depressing the [SND] button when a call is being announced causes the call to be answered on a preselected line or a line indicated by the user. Depression of the [SND] button once a callee's information is entered into display 1402 causes the party to be called, if the required information is present, or otherwise causes an information server connection to be established and activated, as previously described.

The [DND] button is a toggle button and is used to activate the Do Not Disturb function of the WebPhone. When activated, the [DND] button causes all inbound calls to be routed to the answering machine.

The [MUT] button is a toggle button which, upon depression, causes disabling of the microphone associated with a user's WebPhone system. When the [MUT] button is enabled, the main LED 1402F and the status line 1402H change to indicate that the call muted. Depression of the [MUT] button is undetected by one or more callees.

The [HLD] button is a momentary button and is used to place a call on hold. When a user depresses the [HLD] button a party or parties to a conference call are placed on hold, e.g., the microphone and speaker of the system are effectively disabled. When a called is placed on hold, the main LED 1402F and call status field 1402H indicate the change. To take a call off hold, the user depresses the line button of the call being held.

The [CMP] button is a momentary button that causes the WebPhone user to camp on a party, i.e., perpetual redial. Camping on a party serves to insure that the user's call will go through when the party is available. After placing a call, if the callee responds with either a busy or on off-line status, the user may press the [CPM] button to camp on that party. To remove a camp from a party, the user presses the delete key from the computer keyboard.

The [BLK] button is a toggle button and enables or disables call blocking. Depression of the [BLK] button enables call blocking causing all inbound calls from parties who have call blocking designated in their information profile within the personal information directory to be either rejected or routed to the answer machine. Whether a call is to be rejected or routed to the answering machine is specified in a party's information profile record within the personal information directory, in a manner, as previously described.

The [PRI] button is a toggle button which enables or disables priority ringing. Depression of the button enables priority ringing of all inbound calls from parties, i.e. generation of customized sound effects and/or graphic announcements when a call arrives. As with call blocking, priority ringing is specified within a party's information profile record in the user's personal information directory.

The [FWD] button is a toggle button which enables or disables call forwarding. Depression of the button enables call forwarding of selected inbound calls to the party specified in the appropriate information profile record in the personal information directory. The WebPhone will first search in the personal information directory for an information profile record which matches the inbound call. If a match occurs, and call forwarding is enabled, the inbound call will be forwarded to the party designated within the matched information profile record. If no party is designated, the call will be forwarded to a default forwarding party.

In addition to the call function buttons, a number of phone function buttons 1410 including a [CFG], [DIR], [MSG], [DAT], [LOG], [], and ? buttons enable users to further direct functions of a phone. Specifically, the ? button is a momentary button which invokes an interactive, multimedia tutorial and help system about the WebPhone. The [CFG] button is a momentary button, depression of which launches a configuration dialog which enables the user to change the operating parameters of the WebPhone. The [DIR] button is a momentary button, depression of which launches the phone directory dialog which enables a user to add, store, update, view, and delete parties and to obtain directory assistance from global server 1500, as described previously. The [MSG] button is likewise a momentary button, depression of which launches the voicemail message dialog which enables a user to view, sort, playback, delete, save and restore voicemail messages, as well as to create, playback, delete, save, and restore custom outgoing messages and assign them to information profile records in the personal information directory.

The [DAT] button is a momentary button, depression of which launches a data file transfer dialog enabling a user to monitor and control the progress of a data file transferred over the communication link established with the WebPhone, such dialog further enables a user to retrieve and create E-mail.

The [LOG] button is a momentary button, depression of which launches a call activity log dialog which enables a user to use, sort, search for, print, and delete call related events. An "X" icon is provided to exit the WebPhone. If one or more calls are active when the X icon is selected, a dialog box will appear asking the user if he/she really wishes to exit and terminate active calls. Other icons are provided for minimizing or iconifying the WebPhone application.

In addition to the above-described display, the WebPhone GUI 1400 includes a number of audio control buttons and sliders (not shown in FIG. 14). These graphic elements enable the user to control the recording the playback of voicemail and outgoing messages and operate similar to conventional audio tape deck controls. In the illustrative embodiment, and similar to that shown in FIG. 5, a progress bar is illustrated which displays the extent of progress during playback and audio recording processes. Momentary buttons may be provided for rewinding the "virtual tape" to the beginning and for fast forwarding the tape to the end of a recording. Further, momentary buttons are provided for aborting, as well as stopping, playback of audio. A speaker card button, implemented as a toggle button, is provided to play back audio on the sound card's speaker. A special momentary button for audio playback is provided. When initially depressed, audio playing commences. The button then pops out and becomes a pause button. Subsequent depression pauses the audio. The button then pops out again to become a play button. A record button, in the form of a toggle button is provided to control recording of audio. When the button is depressed the user is in an audio record mode and can record voicemail or outgoing messages. To stop recording, the button is pressed again or the stop is button is pressed. A slider-type graphic potentiometer is provided to control speaker volume and enables the user to adjust output volume of the audio received during conversation and playback of voicemail and outgoing messages. The speaker control will attenuate the sound card speaker volume. A similar control is provided to control microphone volume and enables the user to adjust the input volume of audio recorded during conversation and recording of voicemail and outgoing messages. The microphone slider control attenuates the sound card's microphone volume.

WebPhone Application Object Implementation

As previously described, with reference to FIGS. 13A–B, the WebPhone application comprises a set of object modules which work together in a concerted fashion to provide real-time, multitasking, network-based media transmission and reception. Specifically, the WebPhone GUI, user interface, event manager, and media engine utilize a number of objects to house and manipulate data associated with the operation of the WebPhone application. The GUI objects control the look and feel of the graphic user interface controls which comprise the WebPhone user interface. Some user interface objects maintain and manage many of the states of the WebPhone and control the behavior of the GUI controls, as illustrated in FIGS. 18A–D.

Figure 18A:
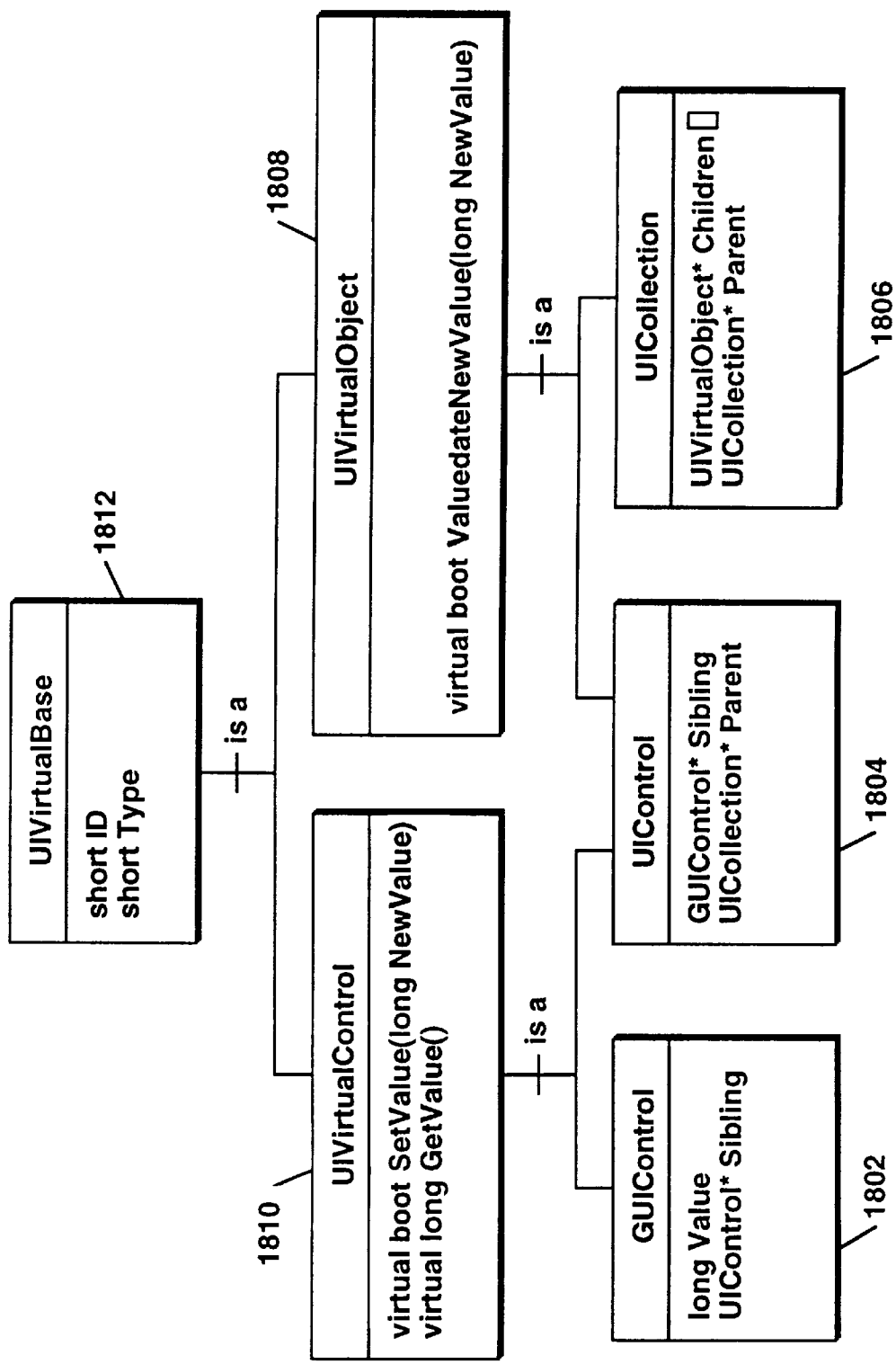
FIG. 18A–D are conceptual block diagrams illustrating user interface and graphic user interface objects utilized by the communication utility of the present invention.

FIG. 18A illustrates the hierarchical relationship between objects within the WebPhone. The UIVirtualBase 1812 is a class from which UIVirtualControl object 1810 and UIVirtual object 1808 inherit their respective attributes and member functions. GUIControl object 1802 inherits its attributes and member functions from UIVirtualControl 1810, as illustrated. UICollection object 1806 inherits its properties from the UIVirtual object class 1808. The UIControl object inherits its attributes and member functions from both the UIVirtual control object class 1810 and the UIVirtual object class 1808.

Figure 18B:
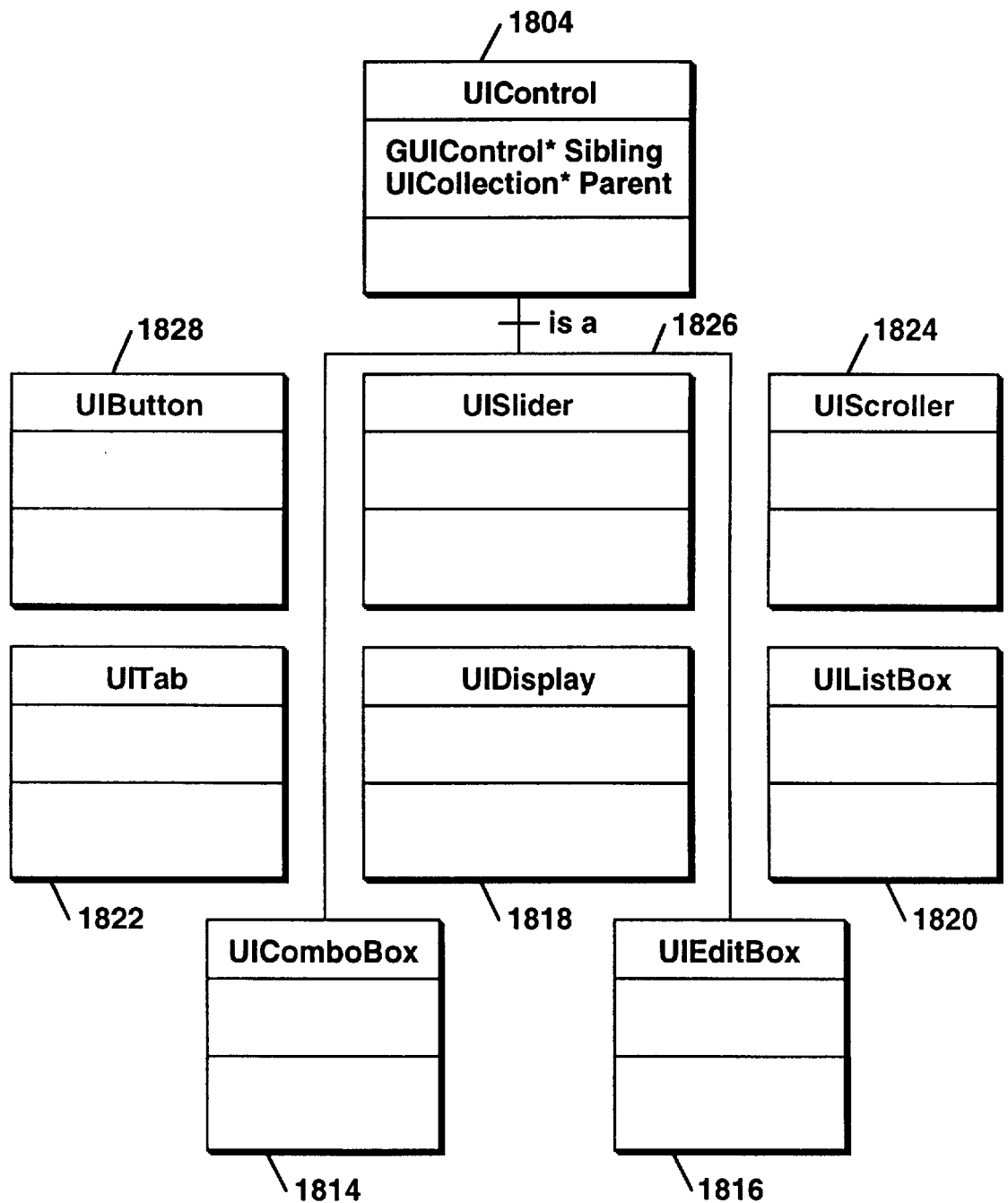
Figure 18C:
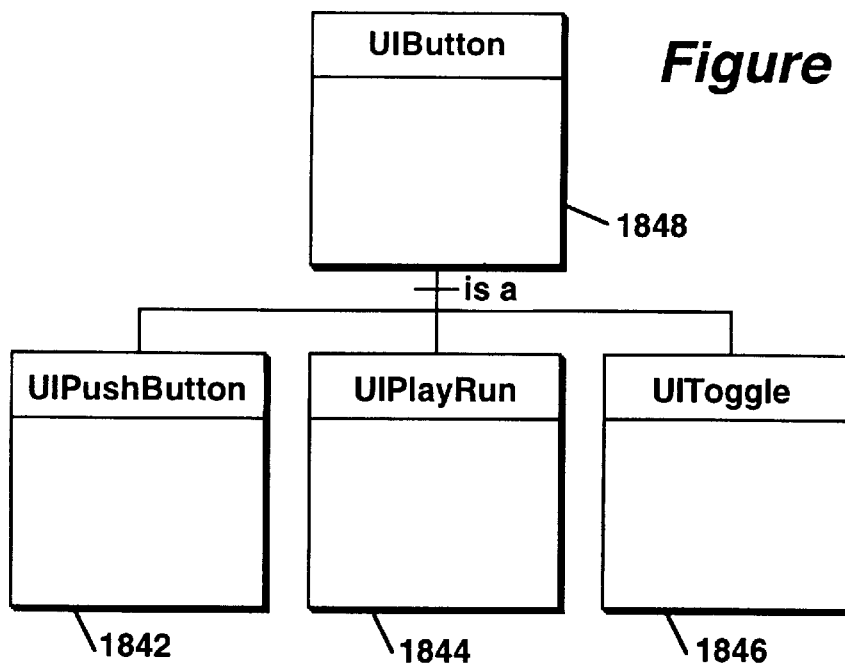
Figure 18D:
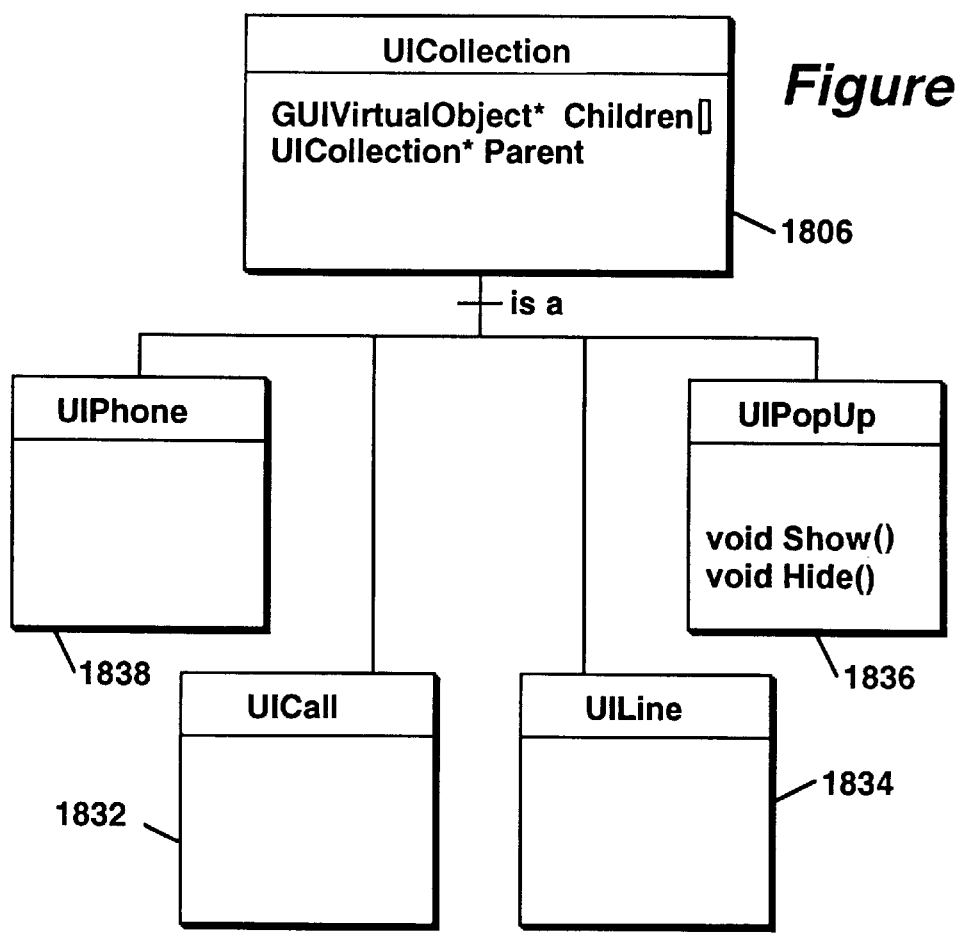

Referring to FIG. 18B the UIControl object 1804 itself serves as a class from which the UIButton object 1828, UISlider object 1826, UIScroller object 1824, UITab object 1822, UIDisplay object 1818, UIListBox object 1820, UIComboBox 1814, and UIEditBox 1816 are subclasses. As illustrated in FIG. 18C, the UIPushButton 1842, UIPlayRun object 1844 and UIToggle object 1846, are subclasses of the UIButton object 1848. As illustrated in FIG. 18D, the UIPhone object 1838, UICall object 1832, UILine object 1834, and UIPopUp object 1836 are derived from or inherit their attributes and member functions from the UICollection object class 1806.

Each WebPhone control has two objects associated therewith, a windowing system specific GUIcontrol object 802 and a generic UI control object 1804. When the GUIcontrol object's state is changed by the user, GUIcontrol 1802 verifies the change with UIcontrol 1804 to validate the change. UIcontrol 1804 is a child of the UIcollection 1806. When UIcontrol's sibling, GUIcontrol 1802 requests UIcontrol 1804 to verify a change, and the change is accepted, GUIcontrol 1802 must verify the change with its parent object. The parent UIcollection 1806 may have its own parent, another UIcollection object, that it must verify the change with. The UIPhone object 1838 is a member of the UI collection class. UIPhone has final approval over all changes in the state of the WebPhone. UIPhone 1838 further tells child objects when the event manager changes the phone state and further creates jobs for the event manager based on user actions.

The WebPhone drag and drop functionality utilizes the standard Windows® drag and drop interface and adds several unique object types to interact therewith. Specifically, each UIcontrol and GUIcontrol object has two new member functions added, e.g., set dragtype and acceptdrop types. The set dragtype call sets the type of drag that the control will perform if the mouse or other pointing device is moved out of the control window with the left mouse button down. The accept droptype defines the types of drags the control will accept.

Event Manager and Media Engine

The event manager is a state machine consisting of an array of pointers to functions and states which make up a state-event table. When an event occurs as caused by the mouse, keyboard, mic, speaker, or socket, it is up to the user interface to determine if the event requires the attention of the event manager. The event manager is not notified of events which effect only the graphic user interface, e.g., the user depresses the [DIR] button to open the phone directory dialog.

Figure 19A:
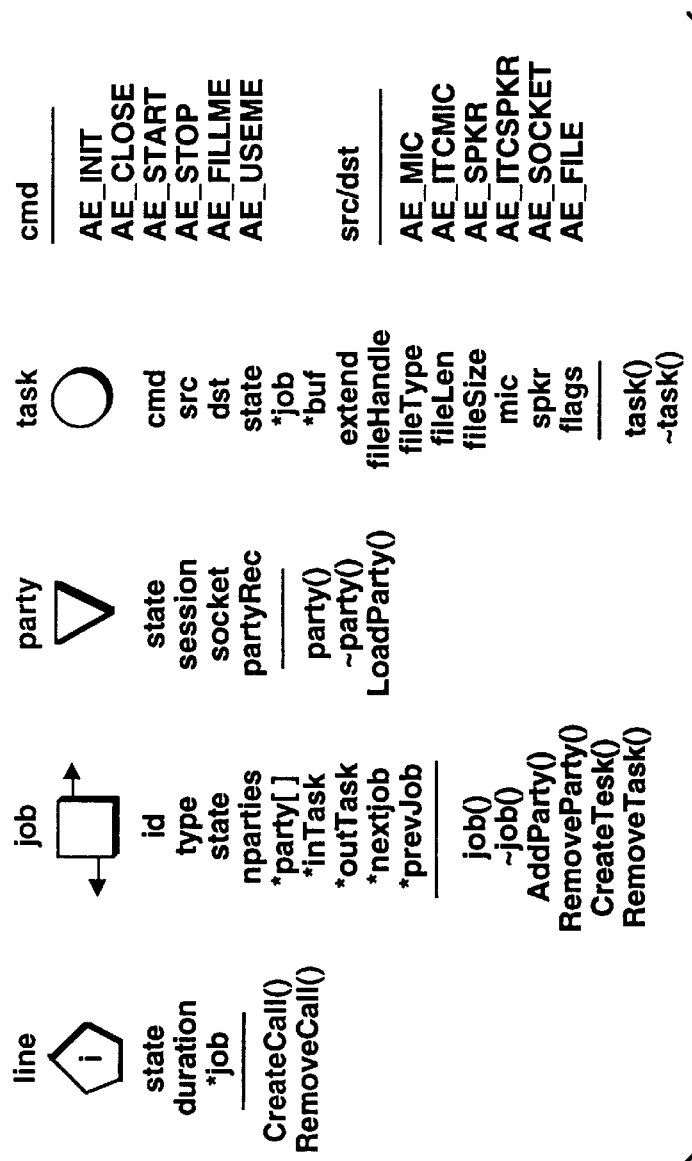
FIG. 19A–C are conceptual block diagrams illustrating the event manager and media engine objects utilized by the communication utility of the present invention.
Figure 19C:
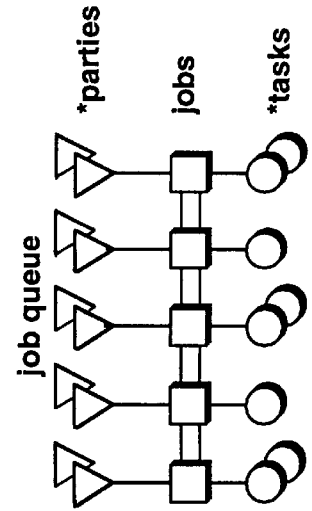
Figure 19B:
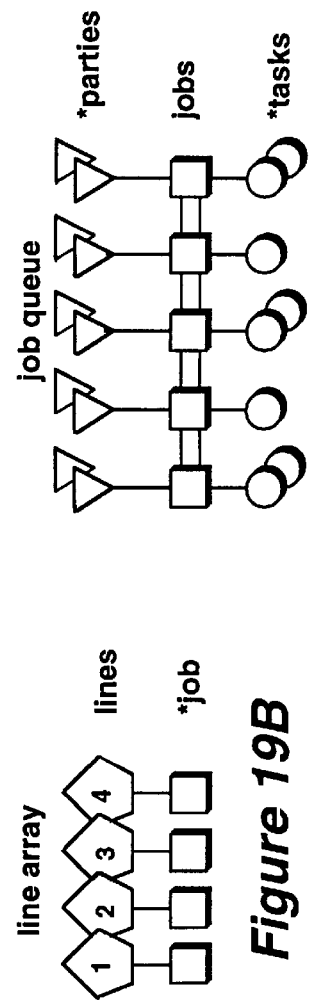

Referring to FIGS. 19A–C, a conceptual block diagram illustrating the event manager and media engine objects utilized by the WebPhone is presented. Specifically, the following objects are utilized by both the user interface and the event manager to manager the state of calls and tasks that are to be performed:

line
job
party
task

As illustrated in FIG. 19A, a Line object is represented by the pentagon shape with a number contained therein. The Line object has the attributes of state and duration and a *job pointer. Member functions for the Line object include createcall () and removecall (). The Job object is illustrated with a rectangle having pointers extended therefrom as illustrated in FIG. 19A. Attributes of the job object include, ID, type, state, and parties, and pointer attributes party, inTask, outTask, nextjob, prevjob. The Job object has the member functions of AddParty, RemoveParty, CreateTask, and RemoveTask. The Party object, illustrated with a triangular symbol, includes the attributes of state, session, socket, and partyRec, and the member functions of LoadParty.

The Task object includes the attributes of command, source, destination, extent, fileHandle, fileType, fileLength, fileSize, mic, speaker, and flags, as wells as pointer attributes *job and *buf. The values assumable by the command attribute of the Task object may include initialize, close, start, stop, fill, and use, etc. The values assumable by the source and destination attributes of the task object may include microphone, speaker, socket, and file. FIG. 19B illustrates the relationship between Line objects and Job objects and the pointers linking the two. FIG. 19 illustrates the relationship between Party objects, Job objects and Task objects and the pointers linking the Job objects to the parties and tasks.

Media Engine Implementation

Figure 20A:
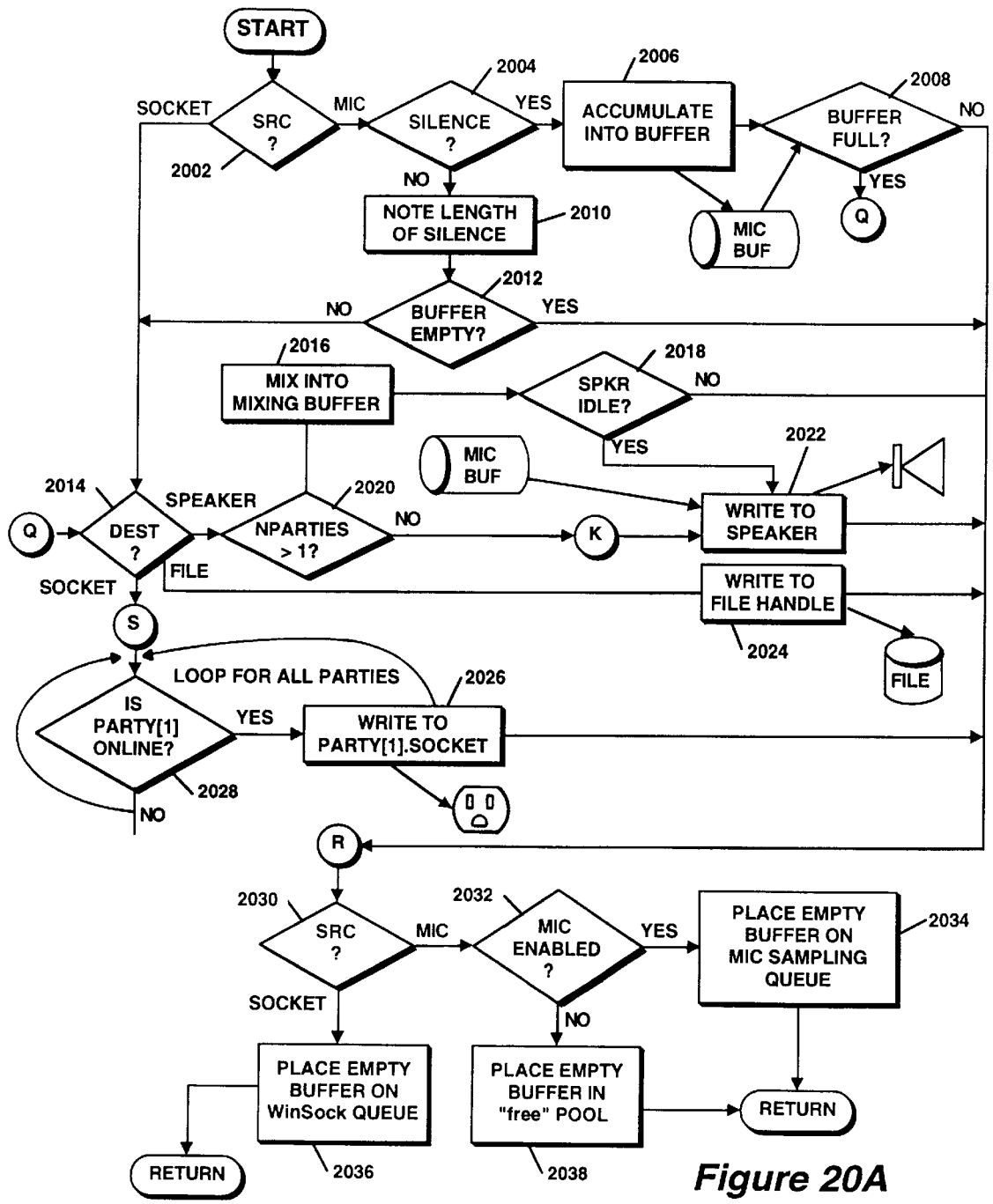
FIGS. 20A–D illustrate process steps performed by the media engine function of the communication utility in accordance with the present invention.

FIGS. 20A–D illustrate the process steps performed by the media engine of the WebPhone in accordance with the present invention. The coding of the process steps of the flowchart of FIGS. 20A–D and to instructions suitable for use by the WebPhone will be understandable by those having ordinary skill in the programming arts. FIG. 20A illustrates the process executed by the media engine when the CMD attribute of a Task object is defined as a AE_USEME command, as previously illustrated in FIG. 19A. The Task objects are set up by the event manager. The media engine manages routing and resources. For example a microphone, file or socket may provide a source of data to media engine while a destination may comprise either a speaker file or socket. The media engine serves to perform compression/decompression as well as copying functions. For the purposes of describing flowcharts 20A–D the media engine will referred to as media engine 2000.

Referring to FIG. 20A, media engine 2000 first determines the source of a data stream, as illustrated by decisional block 2002. If the source is a microphone, media engine 2000 determines whether or not the current audio data from the microphone source is silence, as illustrated in decisional block 2004. If the audio stream from the microphone is not silent the data will be accumulated into a microphone buffer, as illustrated by procedural block 2006. Next, the media engine will determine whether or not the buffer is full, as illustrated by decisional 2008. If the buffer is full, process flow will proceed to a determination of the destination via connector Q. If in decisional block 2004 the determination was made that the audio data from the microphone was silence, the media engine notes the length of the silence, as illustrated by procedural block 2010. Next, the media engine determines whether or not the buffer is empty, as illustrated by decisional block 2012. If the buffer is empty, process flow proceeds to a determination of the source, via connector R, as illustrated by decisional block 2030.

Returning again to decisional 2014, a determination of the destination of the audio data made after either a determination that the buffer is full, via connector Q, or that the source of the audio data is a socket, e.g., one of the branches of decisional block 2002. If in decisional block 2014 a determination is made that the destination is a socket, media engine 2000 determines if a party is online, as illustrated by decisional block 2028. If the party is online media engine 2000 will write to the socket associated with that party, as illustrated by procedural block 2026. The process as illustrated by decisional 2028 and process block 2026 are repeated for every party associated with the Job object, i.e., conference calls include multiple parties. Following writing to the parties socket, process flow returns decisional block 2030 for a determination of the source, as illustrated. If in decisional block 2014 a determination was made that the speaker was the destination, media engine makes a further determination to whether or not the there is more than one party on the conversation, i.e., conference call, as illustrated by decisional block 2020. If there is only one other party besides the user on the call, process flow proceeds to junction K where the audio data is written to the speaker, as illustrated by process block 2022. If in decisional block 2020 a determination was made that multiple parties were associated with a call media engine 2000 mixes the audio data into a mixing buffer, as illustrated by process block 2016. Next media engine 2000 determines whether or not the speaker is idle. If so, the audio data from the mixing buffer is written to the speaker as illustrated by procedural block 2022. Otherwise, process flow proceeds to junction R. In decisional block 2030 media engine 2000 determines again what the source of an audio data stream is. If the source is determine to be a socket, media engine 2000 will place the empty buffer on the winSock queue, as illustrated by process block 2036. If the source is determined to be a microphone, and the microphone is enabled, as determined in decisional block 2032, media engine 2000 will place the empty buffer on the mic sampling queue, as illustrated by process block 2034. Otherwise, media engine 2000 will place the empty buffer in the free pool of buffer space, as illustrated by process 2038. Either branch of decisional block 2030 will result in a return from the task execution process, as illustrated.

Figure 20B:
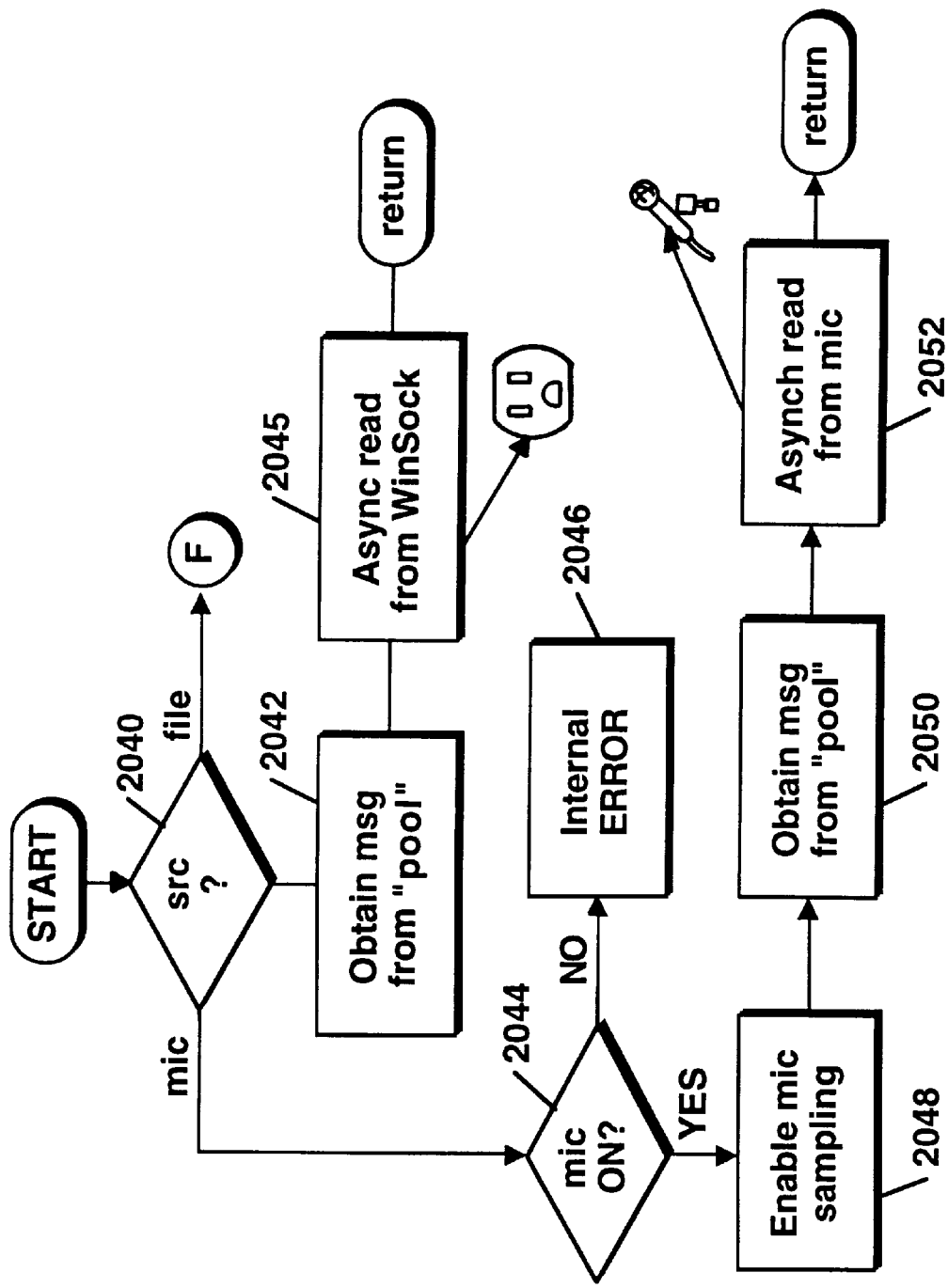
Figure 20C:
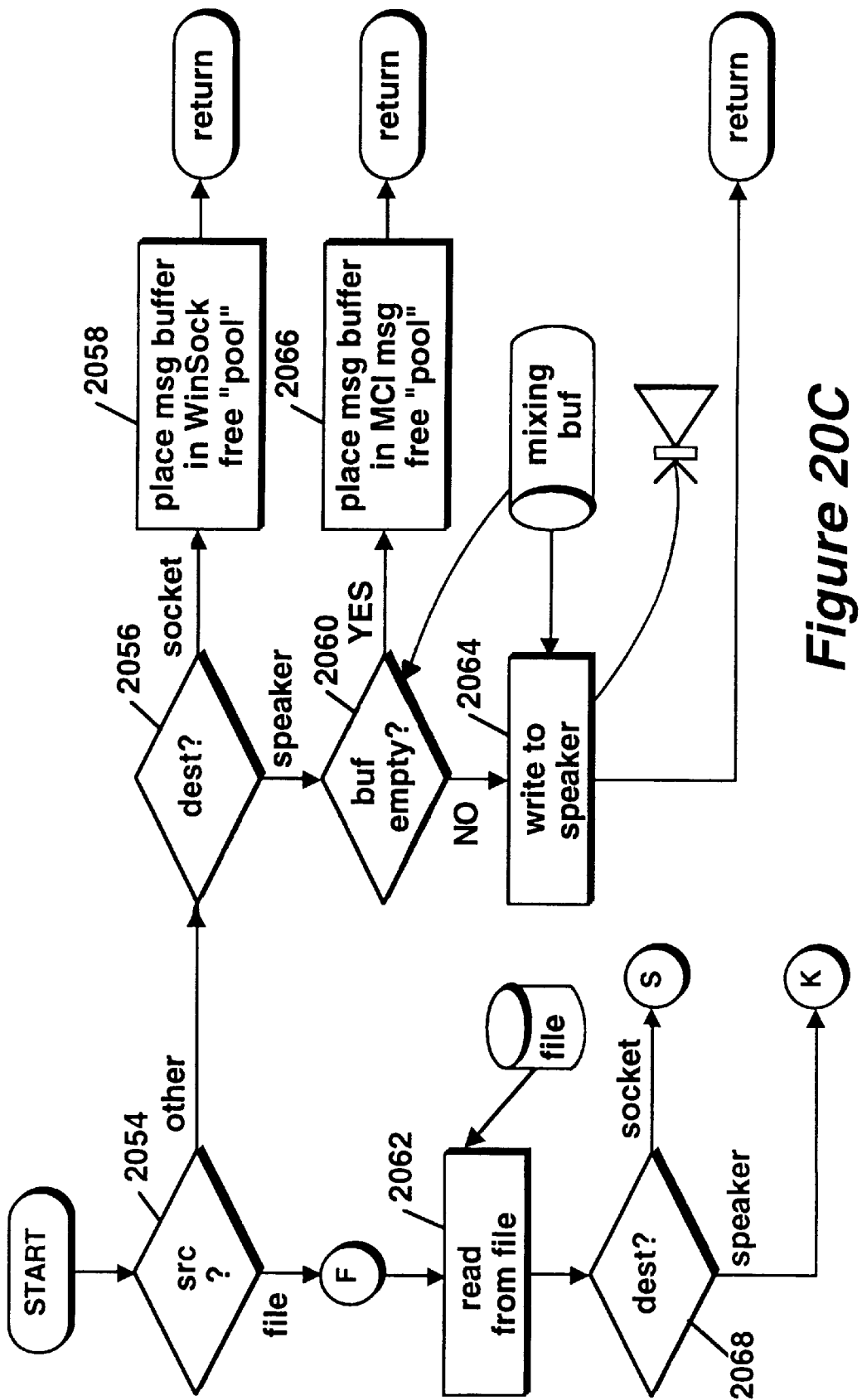

FIG. 20B, illustrates the process flow performed by media engine 2000 upon receiving a task object from the event manager having the CMD attribute defined with a AE_START, i.e., the event manager instructs the media engine to start a copy operation from a source to a destination. First, media engine 2000 determines whether or not the source is a microphone or a file, as illustrated by decisional block 2040. If the source is a file, process flow proceeds to block 2062 of FIG. 20C via connector F, as described hereinafter. If the source is determined to be a microphone, media engine 2000 will determine whether or not the microphone is on, as illustrated by decisional 2044. If the microphone is not on, an internal error notification will be generated, as illustrated by procedural block 2046. If the microphone is on, media engine 2000 will enable microphone sampling, obtain space from the buffer pool, and perform an asynchronous read from the microphone, as illustrated by process blocks 2048, 2050 and 2052, respectively. If in decisional block 2040 media engine 2000 determined that the source was a socket, buffer space will be retrieved from the buffer pool, as illustrated by process block 2042, and an asynchronous read from the socket will be performed, as illustrated by process block 2045. Following the an asynchronous read from either a socket or a microphone, media engine 2000 will return the task to the event manager, as illustrated.

FIG. 20 illustrates the process flow performed by media engine 2000 upon receiving a Task object from the event manager in which the CMD attribute is defined with a AE_FILLME command value, i.e., an empty packet has been returned from either an MCI or WINSOCK asynchronous write operation upon completion. First, media engine 2000 determines whether the source is from a file or either a socket or speaker, as illustrated by decisional block 2054. If the source is a file, media engine 2000 will read a portion of the file, as illustrated by process block 2062. Next, media engine 2000 will make a determination as to whether the destination is either a socket or a speaker, as illustrated by decisional block 2068. If the destination is a socket process flow will return to decisional block 2028 of FIG. 20A via connector S, as illustrated. If the destination is a speaker, process flow will proceed to process block 2022 of FIG. 20A via connector K as illustrated.

If a determination was made in decision 2056 that the destination is a socket, media engine 2000 will place the buffer associated with the task or message in the WINSOCK free pool of buffer space, as illustrated by process block 2058. If the destination is determined to be a speaker, media engine 2000 next determines whether or not the buffer is empty, as illustrated by decision block 2060. If the buffer is not empty, the data within the mixing buffer will be written to the speaker, as illustrated by message 2064. If the buffer is empty, the buffer associated with the message, i.e., task, will be placed in the MCI message free pool, as illustrated by process block 2066. Both branches decisional block 2056 result in a return from the task by media engine 2000, as illustrated. In the above-described flow diagrams, a message may be a task implementation similar to the manner in which Microsoft Windows uses messages for task completion operations.

Figure 20D:
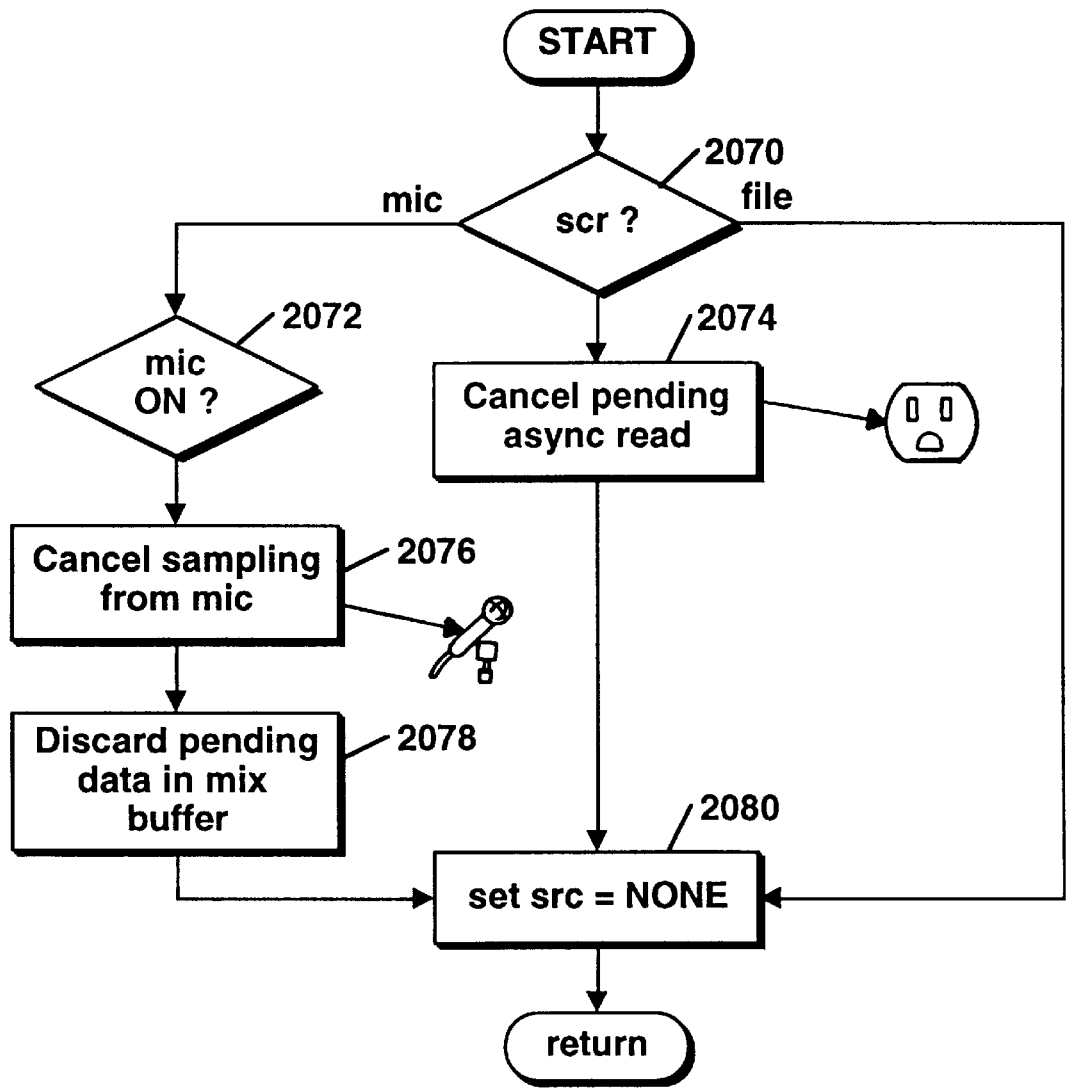

FIG. 20D illustrates the process path taken by media engine 2000 when the CMD attribute of a Task object is defined as a AE_STOP value, i.e., the event manager instructs the media engine to stop the current operation on behalf of a specified task. The process begins with the determination of whether or not the source is a microphone or file, as illustrated by decisional block 2070. If it is determined that the source is a file, process flow proceeds to block 280 where the source is set to none, i.e., no further data will retrieved or processed. If the process is determined to be a socket, media engine 2000 cancels any pending asynchronous reads from the socket, as illustrated by process block 2074. If a determination is made that the source is a microphone, media engine 2000 will determine whether or not the microphone is on, as illustrated by decisional block 2072. If the microphone is on, media engine 2000 cancels sampling of the audio signal from the microphone, as illustrated by process block 2076, and, discards the pending data in the mix buffer, as illustrated by process block 2078. Regardless of the determination of the source, all branches of the process flow terminate with the setting of the source to none or null, indicating a termination of the operation and a return by media 2000 from the task, as illustrated.

In an alternate embodiment, the various aspects of the invention may be implemented as a computer program product for use with a computer system. Such implementation may comprise a series of computer instructions either fixed on a tangible medium, such as a computer readable media, e.g. diskette 1142, CD-ROM 1147, ROM 1115, or fixed disk 1152 of FIG. 11, or transmittable to a computer system, via a modem or other interface device, such as communications adapter 1190 connected to the network 1195 over a medium 1191. Medium 1191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skill in the art that various changes and modifications can be made which will achieve some of the advantages of the invention without departing from the spirit and scope of the invention. These and other obvious modifications are intended to be covered by the appended claims.

TABLE 1

Client Table

| Field | Data type | Comments |
| --- | --- | --- |
| id | ulong | Unique ID Sequence |
| activated | char | 0 = NO, 1 = YES |
| activationDate | ulong | Secs since 00:00 UTC Jan. 1, 1970 |
| version capability | ushort | Version of the Webphone |
| version protocol | ushort | |
| version vendor | ushort | |
| paid | char | 0 = NO, 1 = YES |

TABLE 1-continued

Client Table

| Field | Data type | Comments |
|---|---|---|
| prePaidCode | varchar(16) | |
| firstName | varchar(10) | |
| lastName | varchar(25) | |
| alias | varchar(20) | |
| emailAddr | varchar(90) | |
| IPAddr | varchar(80) | 0.0.0.0 if not known |
| street | varchar(50) | |
| apt | varchar(5) | |
| city | varchar(20) | |
| state | varchar(20) | |
| country | varchar(20) | |
| postalCode | varchar(20) | |
| phone | varchar(25) | |
| fax | varchar(25) | |
| feature bits | ulong | WebPhone Feature Definitions |
| company | varchar(25) | Company Name |
| addrChanges | char | No. of address changes |
| addrChangeDate | ulong | Secs since 00:00 UTC |
| publish | char | 0 = NO, 1 = YES |
| accessDate | ulong | Secs since 00:00 UTC |
| accessCount | ulong | # of log ons |
| callCount | ulong | # o outbound calls |
| social security number | ulong | optional |
| age | ushort | optional |
| occupation code | ushort | optional |
| interest codes | ushort | optional |
| household income range | ushort | optional |

TABLE 2

Online Table

| Field | Data Type | Comments |
|---|---|---|
| emailAddr | varchar(90) | |
| IPAddr | varchar(80) | |
| flags | char | |
| onlineDate | ulong | Secs since 00:00 UTC |

TABLE 3

WebBoard Table

| Field | Data Type | Comments |
|---|---|---|
| id | ulong | Unique ID Sequence |
| image | varchar(255) | Filename of image file |
| imageType | char | GIF = 0, JPG = 1, RLE = 3 |
| audio | varchar(255) | Filename of TSP encoded.WAV file |
| audioType | char | GSM=0, TRUESPEECH = 1 |
| hits | ulong | Number of accrued hits |
| hitsprofile | varchar(8) | Filename of Demographics |
| version | ulong | version of WebBoard |
| URL | varchar(255) | home page url |

TABLE 4

WebBoard Config Table

| Field | Data Type | Comments |
|---|---|---|
| count | ulong | Number of WebBoards |

TABLE 5

Source Table

| Field | Data Type | Comments |
|---|---|---|
| id | ulong | Unique ID Sequence |
| weboardID | ulong | Link to WebBoard record |
| name | varchar(50) | Company's name |
| url | varchar(80) | URL to Home Page |
| street | varchar(50) | |
| apt | varchar(5) | |
| city | varchar(20) | |
| state | varchar(20) | |
| country | varchar(20) | |
| postalCode | varchar(20) | |
| phone | varchar(25) | |
| fax | varchar(25) | |
| contact | varchar(35) | Name of contact |

TABLE 6

WebPhone Protocol (WPP) Packet Definitions

| Packet | Packet Type | Direction | Data |
|---|---|---|---|
| Invalid | WPP_INVALID | ←→ | WPP_INVALID |
| Online Req | WPP_ONLINEREQ | → | WPP_ONLINEREQ, sid, version, emailAddr, IPAddr, onlineState, feature bits |
| OnlineACK | WPP ONLINEACK | ← | WPP_ONLINEACK, sid onlineStatus, feature bits |
| Offline | WPP_OFFLINE | ←→ | WPP_OFFLINE, sid |
| Hello | WPP_HELLO | ←→ | WPP_HELLO, sid, version |
| Connect Req | WPP_CONNECTREQ | → | WPP_CONNECTREQ, sid, version, callType, partyEmailAddr, emailAddr, IPAddr, connectState |
| Connect ACK | WPP_CONNECTACK | ←→ | WPP_CONNECTACK, sid, connectStatus, partyIPaddr |
| Call | WPP_CALL | ←→ | WPP CALL, sid, version, emailAddr, IPAddr, userinfo |
| CallACK | WPP_CALLACK | ←→ | WPP_CALLACK, sid, version, emailAddr, IpAddr, userinfo |

TABLE 6-continued

WebPhone Protocol (WPP) Packet Definitions

| Packet | Packet Type | Direction | Data |
|---|---|---|---|
| CnfCall | WPP_CNFCALL | ←→ | WPP_CNFCALL, sid, version, emailAddr, IPAddr, userinfo |
| CnfCallACK | WPP_CNFCALLACK | ←→ | WPP_CNFCALLACK, sid, version |
| Answer | WPP_ANSWER | ←→ | WPP_ANSWER, sid |
| Busy | WPP_BUSY | ←→ | WPP_BUSY, sid |
| AnsMachine | WPP_ANSMACH | ←→ | WPP_ANSMACH, sid, state |
| End | WPP_END | ←→ | WPP_END, sid |
| Hold | WPP_HOLD | ←→ | WPP_HOLD, SID, (ON/OFF) |
| Reject | WPP_REJECT | ←→ | WPP_REJECT, sid |
| Camp | WPP_CAMP | ←→ | WPP_CAMP, sid |
| CampACK | WPP_CAMPACK | ←→ | WPP_CAMPACK, sid |
| Audio | WPP_AUDIO | ←→ | WPP_AUDIO, sid, audioType, silence, length, audioData |
| Pulse | WPP_PULSE | → | WPP_PULSE, sid |
| Adjpulse | WPP_PULSE | ← | WPP_ADJPULSE, sid, adjPulse |
| Vmail | WPP_VMAIL | ←→ | WPP_VMAIL, sid, audioType, silence, length, audioData |
| VmailEnd | WPP_VMAILEND | ←→ | WPP_VMAILEND, sid |
| OgmEnd | WPP_OGMEND | ←→ | WPP_OGMEND, sid |
| CnfAdd | WPP_CNFADD | ←→ | WPP_CNFADD, sid, partyEmailAddr, partyPaddr, partinfo |
| CnfDrop | WPP_CNFDROP | ←→ | WPP_CNFDROP, sid |
| FileXmtReq | WPP_FILEXMTREQ | ←→ | WPP_FILEXMTREQ, sid, file Type, fileName, fileSize |

TABLE 7

WebPhone Protocol (WPP) Packet Definitions

| Packet | Packet Type | Direction | Data |
|---|---|---|---|
| FileXmtAck | WPP_FILEXMTACK | ←→ | WPP_FILEXMTACK, sid |
| File | WPP_FILE | ←→ | WPP_FILE, sid, length, fileData |
| FileXmtEnd | WPP_FILEXMTEND | ←→ | WPP_FILEXMTEND, sid |
| FileXmtAbort | WPP_FILEXMTABORT | ←→ | WPP_FILEXMTABORT, sid |
| InfoReq | WPP_INFOREQ | → | WPP_INFOREQ, sid, query |
| InfoACK | WPP_INFOACK | ← | WPP_INFOACK, sid, nparties |
| Info | WPP_INFO | ← | WPP_INFO, sid, partyInfo |
| InfoAbort | WPP_INFOABORT | → | WPP_INFOABORT, sid |
| UserInfoReq | WPP_USRINFOREQ | ← | WPP_USRINFOREQ, sid |
| UserInfo | WPP_USRINFO | → | WPP_USRINFO, sid, version, userInfo |
| WBImageStart | WPP_WBIMAGESTART | ← | WPP_WBIMAGESTART, sid, fileSize, ImageType, url |
| WBImage | WPP_WBIMAGE | ← | WPP_WBIMAGEEND, sid |
| WBAudioStart | WPP_WBAUDIOSTART | ← | WPP_WBAUDIOSTART, sid, fileSize, audioType |
| WBAudio | WPP_WBAUDIO | ← | WPP_WBAUDIO, sid, length, audioData |
| WBAudioEnd | WPP_WBAUDIOEND | ← | WPP_WBAUDIOEND, sid |
| Registration | WPP_REG | ← | WPP_REG, sid, feature bits, EEMAILAddr, customer id |
| Audio Start | WPP_AUDIO START | ←→ | WPP_AUDIO START, sid |
| Audio End | WPP_AUDIO END | ←→ | WPP_AUDIO END, sid |
| Caller OK | WPP_CALLEROK | → | WPP_CALLEROK, sid, version, emailAddr, feature bits |
| Caller ACK | WPP_CALLERACK | ← | WPP_CALLERACK, sid, callerStatus, feature bits |
| Key Pad | WPP_KEYPAD | ← | WPP_KEYPAD, sid (ON/OFF) |
| Key | WPP_KEY | → | WPP_KEY, sid, ascii character |
| WBLIST | WPP_WBLIST | ← | WPP_WBLIST. sid, list of WB IDs |
| WBLIST REQ | WPP_WBLISTREQ | → | WPP_BBLISTREQ, sid |
| WB REQ | WPP_WEBBOARDREQ | → | WPP_WEBBOARDREQ, sid, WBid, Client id |
| WB HIT | WPP_WEBBOARDHIT | → | WPP_WWBOARDHIT, sid, WB id, Client id |
| ANS FULL | WPP_ANS FULL | → | WPP_ANS FULL, sid |

TABLE 8

WebPhone Protocol (WPP) Packet Data Definitions

| Element | Data Type | Comment |
|---|---|---|
| WPP_* | unsigned char | WPP message identifier |
| sid | unsigned long | session id unique per call |
| version | unsigned(3) | version of the webphone (capability, protocol, vendor) |
| emailAddr | varchat(90) | email address of caller |
| IPAddr | varchar(80) | IP Address |
| onlineState | unsigned char | bit 0 (ACTIVE/INACTIVE) |
| | | bit 1 (Merchant Phone) |
| | | bit 2 (Connection Server) |
| | | bit 3 (webboard disabled) |
| | | bit 4 Not Used |
| | | bit 5 Not Used |
| | | bit 6 Not Used |
| | | bit 7 Not Used |
| call Type | unsigned char | call type 0: EMAIL/1:IPCALL |
| partyEmailAddr | varchar(90) | email address of person to call |
| connectStatus | unsigned char | 0:NO WEBPHONE |
| | | 1: ONLINE |
| | | 2:OFFLINE |
| | | 3:RECONNECT |
| | | 4:PERM_RECONNECT |
| partyIPAddr | varchar(80) | IP Address of person to call |
| userInfo | varchar(120) | firstName, LastName, alias, emailAddr, street, apt., city, state, country, postalCode, phone, fax, company |
| audioType | unsigned char | audio compress type |
| | | 0:GSM |
| | | 1:TRUESPEECH |

TABLE 9

WebPhone Protocol (WPP) Packet Data Definition

| Element | Data Type | Comment |
|---|---|---|
| length | unsigned short | length of audio or data in bytes |
| audioData | 512 Bytes | compressed audio data |
| feature bits | unsigned long | WebPhone feature definition |
| fileType | unsigned char | file type |
| | | 0:DATA |
| | | 1:EMAIL |
| | | 2:TEXT |
| | | 3:BINARY |
| fileName | varchar(13) | name of file to be transmitted. |
| fileSize | unsigned long | size of file to be transmitted in bytes |
| fileData | variable | file data |
| query | varchar(120) | firstName, lastName, company, city, state, country |
| nparties | unsigned long | number of parties or query records being sent |
| size | unsigned long | size of file (IMAGE or AUDIO) to be sent |
| imageType | unsigned char | image type |
| | | 0:GIF |
| | | 1:JPG |
| imageData | 512 Bytes | image data |
| eemailAddr | varchar(90) | encrypted email Address |
| onlineStatus | unsigned char | 0 OK |
| | | −1 Error |
| callerStatus | unsigned char | 0 is unpaid |
| | | 1 if paid |
| onlineState | unsigned char | bit 0 webboard disabled |
| | | bit 1 Not Used |
| | | bit 2 Not Used |
| | | bit 3 Not Used |
| | | bit 4 Not Used |
| | | bit 5 Not Used |
| | | bit 6 Not Used |
| | | bit 7 Not Used |
| WBid | unsigned long | link to WebBoard record |
| adjpulse | unsigned long | timer offset in secs |

TABLE 10

Feature Definition

| | | |
|---|---|---|
| feature bit 0 | 0 = 1 line | 1 = 4 lines |
| bit 1 | 0 = Limited Call Time | 1 = Unrestricted Call Time |
| bit 2 | 0 = Limited VMail OGM | 1 = Unlimited Vmail OGM |
| bit 3 | 0 = Limited Directory Entries | 1 = Unlimited Dir Entries |
| bit 4 | 0 = Webboard Not Disabled | 1 = Allowed to Disable |
| bit 5 | 0 = Conferencing(audio) Disabled | 1 = Conferencing Enabled |
| bit 6 | 0 = Conferencing(video) Disabled | 1 = Conferencing Enabled |
| bit 7 | 0 = Whiteboard Disabled | 1 = Whiteboard Enabled |
| bit 8 | 0 = Offline voicemail Disabled | 1 = Offline voicemail Enabled |
| bit 9–27 Reserved | | |
| bit 28–30 Type of Phone | | |
| | 0 - Normal webphone | |
| | 1 - Agent | |
| | 2 - Business webphone | |
| | 3 - Gateway | |
| | 4 - ACD | |
| | 5–7 reserved | |
| bit 31 1 = Disable all WebPhone features | | |

TABLE 11

| Offset | Name | Size | Description |
|---|---|---|---|
|  | Reserved |  | Reserved |
| +1 | SessionID | 4 | Unique value for duration of this connection |
| +5 | Version | 6 | WebPhone version and distributor stamp |
| +11 | Codec | 1 | Audio compression algorithm selected |
| +12 | FirstName | 10 | Given name, middle initial |
| +22 | LastName | 25 | Surname |
| +47 | Alias | 20 | Nickname |
| +67 | EmailAddr | 90 | Caller's electronic mail address |
| +157 | IpAddr | 80 | Caller's WebPhone's Internet address |
| +237 | Street | 50 | Street address of user |
| +287 | Apt | 20 | Apartment or suite number |
| +307 | City | 20 | City name |
| +327 | State | 20 | State or province |
| +347 | Country | 20 | Country name |
| +367 | ZipCode | 20 | Zip or postal code |
| +387 | Phone | 25 | Telephone number |
| +412 | Fax | 25 | Facsimile telephone number |
| +437 | Company | 25 | Employer or organization name |
| +487 | File Name | 25 | Name of file |
| +512 | Action Code | 25 | Action descriptor |
| +537 | File Type | 10 | File type descriptor |
| +547 | Status | 25 | Status of WebPhone utility |

What is claimed is:

1. A computer program product for use with a computer system, the computer system capable of executing a first process and connecting to other processes and a server process over a computer network, the computer program product comprising a computer usable medium having a program code embodied in the medium comprising:

a. program code for transmitting an E-mail signal from the first process to the server process over the computer network, the E-mail signal containing a first network protocol address assigned to the first process upon connection to the computer network;

b. program code for receiving a second network protocol address from the second process over the computer network, the second network protocol address assigned to the second process upon connection to the computer network; and c. program code, responsive to the second network protocol address, for establishing a point-to-point communication link between the first process and the second process over the computer network.

2. In a first computer process operatively coupled over a computer network to a second process and an mail server process, a method of establishing a point-to-point communication between the first and second processes comprising the steps of:

a. transmitting an E-mail signal to the server process over the computer network, the E-mail signal containing a first network protocol address assigned to the first process upon connection to the computer network;

b. receiving a second network protocol address from the second process over the computer network, the second network protocol address assigned to the second process upon connection to the computer network; and c. establishing a point-to-point communication link between the first process and the second process over the computer network, in response to receiving the second network protocol address.

3. A computer program product for use with a computer system capable of executing a first process and communicating with other processes, a directory server process and a mail server process over a computer network, the computer program product comprising a computer usable medium having computer program code embodied in the medium, the program code comprising:

A. program code configured to determine the currently assigned network protocol address of the first process upon connection to the computer network;

B. program code configured to establish a communication connection with the directory server process once the assigned network protocol of the first process is known;

C. program code configured to forward the assigned network protocol address of the first process to the directory server process upon establishing a communication connection with the directory server process; and D. program code configured to establish a point-to-point communication with another process over the computer network.

4. The computer program product of claim 3 wherein the program code configured to establish a point-to-point communication further comprises:

D.1 program code configured to transmit, from the first process to the directory server process, a query as to whether a second process is connected to the computer network; and D.2 program code configured to receive a network protocol address of the second process from the directory server process, when the second process is connected to the computer network.

5. The computer program product of claim 3 wherein the program code configured to establish a point-to-point communication further comprises:

D.1 program code configured to transmit an E-mail message containing a network protocol address from the first process to the mail server process over the computer network;

D.2 program code configured to receive a second network protocol address from a second process over the computer network.

6. A computer program product for use with a computer system capable of executing a first process and connecting to other processes and a server process over a computer network, the computer program product comprising a computer usable medium having computer readable code means embodied in the medium comprising:

A. program code configured to, following connection of the first process to the computer network, forward to the server process a network protocol address at which the first process is connected to the computer network;

B. program code configured to query the address server as to whether the second process is connected to the computer network;

C. program code configured to receive a network protocol address of the second process from the address server, when the second process is connected to the computer network; and D. program code configured to respond to the network protocol address of the second process, establish a point-to-point communication link with the second process over the computer network.

7. A computer data signal embodied in a carrier wave comprising:

A. program code configured to, following connection of a first process to a computer network, forward to a server process a network protocol address at which the first process is connected to the computer network;

B. program code configured to query the server process as to whether a second process is connected to the computer network;

C. program code configured to receive a network protocol address of the second process from the server process, when the second process is connected to the computer network; and D. program code, responsive to the network protocol address of the second process, and configured to establish a point-to-point communication connection with the second process over the computer network.

8. An apparatus for use with a computer system, the computer system executing a first process operatively coupled over a computer network to a second process and a directory database server process, the apparatus comprising:

A. program logic configured to, following connection of the first process to the computer network forward to the address server a network, protocol address at which the first process is connected to the computer network;

B. program logic configured to query the address server as to whether the second process is connected to the computer network;

C. program logic configured to receive a network protocol address of the second process from the address server, when the second process is connected to the computer network; and D. program logic configured to, in response to the network protocol address of the second process, establish a point-to-point communication link with the second process over the computer network.

9. A computer data signal embodied in a carrier wave comprising:

a. program code configured to access a directory database, the database having a network protocol address for a selected plurality of processes having on-line status with respect to the computer network, the network protocol address of each respective process forwarded to the database following connection to the computer network; and b. program code responsive to one of the network protocol addresses and configured to establish a point-to-point communication link from the first process to the second process over the computer network.

10. In a first computer process operatively coupled over a computer network to a second process and an address server, a method of establishing a point-to-point communication between the first and second processes comprising the steps of:

a. accessing a directory database, the database having a network protocol address for a selected plurality of processes having on-line status with respect to the computer network, the network protocol address of each respective process forwarded to the database following connection to the computer network; and b. in response to one of the network protocol addresses, establish a point-to-point communication link from the first process to the second process over the computer network.

11. An apparatus for use with a computer system, the computer system capable of executing a first process connectable over a computer network to a second process and a directory database server process, the apparatus comprising:

a. program logic configured to access a directory database, the database having a network protocol address for a selected plurality of processes having on-line status with respect to the computer network, the network protocol address of each respective process forwarded to the database following connection to the computer network; and b. program logic responsive to one of the network protocol addresses and configured to establish a point-to-point communication link from the first process to the second process over the computer network.

12. A computer data signal embodied in a carrier wave comprising:

program code for transmitting to a server process, a network protocol address received by a first process following connection to a computer network;

program code for transmitting, to the server process, a query as to whether a second process is connected to the computer network;

program code for receiving a network protocol address of the second process from the server process, when the second process is connected to the computer network; and program code, responsive to the network protocol address of the second process, for establishing a point-to-point communication link between the first process and the second process over the computer network.

13. In a first computer process operatively coupled over a computer network to a second process and an address server, a method of establishing a point-to-point communication between the first and second processes comprising the steps of:

a. transmitting to the server a network protocol address received by the first process following connection to the computer network;

b. transmitting, to the server, a query as to whether the second process is connected to the computer network;

c. receiving a network protocol address of the second process from the server, when the second process is connected to the computer network; and d. program code, responsive to the network protocol address of the second process, for establishing a point-to-point communication link between the first process and the second process over the computer network.

14. An apparatus for use with a computer system, the computer system capable of executing a first process and operatively connectable to a second process and a server process over a computer network, the apparatus comprising:

program logic configured to transmit to the server a network protocol address received by the first process following connection to the computer network;

program logic configured to transmit, to the server, a query as to whether the second process is connected to the computer network;

program logic configured to receive a network protocol address of the second process from the server, when the second process is connected to the computer network; and program logic, responsive to the network protocol address of the second process, and configured to establish a point-to-point communication link between the first process and the second process over the computer network.

* * * * *

(12) EX PARTE REEXAMINATION CERTIFICATE (7927th)
United States Patent
Mattaway et al.

(10) Number: US 6,131,121 C1
(45) Certificate Issued: *Dec. 14, 2010

(54) POINT-TO-POINT COMPUTER NETWORK COMMUNICATION UTILITY UTILIZING DYNAMICALLY ASSIGNED NETWORK PROTOCOL ADDRESSES

(75) Inventors: Shane D. Mattaway, Boca Raton, FL (US); Glenn W. Hutton, Miami, FL (US); Craig B. Strickland, Tamarac, FL (US)

(73) Assignee: Net2phone, Inc., Newark, NJ (US)

Reexamination Request:
No. 90/010,424, Feb. 24, 2009

Reexamination Certificate for:
Patent No.: 6,131,121
Issued: Oct. 10, 2000
Appl. No.: 08/719,554
Filed: Sep. 25, 1996

(*) Notice: This patent is subject to a terminal disclaimer.

Related U.S. Application Data

(63) Continuation-in-part of application No. 08/533,115, filed on Sep. 25, 1995, now Pat. No. 6,108,704.

(51) Int. Cl.
*H04M 1/57* (2006.01)
*H04L 12/58* (2006.01)
*H04L 29/06* (2006.01)

(52) U.S. Cl. .......................................... 709/227
(58) Field of Classification Search ........................ None
See application file for complete search history.

(56) References Cited

U.S. PATENT DOCUMENTS

| | | | |
|---|---|---|---|
| 4,313,035 A | 1/1982 | Jordan et al. | |
| 4,332,982 A | 6/1982 | Thomas | |
| 4,410,765 A | 10/1983 | Hestad et al. | |
| 4,423,414 A | 12/1983 | Bryant et al. | |
| 4,446,519 A | 5/1984 | Thomas | |
| 4,450,554 A | 5/1984 | Steensma et al. | |
| 4,468,529 A | 8/1984 | Samuel et al. | |
| 4,491,693 A | 1/1985 | Sano et al. | |
| 4,528,659 A | 7/1985 | Jones, Jr. | |
| 4,589,107 A | 5/1986 | Middleton et al. | |
| 4,594,477 A | 6/1986 | Noirot | |
| 4,598,397 A | 7/1986 | Nelson et al. | |
| 4,602,132 A | 7/1986 | Nagatomi et al. | |
| 4,630,262 A | 12/1986 | Callens et al. | |
| 4,652,703 A | 3/1987 | Lu et al. | |
| 4,653,090 A | 3/1987 | Hayden | |
| 4,654,483 A | 3/1987 | Imai et al. | |
| 4,658,093 A | 4/1987 | Hellman | |
| 4,694,492 A | 9/1987 | Wirstrom et al. | |
| 4,706,274 A | 11/1987 | Baker et al. | |
| 4,740,963 A | 4/1988 | Eckley | |
| 4,754,479 A | 6/1988 | Bicknell et al. | |
| 4,755,985 A | 7/1988 | Jayapalan et al. | |

(Continued)

FOREIGN PATENT DOCUMENTS

| AU | 200059377 A1 | 11/2000 |
|---|---|---|
| AU | 200059378 A1 | 11/2000 |

(Continued)

OTHER PUBLICATIONS

"A Low Cost Solution for: Using your WAN as a Voice Communication Tool" VocalTec White Paper (dated Jun. 3, 1994).

(Continued)

*Primary Examiner*—Alexander J Kosowski

(57) ABSTRACT

A communication utility for establishing real-time, point-to-point communications between processes over a computer network includes apparatus for querying a server as to the network protocol address of another client process, and apparatus for directly establishing a communication link with the client process upon receipt of the network protocol address from the server. In one embodiment, the utility includes a sophisticated user interface having features similar to typical telephony hardware but implementing greater flexibility with software.

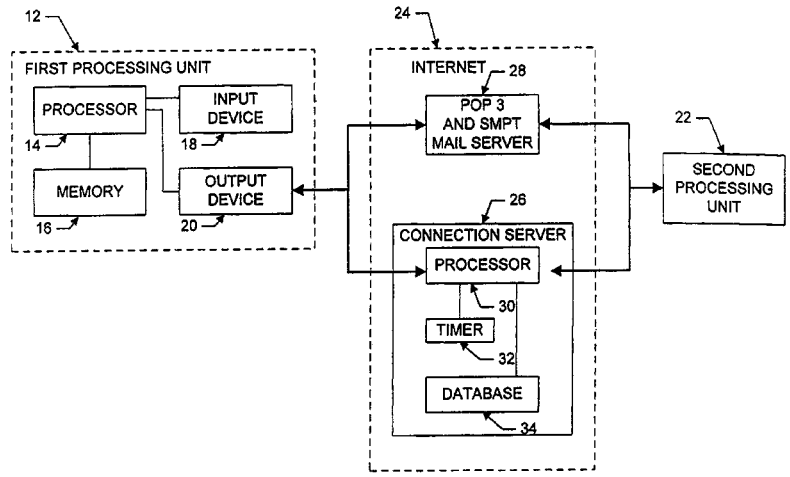

U.S. PATENT DOCUMENTS

| | | |
|---|---|---|
| 4,756,020 A | 7/1988 | Fodale |
| 4,759,056 A | 7/1988 | Akiyama |
| 4,782,485 A | 11/1988 | Gollub |
| 4,799,153 A | 1/1989 | Hann et al. |
| 4,800,488 A | 1/1989 | Agrawal et al. |
| 4,809,271 A | 2/1989 | Kondo et al. |
| 4,813,040 A | 3/1989 | Futato |
| 4,819,228 A | 4/1989 | Baran et al. |
| 4,821,263 A | 4/1989 | Lundh |
| 4,823,374 A | 4/1989 | Verlohr |
| 4,827,411 A | 5/1989 | Arrowood |
| 4,829,554 A | 5/1989 | Barnes et al. |
| 4,837,797 A | 6/1989 | Freeny, Jr. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,899,333 A | 2/1990 | Roediger |
| 4,899,373 A | 2/1990 | Lee et al. |
| 4,912,705 A | 3/1990 | Paneth et al. |
| 4,914,571 A | 4/1990 | Baratz et al. |
| 4,928,306 A | 5/1990 | Biswas et al. |
| 4,932,022 A | 6/1990 | Keeney et al. |
| 4,953,159 A | 8/1990 | Hayden |
| 4,962,449 A | 10/1990 | Schlesinger |
| 4,981,371 A | 1/1991 | Gurak et al. |
| 4,989,230 A | 1/1991 | Gillig et al. |
| 4,995,074 A | 2/1991 | Goldman et al. |
| 5,031,089 A | 7/1991 | Liu et al. |
| 5,036,513 A | 7/1991 | Greenblatt |
| 5,040,141 A | 8/1991 | Yazima et al. |
| 5,056,140 A | 10/1991 | Kimbell |
| 5,065,425 A | 11/1991 | Lecomte et al. |
| 5,107,443 A | 4/1992 | Smith et al. |
| 5,109,403 A | 4/1992 | Sutphin |
| 5,113,499 A | 5/1992 | Ankney et al. |
| 5,121,385 A | 6/1992 | Tominaga et al. |
| 5,127,001 A | 6/1992 | Steagall et al. |
| 5,127,003 A | 6/1992 | Dell, Jr. et al. |
| 5,130,985 A | 7/1992 | Kondo et al. |
| 5,134,648 A | 7/1992 | Hochfield et al. |
| 5,136,716 A | 8/1992 | Harvey et al. |
| 5,150,410 A | 9/1992 | Bertrand |
| 5,153,908 A | 10/1992 | Kakizawa et al. |
| 5,155,726 A | 10/1992 | Spinney et al. |
| 5,157,592 A | 10/1992 | Walters |
| 5,159,592 A | 10/1992 | Perkins |
| 5,164,988 A | 11/1992 | Matyas et al. |
| 5,185,860 A | 2/1993 | Wu |
| 5,187,591 A | 2/1993 | Guy et al. |
| 5,195,086 A | 3/1993 | Baumgartner et al. |
| 5,212,789 A | 5/1993 | Rago |
| 5,214,650 A | 5/1993 | Renner et al. |
| 5,220,599 A | 6/1993 | Sasano et al. |
| 5,241,594 A | 8/1993 | Kung |
| 5,241,625 A | 8/1993 | Epard et al. |
| 5,247,620 A | 9/1993 | Fukuzawa et al. |
| 5,249,290 A | 9/1993 | Heizer |
| 5,274,635 A | 12/1993 | Rahman et al. |
| 5,282,197 A | 1/1994 | Kreitzer |
| 5,283,819 A | 2/1994 | Glick et al. |
| 5,287,103 A | 2/1994 | Kasprzyk et al. |
| 5,301,324 A | 4/1994 | Dewey et al. |
| 5,305,312 A | 4/1994 | Fornek et al. |
| 5,315,705 A | 5/1994 | Iwami et al. |
| 5,319,705 A | 6/1994 | Halter et al. |
| 5,325,524 A | 6/1994 | Black et al. |
| 5,327,486 A | 7/1994 | Wolff et al. |
| 5,329,619 A | 7/1994 | Page et al. |
| 5,335,276 A | 8/1994 | Thompson et al. |
| 5,341,374 A | 8/1994 | Lewen et al. |
| 5,347,632 A | 9/1994 | Filepp et al. |
| 5,377,260 A | 12/1994 | Long |
| 5,388,213 A | 2/1995 | Oppenheimer et al. |
| 5,396,485 A | 3/1995 | Ohno et al. |
| 5,402,477 A | 3/1995 | McMahan et al. |
| 5,402,528 A | 3/1995 | Christopher et al. |
| 5,408,526 A | 4/1995 | McFarland et al. |
| 5,408,619 A | 4/1995 | Oran |
| 5,410,754 A | 4/1995 | Klotzbach et al. |
| 5,425,028 A | 6/1995 | Britton et al. |
| 5,428,608 A | 6/1995 | Freeman et al. |
| 5,432,846 A | 7/1995 | Norio |
| 5,434,913 A | 7/1995 | Tung et al. |
| 5,440,547 A | 8/1995 | Easki et al. |
| 5,440,632 A | 8/1995 | Bacon et al. |
| 5,446,891 A | 8/1995 | Kaplan et al. |
| 5,446,919 A | 8/1995 | Wilkins |
| 5,452,289 A | 9/1995 | Sharma et al. |
| 5,457,738 A | 10/1995 | Sylvan |
| 5,459,864 A | 10/1995 | Brent et al. |
| 5,461,611 A | 10/1995 | Drake, Jr. et al. |
| 5,461,668 A | 10/1995 | Zdenek et al. |
| 5,465,286 A | 11/1995 | Clare et al. |
| 5,467,388 A | 11/1995 | Redd et al. |
| 5,469,500 A | 11/1995 | Satter et al. |
| 5,473,531 A | 12/1995 | Flora-Holmquist et al. |
| 5,474,741 A | 12/1995 | Mikeska et al. |
| 5,474,819 A | 12/1995 | Chambers et al. |
| 5,475,741 A | 12/1995 | Davis et al. |
| 5,475,819 A | 12/1995 | Miller et al. |
| 5,481,720 A | 1/1996 | Loucks et al. |
| 5,483,524 A | 1/1996 | Lev et al. |
| 5,487,100 A | 1/1996 | Kane |
| 5,491,800 A | 2/1996 | Goldsmith et al. |
| 5,499,295 A | 3/1996 | Cooper |
| 5,500,890 A | 3/1996 | Rogge et al. |
| 5,502,727 A | 3/1996 | Catanzaro et al. |
| 5,509,058 A | 4/1996 | Sestak et al. |
| 5,515,508 A | 5/1996 | Pettus et al. |
| 5,517,432 A | 5/1996 | Chandra et al. |
| 5,524,141 A | 6/1996 | Braun et al. |
| 5,528,671 A | 6/1996 | Ryu et al. |
| 5,533,102 A | 7/1996 | Robinson et al. |
| 5,533,110 A | 7/1996 | Pinard et al. |
| 5,544,164 A | 8/1996 | Baran |
| 5,544,322 A | 8/1996 | Cheng et al. |
| 5,546,448 A | 8/1996 | Caswell et al. |
| 5,546,452 A | 8/1996 | Andrews et al. |
| 5,548,636 A | 8/1996 | Bannister et al. |
| 5,548,694 A | 8/1996 | Frisken Gibson |
| 5,555,290 A | 9/1996 | McLeod et al. |
| 5,563,882 A | 10/1996 | Bruno et al. |
| 5,572,643 A | 11/1996 | Judson |
| 5,574,774 A | 11/1996 | Ahlberg et al. |
| 5,574,934 A | 11/1996 | Mirashrafi et al. |
| 5,581,522 A | 12/1996 | Sibuya et al. |
| 5,581,702 A | 12/1996 | McArdle et al. |
| 5,586,257 A | 12/1996 | Perlman |
| 5,586,260 A | 12/1996 | Hu |
| 5,604,737 A | 2/1997 | Iwami et al. |
| 5,606,669 A | 2/1997 | Bertin et al. |
| 5,608,786 A | 3/1997 | Gordon |
| 5,614,940 A | 3/1997 | Cobbley et al. |
| 5,615,257 A | 3/1997 | Pezzullo et al. |
| 5,619,557 A | 4/1997 | Van Berkum |
| 5,621,789 A | 4/1997 | McCalmont et al. |
| 5,623,483 A | 4/1997 | Agrawal et al. |
| 5,623,490 A | 4/1997 | Richter et al. |
| 5,623,605 A | 4/1997 | Keshav et al. |

| Patent No. | Date | Inventor |
|---|---|---|
| 5,625,407 A | 4/1997 | Biggs et al. |
| 5,627,978 A | 5/1997 | Altom et al. |
| 5,636,282 A | 6/1997 | Holmquist et al. |
| 5,636,346 A | 6/1997 | Saxe |
| 5,642,156 A | 6/1997 | Saiki |
| 5,644,629 A | 7/1997 | Chow |
| 5,649,194 A | 7/1997 | Miller et al. |
| 5,651,006 A | 7/1997 | Fujino et al. |
| 5,652,759 A | 7/1997 | Stringfellow, Jr. |
| 5,655,120 A | 8/1997 | Witte et al. |
| 5,659,542 A | 8/1997 | Bell et al. |
| 5,659,596 A | 8/1997 | Dunn |
| 5,668,862 A | 9/1997 | Bannister et al. |
| 5,671,412 A | 9/1997 | Christiano |
| 5,671,428 A | 9/1997 | Muranaga et al. |
| 5,675,507 A | 10/1997 | Bobo |
| 5,680,392 A | 10/1997 | Semaan |
| 5,684,800 A | 11/1997 | Dobbins et al. |
| 5,684,951 A | 11/1997 | Goldman et al. |
| 5,689,553 A | 11/1997 | Ahuja et al. |
| 5,689,641 A | 11/1997 | Ludwig et al. |
| 5,692,180 A | 11/1997 | Lee |
| 5,692,192 A | 11/1997 | Sudo |
| 5,694,594 A | 12/1997 | Chang |
| 5,701,463 A | 12/1997 | Malcolm |
| 5,708,422 A | 1/1998 | Blonder et al. |
| 5,708,655 A | 1/1998 | Toth et al. |
| 5,710,884 A | 1/1998 | Dedrick |
| 5,717,923 A | 2/1998 | Dedrick |
| 5,719,786 A | 2/1998 | Nelson et al. |
| 5,721,827 A | 2/1998 | Logan et al. |
| 5,724,092 A | 3/1998 | Davidsohn et al. |
| 5,724,412 A | 3/1998 | Srinivasan |
| 5,724,506 A | 3/1998 | Cleron et al. |
| 5,724,648 A | 3/1998 | Shaughnessy et al. |
| 5,726,984 A | 3/1998 | Kubler et al. |
| 5,729,748 A | 3/1998 | Robbins et al. |
| 5,732,078 A | 3/1998 | Arango |
| 5,734,828 A | 3/1998 | Pendse et al. |
| 5,736,968 A | 4/1998 | Tsakiris |
| 5,742,668 A | 4/1998 | Pepe et al. |
| 5,742,675 A | 4/1998 | Kilander et al. |
| 5,742,762 A | 4/1998 | Scholl et al. |
| 5,742,905 A | 4/1998 | Pepe et al. |
| 5,745,642 A | 4/1998 | Ahn |
| 5,745,702 A | 4/1998 | Morozumi |
| 5,745,711 A | 4/1998 | Kitahara et al. |
| 5,751,712 A | 5/1998 | Farwell et al. |
| 5,751,961 A | 5/1998 | Smyk |
| 5,754,636 A | 5/1998 | Bayless et al. |
| 5,754,939 A | 5/1998 | Herz et al. |
| 5,758,110 A | 5/1998 | Boss et al. |
| 5,758,257 A | 5/1998 | Herz et al. |
| 5,761,606 A | 6/1998 | Wolzien |
| 5,764,736 A | 6/1998 | Shachar et al. |
| 5,764,741 A | 6/1998 | Barak |
| 5,764,756 A | 6/1998 | Onweller |
| 5,767,897 A | 6/1998 | Howell |
| 5,768,527 A | 6/1998 | Zhu et al. |
| 5,771,355 A | 6/1998 | Kuzma |
| 5,774,656 A | 6/1998 | Hattori et al. |
| 5,774,660 A | 6/1998 | Brendel et al. |
| 5,774,666 A | 6/1998 | Portuesi |
| 5,778,181 A | 7/1998 | Hidary et al. |
| 5,778,187 A | 7/1998 | Monteiro et al. |
| 5,784,564 A | 7/1998 | Camaisa et al. |
| 5,784,619 A | 7/1998 | Evans et al. |
| 5,787,253 A | 7/1998 | McCreery et al. |
| 5,790,548 A | 8/1998 | Sistanizadeh et al. |
| 5,790,792 A | 8/1998 | Dudgeon et al. |
| 5,790,793 A | 8/1998 | Higley |
| 5,790,803 A | 8/1998 | Kinoshita et al. |
| 5,793,365 A | 8/1998 | Tang et al. |
| 5,794,018 A | 8/1998 | Vrvilo et al. |
| 5,794,257 A | 8/1998 | Liu et al. |
| 5,796,394 A | 8/1998 | Wicks et al. |
| 5,799,063 A | 8/1998 | Krane |
| 5,799,072 A | 8/1998 | Vulcan et al. |
| 5,799,150 A | 8/1998 | Hamilton et al. |
| 5,805,587 A | 9/1998 | Norris et al. |
| 5,805,810 A | 9/1998 | Maxwell |
| 5,805,822 A | 9/1998 | Long et al. |
| 5,809,233 A | 9/1998 | Shur |
| 5,812,819 A | 9/1998 | Rodwin et al. |
| 5,815,665 A | 9/1998 | Teper et al. |
| 5,816,919 A | 10/1998 | Scagnelli et al. |
| 5,818,510 A | 10/1998 | Cobbley et al. |
| 5,818,836 A | 10/1998 | DuVal |
| 5,819,084 A | 10/1998 | Shapiro |
| 5,822,524 A | 10/1998 | Chen et al. |
| 5,825,865 A | 10/1998 | Oberlander et al. |
| 5,828,837 A | 10/1998 | Eikeland |
| 5,828,843 A | 10/1998 | Grimm et al. |
| 5,828,846 A | 10/1998 | Kirby et al. |
| 5,832,119 A | 11/1998 | Rhoads |
| 5,832,240 A | 11/1998 | Larsen et al. |
| 5,835,720 A | 11/1998 | Nelson et al. |
| 5,835,723 A | 11/1998 | Andrews et al. |
| 5,835,725 A | 11/1998 | Chiang et al. |
| 5,838,683 A | 11/1998 | Corley et al. |
| 5,838,970 A | 11/1998 | Thomas |
| 5,841,769 A | 11/1998 | Okanoue et al. |
| 5,842,216 A | 11/1998 | Anderson et al. |
| 5,844,978 A | 12/1998 | Reuss et al. |
| 5,848,143 A | 12/1998 | Andrews et al. |
| 5,848,396 A | 12/1998 | Gerace |
| 5,854,901 A | 12/1998 | Cole et al. |
| 5,857,072 A | 1/1999 | Crowle |
| 5,864,684 A | 1/1999 | Nielsen |
| 5,867,156 A | 2/1999 | Beard et al. |
| 5,867,654 A | 2/1999 | Ludwig et al. |
| 5,867,665 A | 2/1999 | Butman et al. |
| 5,872,850 A | 2/1999 | Klein et al. |
| 5,872,922 A | 2/1999 | Hogan et al. |
| 5,872,972 A | 2/1999 | Boland et al. |
| 5,883,956 A | 3/1999 | Le et al. |
| 5,884,032 A | 3/1999 | Bateman et al. |
| 5,884,035 A | 3/1999 | Butman et al. |
| 5,884,077 A | 3/1999 | Suzuki |
| 5,890,162 A | 3/1999 | Huckins |
| 5,892,825 A | 4/1999 | Mages et al. |
| 5,892,903 A | 4/1999 | Klaus |
| 5,892,924 A | 4/1999 | Lyon et al. |
| 5,903,721 A | 5/1999 | Sixtus |
| 5,903,723 A | 5/1999 | Beck et al. |
| 5,903,727 A | 5/1999 | Nielsen |
| 5,905,719 A | 5/1999 | Arnold et al. |
| 5,905,736 A | 5/1999 | Ronen et al. |
| 5,905,865 A | 5/1999 | Palmer et al. |
| 5,905,872 A | 5/1999 | DeSimone et al. |
| 5,915,001 A | 6/1999 | Uppaluru |
| 5,923,736 A | 7/1999 | Shachar |
| 5,924,093 A | 7/1999 | Potter et al. |
| 5,925,103 A | 7/1999 | Magallanes et al. |
| 5,928,327 A | 7/1999 | Wang et al. |
| 5,929,849 A | 7/1999 | Kikinis |
| 5,937,162 A | 8/1999 | Funk et al. |
| 5,946,386 A | 8/1999 | Rogers et al. |
| 5,946,629 A | 8/1999 | Sawyer et al. |
| 5,950,123 A | 9/1999 | Schwelb et al. |
| 5,950,172 A | 9/1999 | Klingman |
| 5,953,350 A | 9/1999 | Higgins |

| | | |
|---|---|---|
| 5,956,482 A | 9/1999 | Agraharam et al. |
| 5,956,485 A | 9/1999 | Perlman |
| 5,961,584 A | 10/1999 | Wolf |
| 5,964,872 A | 10/1999 | Turpin |
| 5,969,967 A | 10/1999 | Aahlad et al. |
| 5,982,774 A | 11/1999 | Foladare et al. |
| 5,983,005 A | 11/1999 | Monteiro et al. |
| 5,999,965 A | 12/1999 | Kelly |
| 6,005,870 A | 12/1999 | Leung |
| 6,006,257 A | 12/1999 | Slezak |
| 6,009,469 A | 12/1999 | Mattaway et al. |
| 6,014,379 A | 1/2000 | White et al. |
| 6,014,710 A | 1/2000 | Talluri et al. |
| 6,016,393 A | 1/2000 | White et al. |
| 6,018,768 A | 1/2000 | Ullman et al. |
| 6,018,771 A | 1/2000 | Hayden |
| 6,021,126 A | 2/2000 | White et al. |
| 6,026,086 A | 2/2000 | Lancelot et al. |
| 6,026,425 A | 2/2000 | Suguri et al. |
| 6,029,175 A | 2/2000 | Chow et al. |
| 6,031,836 A | 2/2000 | Haserodt |
| 6,032,192 A | 2/2000 | Wegner et al. |
| 6,041,345 A | 3/2000 | Levi et al. |
| 6,047,054 A | 4/2000 | Bayless et al. |
| 6,047,292 A | 4/2000 | Kelly et al. |
| 6,055,594 A | 4/2000 | Lo et al. |
| 6,061,716 A | 5/2000 | Moncreiff |
| 6,064,975 A | 5/2000 | Moon et al. |
| 6,065,048 A | 5/2000 | Highley |
| 6,067,350 A | 5/2000 | Gordon |
| 6,069,890 A | 5/2000 | White et al. |
| 6,085,217 A | 7/2000 | Ault et al. |
| 6,101,182 A | 8/2000 | Sistanizadeh et al. |
| 6,105,053 A | 8/2000 | Kimmel et al. |
| 6,108,704 A | 8/2000 | Hutton et al. |
| 6,122,255 A | 9/2000 | Bartholomew et al. |
| 6,125,113 A | 9/2000 | Farris et al. |
| 6,131,121 A | 10/2000 | Mattaway et al. |
| 6,137,877 A | 10/2000 | Robin et al. |
| 6,141,341 A | 10/2000 | Jones et al. |
| 6,151,643 A | 11/2000 | Cheng et al. |
| 6,154,445 A | 11/2000 | Farris et al. |
| 6,163,316 A | 12/2000 | Killian |
| 6,173,044 B1 | 1/2001 | Hortensius et al. |
| 6,178,453 B1 | 1/2001 | Mattaway et al. |
| 6,181,689 B1 | 1/2001 | Choung et al. |
| 6,185,184 B1 | 2/2001 | Mattaway et al. |
| 6,188,677 B1 | 2/2001 | Oyama et al. |
| 6,195,357 B1 | 2/2001 | Polcyn |
| 6,198,303 B1 | 3/2001 | Rangasayee |
| 6,205,135 B1 | 3/2001 | Chinni et al. |
| 6,212,625 B1 | 4/2001 | Russell |
| 6,226,678 B1 | 5/2001 | Mattaway et al. |
| 6,226,690 B1 | 5/2001 | Banda et al. |
| 6,240,444 B1 | 5/2001 | Fin et al. |
| 6,243,373 B1 | 6/2001 | Turock |
| 6,266,539 B1 | 7/2001 | Pardo |
| 6,275,490 B1 | 8/2001 | Mattaway et al. |
| 6,282,272 B1 | 8/2001 | Noonen et al. |
| 6,289,369 B1 | 9/2001 | Sundaresan |
| 6,300,863 B1 | 10/2001 | Cotichini et al. |
| 6,338,078 B1 | 1/2002 | Chang et al. |
| 6,343,115 B1 | 1/2002 | Foladare et al. |
| 6,343,220 B1 | 1/2002 | Van Der Salm |
| 6,347,085 B2 | 2/2002 | Kelly |
| 6,347,342 B1 | 2/2002 | Marcos et al. |
| 6,360,266 B1 | 3/2002 | Pettus |
| 6,377,568 B1 | 4/2002 | Kelly |
| 6,385,583 B1 | 5/2002 | Ladd et al. |
| 6,393,455 B1 | 5/2002 | Eilert et al. |
| 6,427,064 B1 | 7/2002 | Henderson |
| 6,434,552 B1 | 8/2002 | Leong |
| 6,463,565 B1 | 10/2002 | Kelly |
| 6,477,586 B1 | 11/2002 | Achenson et al. |
| 6,513,066 B1 | 1/2003 | Hutton et al. |
| 6,594,254 B1 | 7/2003 | Kelly |
| 6,687,738 B1 | 2/2004 | Hutton |
| 6,701,365 B1 | 3/2004 | Hutton |
| 6,704,802 B1 | 3/2004 | Finch et al. |
| 6,728,784 B1 | 4/2004 | Mattaway |
| 6,772,335 B2 | 8/2004 | Curtis et al. |
| 6,829,645 B1 | 12/2004 | Hutton |
| 6,888,836 B1 | 5/2005 | Cherkasova |
| 6,909,708 B1 | 6/2005 | Krishnaswamy et al. |
| 2003/0050075 A1 | 3/2003 | Rangarajan et al. |
| 2004/0204146 A1 | 10/2004 | Deeds |
| 2005/0032435 A1 | 2/2005 | Tischer et al. |
| 2005/0130611 A1 | 6/2005 | Lu et al. |

FOREIGN PATENT DOCUMENTS

| | | |
|---|---|---|
| AU | 200059379 A1 | 11/2000 |
| EP | 0455402 A2 | 11/1991 |
| EP | 0497022 A1 | 5/1992 |
| EP | 0518596 | 12/1992 |
| EP | 0556012 A2 | 8/1993 |
| EP | 0559047 | 9/1993 |
| EP | 0581722 | 2/1994 |
| EP | 0597691 | 5/1994 |
| EP | 0632672 | 1/1995 |
| EP | 0648038 | 4/1995 |
| EP | 1379039 A2 | 1/2004 |
| EP | 1379050 A2 | 1/2004 |
| GB | 2283645 | 5/1995 |
| JP | 5944140 | 3/1984 |
| JP | 63-131637 | 3/1988 |
| JP | 6-62020 | 3/1994 |
| WO | WO-9003074 | 3/1990 |
| WO | WO-9219054 | 10/1992 |
| WO | WO-9422087 | 9/1994 |
| WO | WO-9714234 | 4/1997 |
| WO | WO-9811704 | 3/1998 |

OTHER PUBLICATIONS

"CyberPhone Annoucement" Internet Posting in Newsgroups comp.speech, Jun. 8, 1995.

"CyberPhone!" Internet Posting in Newsgroups comp.speech, Apr. 14, 1995.

"Electric Magic Company Provides Internet Alternative to Long–Distance Calls", Electric Magic Company Press Release (Mar. 13, 1995).

"Electric Magic Company Releases NetPhone 1.2 and Netpub Server", Electric Magic Company Press Release (Jun. 1995).

"Frequently–Asked Questions about Tribal Voices Pow-Wow" Version 0.34, Mar. 4, 1996.

"Frequently–Asked Questions about Tribal Voices Pow-Wow" Version 0.43, May 1, 1996.

"Frequently–Asked Questions about Tribal Voices Pow-Wow" Version 0.45, May 31, 1996.

"Frequently–Asked Questions about Tribal Voices Pow-Wow" Version 0.47, Jun. 12, 1996.

"Frequently–Asked Questions about Tribal Voices Pow-Wow" Version 0.48, Jun. 25, 1996.

"Frequently–Asked Questions about Tribal Voices Pow-Wow" Version 0.59, Oct. 30, 1996.

"NetPhone Gets Internet Users Talking at Local Rates" MacUser UK, Mar. 3, 1995, p. 27.

"NetPhone Gives Your Mac Voice Over the Internet" Inside the Internet Rocket Science for the Rest of Us. vol. 2 No. 3, Jun. 1995.
"NetPhone" MacWorld, Jul. 1995.
"NetPhone" West Coast Online, Ver. 3.02 (#26), Apr. 1995.
"PowWow 1.3b Now Available!" Google Newsgroup comp.os.ms–windows.misc Discussion Posting (dated Apr. 22, 1995).
1996–1997 Buyer's Guide, CTI for Management.
Abbe Cohen, Inessential Zephyr (Aug. 23, 1993).
Adam Gaffin, VocalTec Ware Lets Users Make Voice Calls over 'Net, Network World (Feb. 13, 1995).
Alexander Schill, ed., DCE—The OSF Distributed Computer Environment: Client/Server Model and Beyond, Lecture Notes in Computer Science 731, Karlsruhe University (1993).
Analysis of DCE Security Draft (Sep. 18, 1996).
Andrew D. Birrell, et al., Grapevine: An Exercise in Distributed Computing, Communications of the ACM (Apr. 1982).
Andrew D. Birrell, et al., Grapevine: An Exercise in Distributed Computing, Communications of the ACM, vol. 25, No. 4, Apr. 1982.
Andrew D. Birrell, et al., Implementing Remote Procedure Calls, ACM Transactions on Computer Systems (Feb. 1984).
Andrew S. Tanenbaum, Computer Networks, 2d ed. (Prentice–Hall, 1988).
Andy Patrizio, Telecom, Digital Limits Begin to Blur with 'Phone Calls' Across Internet, PC Week, vol. 12, No. 6 (Feb. 13, 1995).
Antonio Ruiz, Voice and Telephony Applications for the Office Workstation, IEEE 1st International Conference on Computer Workstations, San Jose, California (Nov. 11–14, 1985).
AVC–650: Technical Issues Concerning Real–Time Protocol in H.32Z Systems in ATM and Other Packet–Switched Computer Networks, Jul. 9, 1994.
AVC–655: Communication Procedure for H.222.1 Jul. 1, 1994.
AVC–666: H.32X Communication Modes, Terminal Types and Interworking Scenarios, Jul. 1994.
AVC–683: Update Draft H.32Z Following Grimstad Meeting, Nov. 1994.
AVC–696: An Example of Call Setup Procedure in a H.32Z Terminal, Nov. 1994.
AVC–702: Terminal to Terminal Signaling in H.32X, Oct. 24, 1994.
AVC–707R: Report of the Seventeenth Experts Group Meeting in Singapore (Jul. 1–11, 1994)—Part 1 and Part II, Nov. 11, 1994.
AVC–716: Draft Recommendation H.32X, Jan. 1995.
AVC–718: Draft H.32X, Jan. 1995.
AVC–743R: Report of the Eighteenth Experts Group Meeting in Kamifukuoka (Jan. 24–27, 1995), Jan. 27, 1995.
AVC–748: Update of Draft Recommendation H.322, May 1995.
AVC–750: Report of the Study Group 15 Meeting Held During Feb. 6–17, 1995, Feb. 24, 1995.
AVC–752: Open Issues Towards the Stockholm Meeting, Mar. 17, 1995.
AVC–758: Draft Recommendation H.323 Visual Telephone Systems and Terminal Equipment for Local Area Networks Which Provide A Non–Guaranteed Quality of Service, Rev. May 12, 1995.
AVC–767: Logical Channel Set–up Procedure, Apr. 28, 1995.
AVC–799: Comments on Draft H.323 and H.22Z, May 11, 1995.
AVC–800R: Report of the Nineteenth Experts Group Meeting in Haninge (May 15–18, 1995), May 18, 1995.
AVC–813: Signaling Recommendation Within the Scope of H.323, Sep. 10, 1995.
AVC–819: LAN Addressing Plan in H.323, Sep. 10, 1995.
AVC–830: Connection Management Procedures for H.323, Oct. 24–27, 1995.
AVC–842: Gateway, Gatekeeper and Terminal Procedures in H.323, Oct. 17, 1995.
Avnish Aggarwal, et al., RFC 1002: Protocol Standard for a NetBIOS Service on a TCP/UDP Tansport: Detailed Specifications (Mar. 1987).
Barbara Darrow, Internet Phone Chat Software Prompts Spat; IRC Operations Rebuffed Use of Their Systems, Computer Reseller News (Mar. 20, 1995).
Barry Michael Arons, The Audio–Graphical Interface to a Personal Integrated Telecommunications System, Masters Thesis, Massachusetts Institute of Technology (Jun. 1984).
Barry Phillips, Casting the Net for New Media, OEM Magazine, No. 320 (1995).
Belville, Sharon, "Zephyr on Athena", Athena Documentation, Sep. 10, 1991, Version 3.
Ben Mesander, et al., The Client–To–Client Protocol (Aug. 12, 1994).
Bill Welsh, H.245 Implementors' Guide (undated but references Apr. 1996).
Bob Blakley's Email to sig–dce–security, DCE Delegation Proposal Review, Jul. 7, 1992.
Brad Curtis Johnson, A Distributed Computing Environment Framework: An OSF Perspective (1991).
Brent Nordin, et al., Remote Operation Across a Network of Small Computers (Association of Computing Machinery, 1986).
Brian Fox, et al., GNU Finger program documentation, Free Software Foundation (1992).
Bruce Brown, BugNet Bug/Fix List, Newsbytes (Dec. 13, 1995).
Bruce Brown, BugNet Bug/Fix List, Newsbytes (Dec. 13, 1996).
Butler W. Lampson, et al., A Distributed Systems Architecture for the 1990's (Dec. 17, 1989).
Buy Memory Configured Expressly for Your Computer, San Jose Mercury News (Jul. 16, 1995).
C. Anthony DellaFera, et al., Section E.4.1: Zephyr Notification Service, Athena Technical Plan (Jul. 29, 1988).
C. Anthony DellaFera, et al., Section E.4.1: Zephyr Notification Service, Project Athena Technical Plan (Jun. 5, 1989).
C. Anthony DellaFera, et al., The Athena Notification Service: Zephyr (1987).
C. Anthony DellaFera, et al., The Athena Notification Service: Zephyr (Dec. 31, 1987).
C. Anthony DellaFera, et al., The Zephyr Notification Service (undated).
C. Anthony DellaFera, et al., The Zephyr Notification Service, USENIX Winter Conference, Feb. 9–12, 1988.
C. Anthony DellaFera, The Zephyr Notification Service, MIT Project Athena, Winter Usenix Conference (Feb. 12, 1988).
C. Malamud, et al., RFC 1528: Principles of Operation for the TPC.INT Subdomain: Technical Procedures (Oct. 1993).

C. Malamud, et al., RFC 1530: Principles of Operation for the TPC.INT Subdomain: General Principles and Policy (Oct. 1993).

C. Sunshine, et al., IEN 135: Addressing Mobile Hosts in the ARPA Internet Environment (Oct. 1985).

C. Yang, RFC 1789: INETPhone: Telephone Services and Servers on Internet (Apr. 1995).

Calls Waiting on the Internet Although Telephone Software Makes 'Free' Long Distance Possible, it's a Long Way from Practical, Kansas City Star (Jul. 14, 1996).

Carl Sunshine, IEN 178: Addressing Problems in Multi–Network Systems (Apr. 1981).

Charles E. Perkins, et al., A Mobile Networking System Based on Internet Protocol, IEEE Personal Communication (First Quarter 1994).

Charlie Kaufman's Email to dmackey re DCE 1.1 Delegation Proposal for Review, Jun. 22, 1992.

Chii–Ren Tsai, et al., Distributed Audit with Secure Remote Procedure Calls (1991).

Christopher Schmandt, et al., An Audio and Telephone Server for Multi–Media Workstation, IEEE (1988).

Christopher Schmandt, et al., Phone Slave: A Graphical Telecommunications Interface, Society for Information Display, 1984 International Symposium Digest of Technical Papers (Jun. 1984).

Chuck Kane, List of IRC servers as of Feb. 1, 1995, available at http://ftp.funet.fi/pub/unix/irc/does/servers.950201.

Clinton Wilder, Pulling in the Net—InfoSeek, VocalTec Offer Search and Voice Options to Internet Users Online, Informationweek, No. 516 (1995).

Common Desktop Environment 1.0—Advanced User's and System Administrator's Guide, Addison–Wesley Publishing Co. (1995).

Common Desktop Environment 1.0—User's Guide, Addison–Wesley Publishing Co. (1995).

Communications Connectivity Networking, Microsoft Systems Journal, vol. 10, No. 1 (Jan. 1995).

Comp.Speech FAQ Archive; Comp.Speech FAQ Web Page, Comp.Speech Newsgroup, Jul. 17, 1995).

Comp.Speech FAQ Weekly Reminder, Comp.Speech Newsgroup (Jun. 21, 1995).

Contents, Preface, and Index to Open Software Foundation, X/Open Preliminary Specification—X/Open DCE: Authentication and Security Services (Mar. 1996).

Conversation Excerpt from ftp://svr–ftp.eng.camac.uk/pub/pub/comp.speech/archive/subject5xxx.txt accessed on Nov. 28, 2007.

Craig Crossman, Free Calls on Internet are CB–Style No Longer, Miami Herald (Jun. 26, 1995).

Craig Crossman, Make Long Distance Calls Via the Internet, Record (Jul. 3, 1995).

D. O'Mahoney, 1st Generation Internet Phones (1998).

D. Reed, RFC 1324: A Discussion on Computer Network Conferencing (May 1992).

D. Zimmerman, RFC 1288: The Finger User Information Protocol (Dec. 1991).

Dale Skran, Draft ITU–T Recommendation H.225.0—Line Transmission of Non–Telephone Signals, Media Stream Packetization and Synchronization on Non–Guaranteed Quality of Service LANs (May 28, 1996).

Dale Skran, ed. ASN.1 for H.225.0 (Jun. 18, 1996).

Dan Cohen, IEN 31: On Name, Addresses and Routings (II) (Apr. 28, 1978).

Dan Keating, Ring! It's Computer Calling Phone By Internet Has Gotten Better, Miami Herald (May 22, 1996).

Daniel C. Swinehart, Telephone Management in the Etherphone System, IEEE (1987).

Daniel H. Craft, Resource Management in a Decentralized System, Operating Systems Review, vol. 17, No. 5 (Association for Computing Machinery, Oct. 1983).

Danny Cohen, IEN 23: On Name, Addresses and Routings (Jan. 23, 1978).

Dave Lindbergh, H.323 Encryption, Document: CNC–96–22 (Apr. 15, 1996).

David D. Clark, RFC 814: Name, Addresses, Ports, and Routes (Jul. 1982).

David Gertler, Hardware and Software Tidbits from CEBIT, Seybold Report on Desktop Publishing, vol. 9, No. 8 (Apr. 3, 1995).

David Hafke, New on the Net—Talk It Up, Windows Magazine, No. 711 (1996).

David Harvey, All the News That's Fit to Speak, NetGuide, No. 301 (1996).

David R. Cheriton, et al., A Decentralized Naming Facility (Stanford University, Feb. 1, 1986).

David R. Cheriton, The V Distributed System, Communications of the ACM, vol. 31, No. 3, (Apr. 1988).

David Rapp, I've Got to Get a Message to You, Instant Messaging Started as an MIT Computer–Science Department Project, Technology Review (2002).

DCE 1.0 Security Technology, architectural overview documents, Walter Tuvell, Feb. 1997.

DCE 1.1 Security Technology, architectural overview documents May 1994.

DCE RPC Internals and Data Structures (Aug. 1993).

Dean Adams, ed., Security Survival: An indispensable guide to securing your business, X/Open Co. (1996).

Decided H.225.0 (Jun. 19, 1996).

Derek C. Oppen, et al., The Clearinghouse: A Decentralized Agent for Locating Named Objects in a Distributed Environment (Association for Computing Machinery, 1983).

Description of New Zephyr Protocol (undated).

Digiphone Specifications, from Q1.11 of Section 1 of the comp.speech FAQ Home Page (dated Jan. 6, 1997).

Douglas B. Terry, et al., The Berkeley Internet Name Domain Server, USENIX Association Software Tools Users Group, Summer Conference, Salt Lake City, Utah (Jun. 12–15, 1984).

Douglas B. Terry, Structure freeName Management for Evolving Distributed Environments, IEEE 6th International Conference on Distributed Computing Systems, Cambridge, Massachusetts (May 19–23, 1986).

Douglas Brian Terry, Distributed Name Servers: Naming and Caching in Large Distributed Computing Environments, Ph.D. Thesis, University of California, Berkeley (Feb. 21, 1985).

Douglas E. Corner, Internetworking with TCP/IP: vol. 1: Principles, Protocols, and Architecture, 1st ed. (Prentice–Hall, 1988).

Douglas E. Comer, Internetworking With TCP/IP: vol. 1: Principles, Protocols, and Architecture, 3d ed. (Prentice–Hall, 1995).

Douglas E. Comer, Internetworking With TCP/IP: vol. 1: Principles, Protocols, and Architectures, 2d ed. (Prentice–Hall, 1991).

Douglas W. Johnson, Internet–Connected Phone Calls Dial in to Lower Prices, Computerworld (Feb. 19, 1996).

Draft ITU–T Recommendation G.723—Dual Rate Speech Coder for Multimedia Communications Transmitting at 5.3 & 6.3 KBIT/S (Oct. 17, 1995).

Draft ITU–T Recommendation H.323 Line Transmission of Non–Telephone Signals: Visual Telephone Systems and Equipment for Local Area Networks Which Provide a Non–Guaranteed Quality of Service (May 28, 1996).

Draft Recommendation H.323 Visual Telephone Systems and Terminal Equipment for Local Area Networks Which Provide A Non–Guaranteed Qualtiy of Service, Sep. 8, 1995.

Draft Recommendation H.323—13 Visual Telephone Systems and Equipment for Local Area Networks Which Provide A Non–Guaranteed Quality of Service (May 28, 1996).

E.D. Sykas, et al., Overview of the CCITT X500 Recommendations Series (Butterworth–Heinemann, 1991).

Electric Magic Company Sales Invoices, Feb. 23, 1995 thru December 3, 1995.

Electric Magic Company, Beta Test License Agreement (dated May 30, 1995).

Elizabeth Feinler, et al., RFC 810: DoD Internet Host Table Specification (Mar. 1, 1982).

Ellen Massmer, PictureTel Brings Video to the Lan Network World (Sep. 4, 1995).

E–mail from Dale Skran to jtoga@ibeam.jf. intel.com, phone numbers for email list (Jan. 6, 1997).

E–mail from Dale Skran to jtoga@ibeam.jf.intel.com, mailing list to enter (Jan. 6, 1997).

E–mail from Ofer Shapiro to Bob Bell, et al., RE: Destination side gateway problem (Jul. 29, 1996).

E–mail from Sakae Okubo to Experts of ITU–T SG16 Q.12/16, Q.13/16 and Q.14/16, Notice of the Q.12–14/16 Sunriver meeting (Jul. 17, 1997).

Email from Sakae Okubo to yves.robin–champigneu10issy.cnet.fr, et al., Working tools of SG16 experts groups (May 8, 1997).

E–mail from Vineet Kumar to h323implementors@mailbag.jf.intel.com Receiver associating a logical channel with a RTP stream (Aug. 5, 1996).

Erdos, Marlena and Pato, Joseph, "Extending the OSF DCE Authorization System to Support Practical Delegation," Feb. 11, 1993.

Eric C. Rosen, IEN 183: Logical Addressing (May 1981).

Eric C. Rosen, IEN 188: Issues in Internetting Part 3: Addressing (Jun. 1981).

Etherphone: Collected Papers 1987–1988, Xerox PARC, CSL–89–2 (May 1989).

Eve M. Schooler, Case Study: Multimedia Conference Control in a Packet–Switched Teleconferencing System, Journal of Internetworking: Research and Experience, vol. 4, No. 2 (Jun. 1993).

Eve M. Schooler, et al., An Architecture for Multimedia Connection Management, Proceedings IEEE 4th Comsoc International Workshop on Multimedia Communications, MM '92, Monterey, California (Apr. 1992).

Eve M. Schooler, The Connection Control Protocol: Architecture Overview (Jan. 28, 1992).

Eve M. Schooler, The Connection Control Protocol: Specification, Version 1.1 (Jan. 29, 1992).

Eve M. Schooler, The Impact of Scaling on Multimedia Connection Architecture, Multimedia Systems, vol. 1 (Association for Computing Machinery, 1993).

Exportability of DCE Multi–Crypto Feature by Walter Tuvell, Mar. 5, 1996.

F. Anklesaria, et al., RFC 1436: The Internet Gopher Protocol (A Distributed Document Search and Retrieval Protocol) (Mar. 1993).

FAQ: How Can I Use the Internet as a Telephone, Ver. 0.2 (Apr. 27, 1995).

FAQ: How Can I Use the Internet as Telephone, Ver. 0.4 (Feb. 23, 1996).

Fax from Ryan Holmquist to Dale Skran (May 30, 1996).

FLEXIm v3.0 Programmer's Guide, Globetrotter Software, Inc. (Aug. 1994).

Full Duplex Internet Voice Comms Available, Newsbytes (Feb. 14, 1995).

Gary A. Thom, H.323: The Multimedia Communications Standard for Local Area Networks, IEEE Communications Magazine (Dec. 2006).

Gilbert Held, The ABCs of IP Addressing, CRC Press LLC (2002).

Gligor, et al. "On Inter–realm Authentication in Large Distributed Systems" May 2, 1992.

Google Groups "CyberPhone" Search Results, search conducted on Nov. 28, 2007.

Goretsky, Aryeh "PowWow Quick Installation Guide", 1996.

Green, Andrew, NetPhone Tasks and Plans, Email, 2 pages (printed Feb. 2, 1995).

Greg Wood. Computer VAR Takes His First Computer Telephony Plunge, Computer Telephony (Sep. 1996).

Gursharan S. Sidu, et al., Inside AppleTalk, 2d ed. (Addison–Wesley Publishing Co., 1990).

H. Schulzrinne, et al., RFC 1889: RTP: A Transport Protocol for Real–Time Applications (Jan. 1996).

Handwritten Notes, Electric Magic Company (dated Jul. 22, 1994 thru Aug. 30, 1995).

Harrick M. Vin., et al., Multimedia Conferencing in the Etherphone Environment (IEEE, Oct. 1991).

How Can I use the Internet as a telephone? from Q1.11 of Section 1 of the comp.speech FAQ Home Page (dated Mar. 19, 1996).

Hussein M. Abdel–Wahab, XTV: A Framework for Sharing X Window Clients in Remote Synchronous Collaboration, IEEE Conference on Communications Software: Communications for Distributed Applications & Systems (Apr. 1991).

I C. Weider, et al., RFC 1727: A Vision of an Integrated Information Service (Dec. 1994).

Inder Gopal, et al., Directories for Networks with Casually Connected Users (IEEE, 1988).

Information Technology—Database Language SQL (Proposed revised text of DIS 9075), Digital Equipment Corp. (Jul. 1992).

InterFACE from Hijinx Specifications, from Q1.11 of Section 1 of the comp.speech FAQ Home Page (dated Mar. 19, 1996).

Internet Phone from VocalTec Specifications, from Q1.11 of Section 1 of the comp.speech FAQ Home Page (dated Mar. 19, 1996).

Internet Phone Release 4, Users Manual, VocalTech 1996.

Internet Telephone Companies Racing to Market, Voice Technology & Services News, vol. 14 No. 20 (Oct. 3, 1995).

Introduction to OSF DCE (Prentice–Hall, Inc., 1992).

ITU–T Recommendation X.500—Information Technology—Open Systems Interconnection—The Directory: Overview of concepts, models and services (Aug. 1997).

ITU–T Recommendation X.501—Information technology—Open Systems Interconnection—The Directory: Models (Aug. 1997).

J. Oikarinan, et al., RFC 1459: Internet Relay Chat Protocol (May 1993).

J. Pato, Hierarchical Trust Relationships for Inter–Cell Authentication, Slides, (Jul. 7, 1992).

J. Pato, RFC 7.0: Hierarchical Trust Relationships for Inter–Cell Authentication (Jul. 1992).

J. Postel, et al., RFC 959: File Transfer Protocol (FTP) Oct. 1985).

J. Postel, RFC 765: File Transfer Protocol (Jun. 1980).

J. Postel, RFC 925: Multi–LAN Address Resolution (Oct. 1984).

J. Saltzer, RFC 1498: On the Naming and Binding of Network Destinations (Aug. 1993).

Jack Rickard, Voice Over Internet—the Internet Phone, Boardwatch Magazine, vol. 9, No. 4 (Apr. 1995).

James M. Bloom, et al., Experience Implementing BIND, A Distributed Name Server for the DARPA Internet (Jun. 9–13, 1986).

James Martin, et al., TCP/IP Networking: Architecture, Administration, and Programming (Prentice Hall, 1994).

James Staten, NetPhone 1.2 Calls the Web, MACWEEK, vol. 9, No. 27 (Jul. 10, 1995).

Jennifer G. Steiner, et al., Kerberos: An Authentication Service for Open Network Systems, Usenix Winter Conference, Dallas, Texas (Feb. 9–12, 1988).

Joe Maloney, DCE: Focus on Security, the Internet and the Future (printed Apr. 25, 2002, date unknown).

Joe Pato, et al., Distributed Computing Environment (DCE) Design of the Security Services and Facilities (Aug. 10, 1992).

Joe Pato, Extending the DCE Authorization Model to Support Practical Delegation—Extended Summary (Jul. 7, 1992).

Joe Pato, RFC 3.0: Extending the DCE Authorization Model to Support Practical Delegation—Extended Summary (Jun. 1992).

Joe Pato, RFC 6.0: A Generic Interface for Extended Registry Attributes (Jun. 1992).

John A. Pershing, Jr., et al., IEN 162: Transport, Addressing, and Routing in the Wideband Net (Oct. 1980).

John F. Shoch, IEN 19: Inter–Network Naming, Addressing, and Routing (Jan. 1978).

John Ioannidis, et. al., IP–based Protocols for Mobile Internetworking, Columbia Univ. Dept. of Computer Science (1991).

John R. Pickens, et al., RFC 756: The NIC Name Server—A Datagram Based Information Utility (Jul. 1979).

John T. Kohl, The Zephyr Notification Service, First International Athena Technical Conference (Apr. 11, 1991).

John Veizades, et al., Service Location Protocol, Internet Draft (May 2, 1995).

Jon Hill, et al., Pow Wow, PC Magazine, vol. 15 No. 17 (Oct. 8, 1996).

Jon Hill, TeleVox, PC Magazine, vol. 15 No. 17 (Oct. 8, 1996).

Jon Livesey, Inter–process Communication and Naming in the Mininet System, Eighteenth Annual IEEE Computer Society International Conference, San Francisco, California (1979).

Jon Postel, RFC 921: Domain Name System Implementation Schedule—Revised (Oct. 1984).

José M. Bernabeu–Auban, et al., Optimizing a Generalized Polling Protocol for Resource Finding over a Multiple Access Channel, Computer Networks and ISDN Systems 27 (1995).

Josina M. Arfman, et al., Project Athena: Supporting Distributed Computing at MIT, IBM Systems Journal (1992).

K. Harrenstien, et al., RFC 811: Hostname Server (Oct. 1985).

K. Harrenstien, et al., RFC 952: DoD Internet Host Table Specification (Oct. 1985).

K. Harrenstien, RFC 742: Name/Finger (Dec. 30, 1977).

Kahane, Opher et al., "Call Management Agent System Specification" VoIP Forum Technical Committee Contribution (dated Aug. 15, 1996).

Karl Auerbach, et al., RFC 1001: Protocol Standard for a NetBIOS Service on a TCP/UDP Transport: Concepts and Methods (Mar. 1987).

Keith A. Lantz, et al., Towards a Universal Directory Service, 4th PODC Conference Proceedings (Association for Computing Machinery, 1985).

Ken Harrenstien, et al., RFC 811: Hostnames Server (Mar. 1, 1982).

Ken Harrenstien, RFC 811: Hostnames Server (Mar. 1, 1982).

Ken Harrenstien, RFC 812: Nicname/Whois (Mar. 1, 1982).

Kenneth Hart, Startups, industry mainstays add to Internet phone menu, Communicationsweek Int'l (Nov. 27, 1995).

Klaus Zeuge, et al., The Client–to–Client Protocol (CTCP) (published no later than Aug. 12, 1994).

Kohl, John T., "Zephyr Installation and Operation Guide", Draft—Nov. 20, 1989.

Koster, Steven "The Phone Companies Worst Nightmare" Hotwired, Apr. 1995.

L. Landweber, et al., Architecture of the CSNET Name Server (Association for Computing Machinery, 1983).

L. Peter Deutsch, RFC 606: Host Names On–Line (Dec. 1973).

Larry L. Peterson, A Yellow–Pages Service for a Local–Area Network (Association for Computing Machinery, 1988).

Larry L. Peterson, The Profile Naming Service, ACM Transactions on Computer Systems, vol. 6, No. 4, (Nov. 1988).

Lisa Zahn, et al., Network Computing Architecture, Prentice Hall (1990).

List of Names from a DCE Meeting; attendees from DISA, OSF, DEC, Mitre, HP, Open Market and others (undated).

Listsery postings by Jon Postel, Dynamic Updated Proposal, dated Sep. 1 and 9, 1993.

Listsery postings by Susan Thomson, DNS Dynamic Updates, dated Jul. 14, 1994.

Lon Wagner, New Software Lets Users Talk for Cheap, Virginian–Pilot (Mar. 26, 1995).

M. Bever, et al., Distributed Systems, OSF DCE, and Beyond (1993).

M.D. Kudlick, RFC 608: Host Names On–Line (Jan. 10, 1974).

Making the Most of IP Telephony, VocalTec Annual Report 1997.

Mark Crispin, RFC 752: A Universal Host Table (Jan. 2, 1979).

Mark Reid, Ptell Call Control Procedure in H.323 (Jun. 16, 1995).

Markus Sohlenkamp & Greg Chwelos, Integrating Communication, Cooperation, and Awarness: The DIVA Virtual Office Environment (1994).

Mic Bowman, et al., Univers: An Attribute–based Name Server, Software Practice and Experience, vol. 20(4) (Apr. 1990).

Michael D. Schroeder, et al., Experience with Grapevine: The Growth of a Distributed System, ACM Transactions on Computer Systems (Feb. 1984).

Michael D. Schroeder, et al., Experience with Grapevine: The Growth of a Distributed System, ACM Transaction on Computer Systems, vol. 2, No. 1 (Feb. 1984).

Michael F. Schwartz, et al., A Comparison of Internet Resource Discovery Approaches, Computing Systems (Aug. 1992).

Michael F. Schwartz, et al., A Name Service for Evolving, Heterogeneous Systems, ACM (1987).

Michael J. Bibeau, A Formative Evaluation of CU–SeeMe, Masters Thesis, Virginia Polytechnic Institute and State University (Feb. 20, 1995) (including CU–SeeMe Users Manual by same author published Jan. 1995).

Michelle Slatalla, Hold the Phone! You Can Call Long Distance on a Computer For Pennies, But it has its Drawbacks, Newsday (Mar. 14, 1995).

Mike Kong, et al., Network Computing System Reference Manual, Prentice Hall (1990).

Mike Kudlick, et al., RFC 627: ASCII Text File of Hostnames (Mar. 25, 1974).

Mitch Wagner, Phone Home Cheaply Over the I–Way, Open Systems Today (Feb. 20, 1995).

Mitre Fort Meade Site DCE Meeting Sign In Sheet Jan. 16, 1995.

Mostafa H. Ammar, et al., Using Hint Tables to Locate Resources in Distributed Systems (IEEE, 1988).

Motorola Micro TAC International 5000 Series Manual (undated).

Motorola Micro TAC International 7000 Series (dated May 1994).

Motorola Micro TAC International 7500 Series (undated).

Motorola Micro TAC International 8000 Series (undated).

Nate Zelnick, Chat on the Web: An Overview, Interactive Content, vol. 2, No. 17 (Sep. 1995).

Nautilus: Secure Computer Telephony, from Q1.11 of Section 1 of the comp.speech FAQ Home Page (dated Aug. 7, 1996).

NetPhone 1.0 User Manual, Electric Magic Company (document includes date Dec. 31, 1994).

NetPhone 1.1 User Manual, Electric Magic Company (document includes date Feb. 16, 1995).

NetPhone Demo Instructions, Electric Magic Company, 1994.

NetPhone Development Plan (undated).

NetPhone Development Plan v0.1 (undated).

NetPhone Digital User Manual, Electric Magic Company, Feb. 26, 1995.

NetPhone Digital User Manual, Electric Magic Company, Mar. 12, 1995.

NetPhone Information Manual, Electric Magic Company, May 30, 1995.

NetPhone Testing Notes, Sep. 28, 1994.

Netphone, Change Notes, Dec. 6.

Nigel Hinds, et al., Name Space Models for Locating Services, IBM Canada Laboratory Technical Report 74.074 (1991).

Norbert Leser, Towards a Worldwide Distributed File System: The OSF DCE File System as an example (Sep. 27, 1990).

Open Group, Cambridge Information (Jun. 23, 1997).

Open Software Foundation Security Sig (Mar. 19, 1996).

Open Software Foundation, AES/Distributed Computing RPC Volume, PTR Prentice Hall (1994).

Open Software Foundation, DCE Internals Course, Instructor Guide vol. 1 (1992).

Open Software Foundation, DCE Internals Course, Instructor Guide vol. 2 (1992).

Open Software Foundation, Industry Analysis of DCE (May 15, 1990).

Open Software Foundation, Introduction to OSF DCE , Prentice Hall (1992).

Open Software Foundation, Open Line Magazine (May/Jun. 1990).

Open Software Foundation, OSF DCE Administration Guide Core Components, PTR Prentice Hall (1993).

Open Software Foundation, OSF DCE Administration Guide—Extended Services, PTR Prentice Hall (1993).

Open Software Foundation, OSF DCE Administration Guide—Introduction, PTR Prentice Hall (1993).

Open Software Foundation, OSF DCE Administration Reference, PTR Prentice Hall (1993).

Open Software Foundation, OSF DCE Application Development Guide, PTR Prentice Hall (1993).

Open Software Foundation, OSF DCE Application Development Reference, PTR Prentice Hall (1993).

Open Software Foundation, OSF DCE User's Guide and Reference, PTR Prentice Hall (1993).

OSF DCE User's Guide and Reference (Prentice–Hall, Inc., 1993).

P. Deutsch, et al., RFC 1835: Architecture of the Whois++ Service (Aug. 1995).

P. Faltstrom, et al., RFC 1914: How to Interact with a Whois++ Mesh (Feb. 1996).

P. Mockapetris, RFC 882: Domain Names—Concepts and Facilities (Nov. 1983).

P. Mockapetris, RFC 883: Domain Names—Implementation and Specification (Nov. 1983 ).

P. Venkat Rangan, et al., Software Architecture for Integration of Video Services in the Etherphone System, IEEE Journal on Selected Areas in Communications, vol. 9, No. 9 (Dec. 1991).

P.M. Gopal, et al., Consistent Resource Registration, IBM Technical Disclosure Bulletin, vol. 37, No. 9 (Sep. 1994).

Part 1 of Open Software Foundation, X/Open Preliminary Specification—X/Open DCE: Authentication and Security Services (Mar. 1996).

Part 2 chapter 2 thru 5 of Open Software Foundation, X/Open Preliminary Specification—X/Open DCE: Authentication and Security Services (Mar. 1996).

Part 2 chapter 6 thru 13 of Open Software Foundation, X/Open Preliminary Specification—X/Open DCE: Authentication and Security Services (Mar. 1996).

Part 3 and Part 4 of Open Software Foundation, X/Open Preliminary Specification—X/Open DCE: Authentication and Security Services (Mar. 1996).

Pato, Joseph N., A Generic Interface for Extended Registry Attributes, Jul. 7, 1992.

Paul Albitz, et al., DNS and Bind in a Nutshell (O'Reilly & Associates, 1992).

Paul Mockapetris, RFC 1034: Domain Name—Concepts and Facilities (Nov. 1987).

Paul Mockapetris, RFC 1035: Domain Name—Implementation and Specification (Nov. 1987).

Paul V. Mockapetris, et al., Development of the Domain Name Server, Computer Communication Review, vol. 18, No. 4 (Aug. 1988).
Paul V. Mockapetris, et al., Development of the Domain Name System, Computer Communication Review (Aug. 1988).
Phoning By Web, San Francisco Chronicle (Mar. 12, 1996).
PictureTel Corp., 10–K405/A (filed Jan. 13, 1998).
PictureTel LiveLan (printed Dec. 3, 2007).
Ping Lin's Email to mackey, Comments on DCE 1.1 Delegation RFC, Jul. 2, 1992.
Polle T. Zellweger, et al., An Overview of the Etherphone System and its Applications (IEEE, 1988).
Postel, RFC 791: Internet Protocol: Darpa Internet Program Protocol Specification (Sep. 1981).
Postel, RFC 793: Transmission Control Protocol: Darpa Internet Program Protocol Specification (Sep. 1981).
PowWow For Microsoft Windows User's Guide, Version 1.4B, Documentation by Token White Man (dated 1995).
PowWow For Microsoft Windows User's Guide, Version 1.5, Documentation by Aryeh Goretsky (dated 1995).
PowWow For Microsoft Windows User's Guide, Version 1.6 beta 2, Documentation by Aryeh Goretsky (dated 1995).
PowWow For Microsoft Windows User's Guide, Version 1.6 beta, Documentation by Aryeh Goretsky (dated 1995).
PowWow For Microsoft Windows User's Guide, Version 1.7 beta 1, Documentation by Aryeh Goretsky (dated 1995).
PowWow For Microsoft Windows User's Guide, Version 1.7 beta 2, Documentation by Aryeh Goretsky (dated 1995).
PowWow For Microsoft Windows User's Guide, Version 1.7 beta 3, Documentation by Aryeh Goretsky (dated 1995).
PowWow For Microsoft Windows User's Guide, Version 1.7 beta 4, Documentation by Aryeh Goretsky (dated 1995).
PowWow For Microsoft Windows User's Guide, Version 2.0 beta 1, Documentation by Aryeh Goretsky (dated 1995, 1996).
PowWow For Microsoft Windows User's Guide, Version 2.1, Documentation by Aryeh Goretsky (dated 1995, 1996).
PowWow For Microsoft Windows User's Guide, Version 2.2 beta 1, Documentation by Aryeh Goretsky (dated 1995, 1996).
PowWow For Microsoft Windows User's Guide, Version 2.2 beta 2, Documentation by Aryeh Goretsky (dated 1995, 1996).
PowWow For Microsoft Windows User's Guide, Version 2.3, Documentation by Aryeh Goretsky (dated 1995, 1996).
PowWow For Microsoft Windows User's Guide, Version 2.31, Documentation by Aryeh Goretsky (dated 1995, 1996).
PowWow For Microsoft Windows User's Guide, Version 2.32, Documentation by Aryeh Goretsky (dated 1995, 1996).
PowWow For Microsoft Windows User's Guide, Version 3.0 beta 3, Documentation by Aryeh Goretsky (dated 1995, 1996).
PowWow User Local Server Version 1.0 beta 2 Release Notes (Dated Jun. 18, 1996).
PowWow User Location Server for Microsoft Windows NT and 95 Version 1.0 beta 2 Installation Guide, by Gorestsky, Aryeh (dated 1996).
PowWow Version Release Notes (covering versions 1.4b to 2.32) (dated Jun. 26, 1996).
PowWow32 Release Notes (PowWow Versions 3.0 beta 3 and 3.0 beta 2) (dated Nov. 21, 1996).
Prospectus for VocalTech Ordinary Shares, Feb. 6, 1996.
Questions and Comments: DCE RFC 6.0 "A Generic Interface for Extended Registry Attributes" Commentary by Bob Blakley, Jul. 6, 1992.
R. Braden, RFC 1644 T/TCP—TCP Extensions for Transactions Functional Specifications (Jul. 1994).
R. Droms, RFC 1531: Dynamic Host Configuration Protocol (Oct. 1993).
R. Droms, RFC 1541: Dynamic Host Configuration Protocol (Oct. 1993).
R.C. Summers, Local–Area Distributed Systems, IBM Systems Journal, vol. 28, No. 2 (1989).
Raj Pandya, Emerging Mobile and Personal Communication Systems, IEEE Communications Magazine (Jun. 1995).
RFC 1001: Protocol Standard for a NetBIOS Service on a TCP/UDP Transport: Concepts and Methods, Mar. 1987.
RFC 1057: RPC Remote Procedure Call Protocol Specification Version 2, Jun. 1988.
Richard Karpinski, Internet Phones Battle for the Market, Interactive Age, No. 212 (1995).
Richard Karpinski, Upgrading Internet Phone—VocalTec Offers Full–Duplex Versions, Eliminating Voice Delays, Interactive Age, No. 216 (1995).
Richard T. Snodgrass, Developing Time–Oriented Database Applications in SQL, Morgan Kaufmann Publishers (2000).
Rivka Tadjer, Internet Communications Solutions: How Well Do They Work?, Computer Shopper, vol. 15, No. 6 (Jun. 1995).
Rivka Tadjer, Internet Phones to Upstage Videoconferencing Products? Talk is Cheaper with Local Worldwide Dialing, Computer Shopper, vol. 15, No. 5 (May 1995).
Rob Walters, Computer Telephone Integration (Artech House, 1993).
Robert E. Kahn, et al., Advances in Packet Radio Technology, Proceedings Of The IEEE (Nov. 1978).
Robert Gurwitz, et al., IEN 212: IP—Local Area Network Addressing Issues (Sep. 1982).
Robert J. Williams, User Location Service (Feb. 1996).
Robert Joseph Fowler, Decentralized Object Finding Using Forwarding Addresses, Ph.D. Thesis, University of Washington (Dec. 1985).
Robert Richardson, Internet Phone, LAN Magazine, vol. 10, No. 7 (Jul. 1995).
Robert Richardson, Pow Wow, Anyone? A Web Chat That Works, LAN Magazine, vol. 10 No. 9 (Sep. 1995).
Robert S. French, et al., The Zephyr Programmer's Manual, Rev. 2.1 (May 5, 1989).
Rosen, Nick "Internet Opens Line on Cheap Global Phone Calls" The Guardian, Feb. 10, 1995, A1.
S. Waldbusser, et al., RFC 1742: AppleTalk Management Information Base II (Jan. 1995).
S.R. Ahuja, et al., The Rapport Multimedia Conferencing System, ACM (1988).
Sakae Okubo, et al., Draft ITU–T Recommendation H.245—Line Transmission of Non–Telephone Signals: Control Protocol for Multimedia Communication (Nov. 14, 1995).
Sakae Okubu, et al., ITU–T Recommendation H. 245—Line Transmission of Non–Telepone Signals: Control Protocol for Multimedia Communication (May 20, 1996).
Sakae Okubo, et al., Line Transmission of Non–Telephone Signals: Control Protocol for Multimedia Communication, Recommendation H245 (May 20, 1996).

Sakae Okubo, et, al., ITU–T Standardization of Audiovisual Communication Systems in ATM and LAN Environments (Apr. 17, 1996).

Sape J. Mullender, et al., Distributed Match Making for Processes in Computer Networks (Association for Computing Machinery, 1985).

Sape Mullender, ed., Distributed Systems, ACM Press (1992).

Sapwater, E. "Webbed", 2 pages (undated).

Saruchi Mohan, Internet Phone Accepting Calls, Computerworld (Feb. 27, 1995).

Savetz, Kevin "Net as Phone" Internet World, Jul. 1995.

Schill, et al., ed., IFIP/IEEE International Conference on Distributed Platforms—Client/Server and Beyond: DCE, CORBA, ODP & Advanced Distribution Applications, Technical University Bergakadernie Freiburg (1996).

Schulzrinne, Service Conference Invitation Protocol, Internet Draft (Feb. 22, 1996).

Scott Kahn, Leave Your Message on My PC After the Beep, PC Week (Oct. 3, 1994).

Sharon Fisher, Fruits of Athena—Academic Projects Like Athen Have Given the Worlds Its First Inkling of What Computer Interoperability is All About, Communications Week (1992).

Snell, Jason "Foiling Ma Bell" MacUser, Jul. 1995.

Speak Freely, from Q1.11 of Section 1 of the comp.speech FAQ Home Page (dated Mar. 19, 1996).

Staff Phone List (Jul. 1, 1997).

Steinberg, Bob "Will Politics Interfere With The Global Internet?" Mashpee Enterprise, Apr. 28, 1995.

Stephen A. Uhler, PhoneStation, Moving the Telephone onto the Virtual Desktop, 1993 Winter Usenix, San Diego, California (Jan. 25–29, 1993).

Steve Hamm, The Merry Pranksters, PC Week, vol. 12 No. 34 (Aug. 28, 1995).

Stuart Harris, The IRC Survival Guide: Talk to the World With Internet Relay Chat (Addison–Wesley, Feb. 1995).

Sun Microsystems, Inc., RFC 1050: RPC: Remote Procedure Call Protocol Specification Version 2 (Jun. 1988).

Surfers Can Drop Phones, Electronics Times (Feb. 16, 1995).

Susan Thomson, et al., DNS Dynamic Updates, IETF DNSIND Working Group (Jul. 1994).

T. Berners–Lee, et al., RFC 1738: Uniform Resource Locators (URL) (Dec. 1994).

Tamila Baron, Hearing Voices on the Net, Communications Week (Feb. 20, 1995).

Tamila Baron, VocalTech, Motorola Team Up for Internet Phone and Modem Bundle, Communications Week, No. 549 (1995).

Ted Anderson's Email to dmackey re DCE 1.1 Delegation Proposal for Review, Jun. 23, 1992.

Ted Anderson's Email to pato, Re: RFC 7.0 (really glp92), Jul. 21, 1992.

The 4.4BSD–Lite distribution announcement, Computer Systems Research Group (Mar. 1, 1994), and related newsgroup postings, dated Apr. 21–22, 1994.

The Electric Magic Company, Business Plan, Version 0.1 draft, Apr. 17, 1995.

The Open Group Organization Chart (Oct. 1997).

The Open Group Organization Chart Oct. 1996 (Confidential).

The OSF Distributed Computing Environment: Building on International Standards, OSF White Paper (Apr. 1992).

The VocalChat User's Guide, Sep. 28, 1993.

Thomas Maresca, The Internet Phone Company?, Consumer Information Appliance, No. 55 (Feb. 1995).

TIMOP: DCE Time Operations Sample Application. (undated).

Timothy J. O'Malley, Analysis of the Zephyr Communication Paradigm, Bachelor of Science in Computer Science and Engineering, Thesis, Massachusetts Institute of Technology (May 1993).

Todd Copilevitz, Heard on the Internet, The Star–Ledger (Mar. 7, 1995).

Tom Lyons, Network Computing System Tutorial, Prentice Hall (1991).

Tony Pompili, VocalTec: The Internet Phone Number?, PC Magazine (May 16, 1995).

Translation of Japanese Patent Application No. Sho 63[1988]–131637 (Original dated Jun. 3, 1988).

Transparencies: Walter Tuvell, DCE 1.0 Security Technology—Detailed Architectural Overview (Feb. 1997).

V. Jacobson, et al., RFC 1185: TCP Extension for High–Speed Paths (Oct. 1990).

VocalChat 1.01 Network Information (undated).

VocalChat Early Beta Release 1.02B Information (undated).

VocalChat GTI 2.12 Beta Retrival Instructions and Information (undated).

VocalChat Version 1.0, README.TXT, Nov. 1993.

VocalChat Version 1.01 README.TXT, Mar. 1994.

VocalChat Version 2.01 and Wan 2.01, README.TXT. May 1994.

VocalTec Annual Report, 1996.

VocalTec Cross–Reference Sheet, Pursuant to Item 501 of Reg. S–K (dated Jan. 1996).

VocalTec Internet Phone Information Sheet, 2 pages. (dated Jun. 1995).

VocalTec Internet Phone Version 3.0 Build 17, README.TXT, Aug. 11, 1995.

VocalTec Internet Phone Version 3.2 Build 21, README.TXT, Mar. 25, 1996.

VocalTec SEC 20–F Filing, 1996.

VocalTec SEC F–1 Filing, Dec. 22, 1995.

VocalTec SEC F–1 Filing, Jan. 5, 1996.

Voice Over the Internet, Boardwatch Magazine, vol. IX, No. 1 (Jan. 1995).

W. David Albrecht, CPA Firms on the World Wide Web, Ohio CPA Journal (Jun. 1996).

W. Simpson, RFC 1661: The Point–to–Point Protocol (PPP) (Jul. 1994).

W. Yeong, et al., RFC 1777. Lightweight Directory Access Protocol (Mar. 1995).

Walt and mactcp's ip addresses and code (undated).

Walter Tuvell, DCE 1.0 Security Technology—Detailed Architectural Overview (Feb. 1997).

Walter Tuvell, DCE 1.0 Security Technology Detailed Architectural Overview, Draft (Feb. 1997).

Walter Tuvell, DCE 1.0 Security Technology: Detailed Architectural Overview (Feb. 1997).

Walter Tuvell, DCE 1.0 Security Technology: Detailed Architectural Overview (May 1994).

Walter Tuvell, DCE Multi–Crypto Support—Proposal to NSA for Funding and Exportability of Multiple Cryptographic Mechanisms in OSF's Distributed Computing Environment (Sep. 12, 1995).

Walter Tuvell, Distribution & The Infobahn (1996).

Walter Tuvell, Exportability of DCE Multi–Crypto Feature (Mar. 5, 1996).

Walter Tuvell, RFC 98.0: Challenges Concerning Public–Key in DCE (Dec. 1996).

Walter Tuvell, System V/ONC Comparison to AIX/NCS (Oct. 3, 1988).

Walter Tuvell, The DCE Dance: Application Development in 29 Easy Steps (Sep. 1991).

Walter Tuvell, The OSF Distributed Computing Environment (DE). (undated).

Web Phone, from Q1.11 of Section 1 of the comp.speech FAQ Home Page (dated Mar. 19, 1996).

WebSTAR Technical Reference (formerly MacHTTP), Star-Nine Technologies, 1995.

Wei Hu, DCE Security Programming, O'Reilly & Associates (Jul. 1995).

Welch, Nathalie "Vendors Ring in New Telephony Options" MacWeek, Apr. 10, 1995, p. 18.

Wendy Woods, Newsbytes Daily Summary, NEWSBYTES (Jun. 10, 1994).

William M. Bulkeley, On–line: Hello, world. Audible Chats on the Internet, Wall Street Journal (Feb. 10, 1995).

Winther, Mark. "The World Wide Web Phones Home: Internet Telephony Market Assessment, 1996–1999", International Data Corporation White Paper (dated 1996).

Xerox System Integration Standard Clearinghouse Protocol (Apr. 1984).

Yakov Rekhter, et al., Dynamic Updates in the Domain Name System (DNS):Architecture and Mechanism, Internet–Draft, DNSIND Working Group (Jul. 15, 1994).

The Open Group, Technical Standard, *Protocols for X/Open PC Interworking: SMB*, Version 2, 1992, pp. ii–xvi and p. 1–516.

Zellweger, Polle T., et al., *Etherphone: Collected Papers 1987–1988*, Xerox Corporation, May 1989.

Vin, Herrick M., et al, *Multimedia Conferencing in the Etherphone Environment*, Oct. 1991, pp. 69–79.

Droms, R., *Dynamic Host Configuration Protocol, RFC 1531*, Bucknell University, Oct. 1993, pp. 1–39.

*VocalChat User's Guide Version 2.0*, Vocaltec, 1994, pp. 1–77.

*README, VocalChat Version 2.02& VocalChat WAN Version 2.02*, Vocaltec, Jun. 1994, pp. 1–3.

*VocalChat 1.01 Network Information*, Vocaltec, 1994, pp. 1–10.

*VocalChat Information*, Vocaltec, 1994, pp. 1–31.

*VocalChat Troubleshooting*, Vocaltec, 1994, pp. 1–101.

VocalChat GTI Information file, believed to be included with VocalChat GTI version 2.12 dated Sep. 1994.

VocalChat GTI README.TXT for Version 2.12 Beta, dated Sep. 1994.

VocalChat GTI Troubleshooting.Inf, believed to be included with VocalChat GTI version 2.12 dated Sep. 1994.

David Strom, "Talking Telephony", Windows Sources, Ziff–Davis Publishing Company, Sep. 1996, vol. 4, No. 9, pp. 6, 7, 10, 150–152, 157, 158, 163, 167, 169, 171, 174, 181, 184, 186, 195, 203, 208.

Emad Farag et al., "Structure and network control of a hierarchical mobile network architecture", IEEE Fourteenth Annual International Phoenix Conference on Computers and Communications, Mar. 1995, ISBN: 0–7803–2492–7, pp. 671–677.

English translation of JP–06–62020 (dated Mar. 4, 1994).

Huanxu Pan et al., "Analysis of a CCSS#7 Network Supporting database services", IEEE International Conference on Information Engineering, Sep. 1993, ISBN: 0–7803–1445–X, pp. 193–197, vol. 1.

John E. Goodwin, Project Gutenberg Alpha Edition of EMAIL 101, http://metalab.unc.edu/pub/docs/books/gutenberg/etext93/email025.txt, Jul. 1993.

Junichi Kimura, et al. "Voice/Data Multiplexing Transmission Methods", Kokai Japanese Patent, Kokai Sho 59–44140, pp. 205–215, with English Abstract, English Translation, pp. 1–24.

Mark R. Brown et al. "Special Edition: Using Netscape 2", Que Publishing, 1995, ISBN 0–7897–0612–1, pp. 7–35, 37–56, 78, 83, 176, 301–320, 393, 395–467, 469–506.

Preston Gralla, "How the Internet Works", Ziff–Davis Press, Emeryville, CA, c1997, pp. 34–37, 202–205, 214–215 and 272–275, ISBN 1–56276–552–3.

After Downsizing: Overcoming Client–Server Chaos (May 21, 1994).

Barrow Street report on New Paradigm Software Corp. (dated Sep. 20, 1995).

Camelot Corps Shining Internet Dream Draws Skeptics (Aug. 95).

Correspondence with MacZone (Aug.–Sep. 1995).

DigiPhone Documents (including Q and A) (prior to Sep. 1995).

DigiPhone Documents (prior to Sep. 1995).

DigiPhone for Mac (1996).

Electric Magic Company Releases NetPhone 1.2 and Net-Pub Server (dated Jun. 8, 1995).

Electric Magic Information (May 1995).

Electric Magic Notebooks (prior to Sep. 1995).

Electric Magic Notes (including references to Apr. 18, 1995) and patent pending.

Electric Magic Notes (including references to DigiPhone) (prior to Sep. 1995).

Electric Magic Press Release (dated Mar. 13, 1995).

Electric Magic and WebKat Licensing Documents (Sep. 1995 and prior).

E–mail dated May 9, 1995 re NetPhone Development with Jabra R/D.

Fax dated May 31, 1995 to IVP including press releases.

Google Groups comp.dcom.videoconf posting (dated Jul. 5, 1995).

intern.tex (dated Aug. 30, 1994).

Jabra—Corporate and Product Backgrounder (Apr. 19, 1995).

Jabra Ear Phone Common Questions and Answers.

Jabra Ear Phone PC, 1995.

Jabra Streamline Ear Phone, 1993.

List of source modules in NetPhone (dated Oct. 10, 1995).

Maven README (including 1994 copyright notice).

Net as Phone (internet World Jul. 1995).

Net phone ad (with Jabra fax line) (May 1995).

NetPhone 1.1 User Manual (including date Jan. 9, 1995).

NetPhone Advertisement (Aug. 1995).

NetPhone Digital User Manual (dated Feb. 26, 1995).

NetPhone gives your Mac voice over the Internet (Inside the Internet—Jun. 1995).

NetPhone Tasks and Plans (dated Jan.–Feb. 1995).

Open Systems Today, Feb. 20, 1995.

Order for Netphone version 1.2 labels (dated Jun. 6, 1995).

Phoneless Phoning Apr. 2, 1995.

PowWow Chunked Protocol Specification, Last edited Mar. 12, 1999.

PowWow Native Protocols, last updated Dec. 8, 1998.

Roadmap for the Internet (Mar. 1995).

SlipMagic Ad for MacZone (dated Sep. 28, 1995) for selling product.

The Mac Zone (Catalog) dated 1995.

Two–way voice calls over the Internet (Nov. 21, 1994).

Ubique documents relating to Virtual Places Products (dated 1995 and Mar. 1995).

Ubique Ships Virtual Places Client and Server (dated Mar. 20, 1995).

Ubique, Ltd. Fact Sheet (referencing NetPhone codecs and Vocaltec) (date unknown).

Welcome to NetPhone Demo (includes copyright date 1994).

"Circuit Switching", Ericsson, last published Jul. 5, 2001, found at http://www.ericcson.com/multiservicenetworks/circuitswitching/axe/ printed on Aug. 1, 2001, 2 pages.

"Data Communication Over the Telephone Network", International Telecommunication Union, CCITT The International Telegraph and Telephone Consultative Committee, Blue Book, vol. VIII—Fascicle VIII.1, IXth Plenary Assembly, Melbourne, Nov. 14–25, 1988, pp. 296–370.

"Full Duplex Speakerphone", IBM Technical Disclosure Bulletin, vol. 29, No. 12, May 1987, pp. 5599–5602.

"ICL OPD—One Per Desk", Issue Aug. 1, 1990, A Comprehensive Technical Information Document (24 pages).

"Information Processing Techniques Program. vol. II. Wideband Integrated Voice/Data Technology" Semiannual Technical Summary Report, Massachusetts Institute of Technology Lexington, MA, Oct. 1, 1977–Mar. 31, 1978, Issued Aug. 31, 1978, pp. 1–25 and 27–31, ADA067014.

"Integrated Voice/Data PABX Communications", IBM Techical Disclosure Bulletin, Sep. 1986, http://patents.ibm.com.

"Level 1–5 of 65 Stories" 1990 Network World, Inc., Apr. 16, 1990, pp. 114–115.

"Multi–Service Networks", Ericsson, last published Jun. 27, 2001, found at http://www.ericsson.com/multiservicenetworks/circuitswitching/ printed on Aug. 1, 2001, 2 pages.

"The History of TPC.INT", Jan. 15, 1999, 2 pages, found at http://ww.tpc.int/faq/history.html printed on Aug. 8, 2002.

A. A. Kapauan, et al. "Wideband Packet Access for Workstations: Integrated Voice/Data/Image Services on the UNIX+ PC", IEEE Global Telecommunications Conference, Houston, Texas, Dec. 1–4, 1986, Conference Record vol. 3, pp. 1439–1441.

Ahrens, Richard L., "Frequently–Asked Questions about Internet VoiceChat 1.1 FAQ Version: 1.0", 1994, 6 pages.

Andy Hopper "Pandora—An Experimental System for Multimedia Applications", Operating Systems Review, Jan. 12, 1990, pp. 1–16.

Bennett, Geoff, "Designing TCP/IP Internetworks", Chapter 11, pp. 290, 291 and 323, Van Nostrand Reinhold, 1995.

Bernard Gold "Digital Speech Networks", Proceedings of the IEEE, vol. 65, No. 12, Dec. 1977, pp. 1636–1658.

Bill Newman "An ISDN Data and Voice Terminal Based on a Personal Computer", Globecom'85, IEEE Global Telecommunications Conference, Conference Record vol. 3, New Orleans, Louisiana, Dec. 2–5, 1985, pp. 1048–1052.

Borland, John, "Technology uses one number to find you on any device", May 17, 2001, 3 pages, found at http://news.cnet.com/news/0–1004–201–5939191–0.html.

C. Malamud et al., "Principles of Operation for the TPC.INT Subdomain: General Principles and Policy", RFC 1530, Oct. 1993, pp. 1–7.

C. Malamud et al., "Principles of Operation for the TPC.INT Subdomain: Remote Printing—Administrative Policies", RFC 1529, Oct. 1993, pp. 1–5.

C. Malamud et al., "Principles of Operation for the TPC.INT Subdomain: Remote Printing—Technical Procedures", RFC 1528, Oct. 1993, pp. 1–12.

C. Topolcic "Experimental Internet Stream Protocol, Version 2 (ST–II)", Request for Comments 1190, Oct. 1990, pp. 1–148.

C. Yang, "INETPhone: Telephone Services and Servers on Internet", Request for Comments 1789, pp. 1–6, Apr. 1995.

Carl A. Sunshine, et al. "Broad–Band Personal Computer LAN's", IEEE Journal on Selected Areas in Communications, vol. SAC–3, No. 3, May 1985, pp. 408–415.

Cindy Mueller et al., "ATD Data Services", http://www.iita.ucar.edu/ws/datawkshop/Abstract–ATD.html, Jan. 5, 1995, 2 pages.

Clifford J. Weinstein, et al. "Experience with Speech Communication in Packet Networks" IEEE Journal on Selected Areas in Communication, vol. SAC–1, No. 6, (ISSN 0733–8716), Dec. 1983, pp. 963–980.

D. Adolphs, et al. "Adapters for the Public ISDN", pp. 72–80.

D. Perkins "The Point–to–Point Protocol for the Transmission of Multi–Protocol Datagrams Over Point–to–Point Links", Request for Comments 1171, ftp://ftp.isi.edu/in–notes/rfc1171.txt, Jul. 1990, pp. 1–48.

D.C. Swinehart et al., "Adding Voice to an Office Computer Network", IEEE Global Telecommunications Conference, Nov. 28–Dec. 1, 1983, Conference Record vol. 1 of 3, pp. 392–398.

Dale Gulick et al., "Interface the ISDN to Your PC With a Voice/Data Board", Design Applications, 2328 Electronic Design, 35 (1987) Dec. 10, No. 29, Hashbrouck Heights, NJ, USA, pp. 85–88, XP 000004313.

Daniel C. Swinehart "Telephone Management in the Etherphone System", IEEE/IEICE Global Telecommunication Conference '87, Conference Record vol. 2 of 3, Nov. 15–18, 1987, pp. 1176–1180.

Danny Cohen "A Network Voice Protocol NVP–II", Apr. 1, 1981, pp. 1–68.

Danny Cohen "Packet Communication of Online Speech", AFIPS Conference Proceedings, 1981 National Computer Conference, May 4–7, 1981, Chicago, Illinois, pp. 169–176.

Danny Cohen "Specifications for the Network Voice Protocol (NVP)", Request for Comments 741, Jan. 29, 1976, pp. 1–30.

Don H. Johnson, et al. "A Local Access Network for Packetized Digital Voice Communication", IEEE Transaction on Communications, vol. Com. 29, No. 5, May 1981, pp. 679–688.

Douglas B. Terry and Daniel C. Swinehart, "Managing Stored Voice in the Etherphone System", 1987 ACM 089791–242–X/87/0011/0103, pp. 103–104.

Douglas B. Terry and Daniel C. Swinehart, "Managing Stored Voice in the Etherphone System", ACM Transactions on Computer Systems, vol. 6, No. 1, Feb. 1988, pp. 3–27.

Eve M. Schooler, et al. "A Packet–Switched Multimedia Conferencing System", SIGOIS Bulletin, pp. 12–22.

Gary C. Kessler "ISDN Concepts, Facilities, and Services", McGraw–Hill, Inc., c1990, pp. 224–231, ISBN 0-07-034242-3.

Giulio Barberis, et al. "Coded Speech in Packet–Switched Networks: Models and Experiments" IEEE Journal on Selected Areas in Communications, vol. SAC–1, No. 6, Dec. 1983, pp. 1028–1038.

H. Jonathan Chao, et al. "A Packet Video System Using the Dynamic Time Division Multiplexing Technique", IEEE Global Telecommunications Conference, Houston, Texas, Dec. 1–4, 1988, Conference Record, vol. 3, pp. 0767–0772.

H. Opderbeck "Throughput Degredations for Single Packet Messages", Request for Comments 632, ftp://ftp.isi.edu/in–notes/rfc632.txt, May 20, 1974, pp. 1–6.

Henninig Schulzrinne "Voice Communication Across the Internet: A Network Voice Terminal", Jul. 29, 1992, pp. 1–34.

Hiroshi Kobayashi and Hideaki Haruyama, "Voice, Data and Video Integrated Broadband Metroplitan Area Network", Electronics and Communications in Japan, Part 1, vol. 73, No. 11, 1990, pp. 34–42.

Hiroyuki Ichikawa et al. "High–Speed Packet Switching Systems for Multimedia Communications", IEEE Journal on Selected Areas in Communications, Oct. 1987, vol. SAC–5, No. 8 (ISSN 0733–8716), pp. 1336–1345.

Ian H. Merritt "Providing Telephone Line Access to a Packet Voice Network", University of Southern California, Marina Del Rey. Information Sciences Inst., Feb. 1983, ADA126270.

Implementation of Next–Generation Agent–Dedicated Communications, by Agatsuma et al., Tech Report of IEICE 94–216 (Mar. 1995).

Israel Gitman, et al. "Economic Analysis of Integrated Voice and Data Networks: A Case Study" Proceedings of the IEEE, vol. 66, No. 11, Nov. 1978, pp. 1549–1570.

J. Huelamo, et al. "End User Premises Equipment and Terminals for Broadband Applications", Electrical Communication, vol. 64, No. 2/3, 1990.

J. K. Reynolds et al., Voice File Interchange Protocol (VFIP), Request for Comments 978, ftp://ftp.isi.edu/innotes/rfc978.txt, Feb. 1986, pp. 1–5.

J. Romkey "A Nonstandard For Transmission of IP Datagrams Over Serial Lines: Slip", Request for Comments 1055, ftp:isi.edu/in–notes/std/std47.txt, Jun. 1988, pp. 1–6.

James D. Mills, et al. "A data and voice system for the general service telephone network", Proceedings IECON '87, 1987 International Conference on IND. Electronics, Control, and Instrumentation, Cambridge, Massachusetts, Nov. 3–6, 1987.

James W. Forgie "Speech Transmission in Packet–Switched Store–and–Forward Networks", AFIPS Conference Proceedings, 1975 National Computer Conference, May 19–22, 1975, Anaheim, California, pp. 137–142.

James W. Forgie "Voice Conferencing in Packet Networks", ICC '80, Conference Record, International Conference on Communications, Seattle, WA, Jun. 8–12, 1980, vol. 1, 80CH1505–6 CSCB, pp. 21.3.1–21.3.4.

Jane's Military Communications 1979–80, pp. 452 and 453.
Jane's Military Communications 1985, pp. 585, 546, and 545.
Jane's Military Communications 1989, Tenth Edition, Edited by John Williamson, ISBN 0710608772, pp. 443, 507, and 512.

Jane's Military Communications 1990–91, Eleventh Edition, Edited by John Williamson, ISBN 0710609000, p. [30], 264, 357, 398, 406, 450, 454, 456, 560, 572, 573, 814, 815, and 816.

Jane's Military Communications 1992–93, Thirteenth Edition, Edited by John Williamson, ISBN 0710609809, pp. 375, 376, 384, and 704.

Jim Stevens, "Much More Idle Chatter About Reference Models", http://www–mice.cs.ucl.ac.uk/multimedia/misc/tcp_ip/8709.mm.www/0041.html, Dec. 18, 1987, pp. 1–9.

John Bellamy, "Digital Telephony", c1982 John Wiley & Sons, Inc., pp. 392–397 and 410–412.

K. Sohraby, et al. "ISDN Primary Rate Interface Impact on Performance of Integrated Voice and Data on CSMA/CD Networks—A Measurement and Simulation Study", Globecom '90 IEEE Global Telecommunication Conference & Exhibition, San Diego, California, Dec. 2–5, 1990, vol. 2, pp. 0912–0919.

Ken Sherman "Data Communications—A User's Guide", 3rd Edition, c1981 Prentice–Hall, Inc., pp. 296–307 and 404–407.

Kevin Jeffay, et al. "Kernel Support for Live Digital Audio and Video", pp. 10–21, University of North Carolina at Chapel Hill, Department of Computer Science.

Kyuta Saito, et al. "Voice Packet Communication System for Private Networks", Globecom '89, IEEE Global Telecommunication Conference & Exhibition, Dallas, Texas, Nov. 27–30, 1989, vol. 3, pp. 1874–1878.

Lawrence G. Roberts "The Evolution of Packet Switching", Proceedings fo the IEEE, vol. 68, No. 11, Nov. 1978, pp. 1307–1313.

Lin, Hwa–Chun and C.S. Raghavendra, "A Dynamic Load–Balancing Policy With a Central Job Dispatcher (LBC)," IEEE Transactions on Software Engineering, vol. 18, No. 2, Feb. 1992, pp. 148–158.

M. E. Ulug, et al. "Statistical Multiplexing of Data and Encoded Voice in a Transparent Intelligent Network", Fifth Data Communications Symposium, Sep. 27–29, 1977, Snowbird, Utah, pp. 6–14–6–20.

M. Gopalakrishnan, et al. "Integrating Voice and Data SALAN: An Experimtental Local Area Network", Computer Communications, vol. 9, No. 4, Aug. 1986, pp. 186–194 and p. 169.

M.J. Ross "Alternatives for Integrating Voice and Data", 1981 International Switching Symposium, ISS' 81 CIC Montreal, Sep. 21–25, 1981.

Natesa Janakiraman "An Overview of Recent Developments in the Designs and Applications of Customer Premises Switches", IEEE Communications Magazine, Oct. 1985, vol. 23, No. 10, pp. 32–45.

P. Borgnis–Desbordes, et al. "Variable–Speed Data Transmission", IBM Technical Disclosure Bulletin, vol. 27, No. 4A Sep. 1984, pp. 2269–2270.

P. Venkat Rangan and Daniel C. Swinehart, "Software Architecture for Integration of Video Services in the Etherphone System", IEEE Journal on Selected Areas in Communication, vol. 9, No. 9, Dec. 1991, pp. 1395–1404.

Paul Francis, "Comparison of Geographical and Provider–rooted Internet Addressing," Computer Networks and ISDN Systems 27(3)437–448, 1994 (selected paper from INET 94/JENC 5).

Paul Gilster, "Internet Navigator", Maruzen Kabushiki–Kaisha (1st Ed.), pp. 473–476, Feb. 28, 1995 (with translation and SOR).

Paul Tsuchiya, Tony Eng, "Extending the IP Internet Through Address Reuse," ACM SIGCOMM Computer Communications Review, 23(1):16–33, Jan. 1993.

Philip H. Reagan, "Is it the PBX or is it the LAN?", Datamation, The Telecom Manager Emerges, Mar. 1984, vol. 30 No. 3, pp. 3–4, 147, 148, 150.

Polle T. Zellweger et al., "An Overview of the Etherphone System and its Applications", 2nd IEEE Conference on Computer Workstations, Mar. 7–10, 1988, pp. 160–168.

R. Braudes et al., "Requirements for Multicast Protocols", Request for Comments 1458, Network Working Group, May 1993, pp. 1–19.

R. W. Meba, et al. "Experiments in Wideband Packet Technology", Digital Communications—New Directions in Switching and Networks, Proceedings of the International Seminar, Zurich, Switzerland, Mar. 11–13, 1986, pp. 135–139.

R. P. McNamara, "Some Considerations of the Voice–Data Capabilities of Broadband Cable Networks", IEEE Digest of Papers Spring CompCon 82, Feb. 22–25, 1982, pp. 312–314.

Randy Cole "Packet Voice: When It Makes Sense", Speech Technology, Sep./Oct. 1982, pp. 52–61.

Scott Flinn, "Coordinating Heterogeneous Time–Based Media Between Independent Applications" ACM Multimedia 95—Electronic Proceedings Nov. 5–9, 1995, pp. 1–16.

Shimmi Hattori et al., "Integrated Digital Switching System with Queueing Storage Facility", IEEE Transactions on Communications, vol. Com–30, No. 8, Aug. 1982, pp. 1900–1905, (ISSN 0090–6778).

Steve Oltmanns, et al. "A Voice and Communications System for the IBM PC", Speech Technology, Mar./Apr. 1986, pp. 94–99.

Stuart Cheshire et al., "Internet Mobility 4×4", www.acm.org, 1996, pp. 1–12.

Susan Angebranndt et al., "Integrating Audio and Telephony in a Distributed Workstation Environment", Proceedings of the Summer 1991 USENIX Conference, Jun. 10–14, 1991, Nashville, Tennessee, pp. 419–435.

T. Kamae "Visual Terminals and User Interfaces", FGCS North–Holland, pp. 257–278.

T. Kamae "Voice/Data Integration in the INS Model System and Local Area Networks" IEEE Communications Magazine, Dec. 1986, vol. 24, No. 12, pp. 7–15.

T7540 Digital Telephone Codec, AT&T Microelectronics, Jan. 1991, pp. 1–62 and Data Sheet Addendum, Jul. 1991, 4 pages.

Takashi Yamada, et al. "New Technologies—Multimedia High–throughput X.25 Packet Switching System", NTT Review, vol. 1, No. 2, Jul. 1989, pp. 82–88.

Tamohiro Kawai, Nikkei Communications, No. 202, pp. 29–30, Nikkei BP, Jul. 17, 1995 ("Communication software appears on the Internet") (w/ SOR).

Theodore Bially, et al. "Voice Communication in Integrated Digital Voice and Data Networks", IEEE Transactions on Commnications, vol. Com–28, No. 9, Sep. 1980, pp. 1478–1490.

Toru Tsuda, et al. "An Approach to Multi–Service Subscriber Loop System Using Packetized Voice/Data Terminals" ISSLS '78, The International Symposium on Subscriber Loops and Services, Mar. 20–24, 1978, Atlanta, Georgia, Conference Record, pp. 161–165.

Translation of Japanese Kokai H07–129488 (published May 19, 1995).

V. Jacobson, et al. "TCP Extension for High–Speed Paths", Request for Comments 1185, ftp://ftp.isi.edu/in–notes/rfc1185.txt, Oct. 1990, pp. 1–21.

V. Jacobson, et al. "TCP Extensions for High Performance", Request for Comments 1323, ftp://ftp.isi.edu/in–notes/rfc1323.txt, May 1992, pp. 1–37.

Vinton G. Cerf, "Packet Satellite Technology Reference Sources", Request for Comments 829, Nov. 1982, http://www.cis.ohio–state.edu/htbin/rfc/rfc829.html, pp. 1–5.

VocalTec Internet Phone (TM) Version 2.5 Readme, VocalTec Ltd., Feb. 1995, 5 pages.

US 6,131,121 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12-14 is confirmed.

Claims 6-11 are determined to be patentable as amended.

Claims 1-5 were not reexamined.

6. A computer program product for use with a computer system capable of executing a first process and connecting to other processes and a server process over a computer network, the computer program product comprising a computer usable medium having computer readable code means embodied in the medium comprising:
   A. program code configured to, following connection of the first process to the computer network, forward to the server process a *dynamically assigned* network protocol address at which the first process is connected to the computer network;
   B. program code configured to query the address server as to whether the second process is connected to the computer network;
   C. program code configured to receive a *dynamically assigned* network protocol address of the second process from the address server, when the second process is connected to the computer network; and
   D. program code configured to respond to the network protocol address of the second process, establish a point-to-point communication link with the second process over the computer network.

7. A computer data signal embodied in a carrier wave comprising:
   A. program code configured to, following connection of a first process to a computer network, forward to a server process a *dynamically assigned* network protocol address at which the first process is connected to the computer network;
   B. program code configured to query the server process as to whether a second process is connected to the computer network;
   C. program code configured to receive a *dynamically assigned* network protocol address of the second process from the server process, when the second process is connected to the computer network; and
   D. program code, responsive to the network protocol address of the second process, and configured to establish a point-to-point communication connection with the second process over the computer network.

8. An apparatus for use with a computer system, the computer system executing a first process operatively coupled over a computer network to a second process and a directory database server process, the apparatus comprising:
   A. program logic configured to, following connection of the first process to the computer network forward to the address server a *dynamically assigned* network[.] protocol address at which the first process is connected to the computer network;
   B. program logic configured to query the address server as to whether the second process is connected to the computer network;
   C. program logic configured to receive a *dynamically assigned* network protocol address of the second process from the address server, when the second process is connected to the computer network, and
   D. program logic configured to, in response to the network protocol address of the second process, establish a point-to-point communication link with the second process over the computer network.

9. A computer data signal embodied in a carrier wave comprising:
   a. program code configured to access a directory database, the database having a *dynamically assigned* network protocol address for a selected plurality of processes having on-line status with respect to the computer network, the *dynamically assigned* network protocol address of each respective process forwarded to the database following connection to the computer network; and
   b. program code responsive to one of the *dynamically assigned* network protocol addresses and configured to establish a point-to-point communication link from the first process to the second process over the computer network.

10. In a first computer process operatively coupled over a computer network to a second process and an address server, a method of establishing a point-to-point communication between the first and second processes comprising the steps of:
   a. accessing a directory database, the database having a *dynamically assigned* network protocol address for a selected plurality of processes having on-line status with respect to the computer network, the *dynamically assigned* network protocol address of each respective process forwarded to the database following connection to the computer network; and
   b. in response to one of the *dynamically assigned* network protocol addresses, establish a point-to-point communication link from the first process to the second process over the computer network.

11. An apparatus for use with a computer system, the computer system capable of executing a first process connectable over a computer network to a second process and a directory database server process, the apparatus comprising:
   a. program logic configured to access a directory database, the database having a *dynamically assigned* network protocol address for a selected plurality of processes having on-line status with respect to the computer network, the *dynamically assigned* network protocol address of each respective process forwarded to the database following connection to the computer network; and
   b. program logic responsive to one of the *dynamically assigned* network protocol addresses and configured to establish a point-to-point communication link from the first process to the second process over the computer network.

* * * * *